(12) United States Patent
Bao et al.

(10) Patent No.: US 11,609,299 B2
(45) Date of Patent: Mar. 21, 2023

(54) POSITIONING REFERENCE SIGNAL MEASUREMENT FOR JOINT POSITIONING

(71) Applicant: QUALCOMM Incorporated, San Diego, CA (US)

(72) Inventors: Jingchao Bao, San Diego, CA (US); Sony Akkarakaran, Poway, CA (US); Tao Luo, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 186 days.

(21) Appl. No.: 17/165,771

(22) Filed: Feb. 2, 2021

(65) Prior Publication Data
US 2022/0244344 A1 Aug. 4, 2022

(51) Int. Cl.
*G01S 5/00* (2006.01)
*G01S 5/02* (2010.01)
*H04W 8/24* (2009.01)
*H04W 24/10* (2009.01)

(52) U.S. Cl.
CPC ............ *G01S 5/0289* (2013.01); *G01S 5/021* (2013.01); *G01S 5/02213* (2020.05); *H04W 8/24* (2013.01); *H04W 24/10* (2013.01)

(58) Field of Classification Search
CPC .... G01S 5/0289; G01S 5/02213; G01S 5/021; H04W 8/24; H04W 24/10
See application file for complete search history.

(56) References Cited

U.S. PATENT DOCUMENTS

| | | |
|---|---|---|
| 2016/0095080 A1 | 3/2016 | Khoryaev et al. |
| 2016/0205499 A1* | 7/2016 | Davydov ................ H04W 4/02 455/456.1 |
| 2017/0307723 A1* | 10/2017 | Edge ......................... G01S 1/20 |
| 2019/0297673 A1* | 9/2019 | Xue .......................... H04W 4/70 |
| 2020/0110151 A1* | 4/2020 | Manolakos ............... G01S 5/10 |
| 2021/0058890 A1* | 2/2021 | Akkarakaran ........ G01S 5/0221 |
| 2021/0219103 A1* | 7/2021 | Wang ........................ G01S 5/00 |

OTHER PUBLICATIONS

International Search Report and Written Opinion—PCT/US2021/061024—ISA/EPO—dated Mar. 4, 2022.

* cited by examiner

*Primary Examiner* — Khai M Nguyen
(74) *Attorney, Agent, or Firm* — Thien T. Nguyen

(57) ABSTRACT

The positions of multiple user equipments (UEs) are jointly determined by a location server using positioning measurements from a comment set of positioning reference signals (PRS), which may include downlink (DL) PRS, uplink (UL) PRS, sidelink (SL) PRS, or a combination thereof. The common set of PRS may be selected by the location server, e.g., based on a rough estimate of position of the UEs determined by the location server, a recommendation from the UEs, or a position report from the UEs. Once selected by the location server, an indication of the common set of PRS is sent to the UEs. The common set of PRS, alternatively, may be selected by one or more UEs, e.g., by a controlling UE or consensus, and one or more UEs provide an indication of the common set of PRS to the location server.

30 Claims, 12 Drawing Sheets

1200 ⟶

```
┌─────────────────────────────────────────────────────────┐
│  Receive, from one or more UEs from the plurality of UEs, an │
│  indication of a common set of positioning reference signals for │
│  measurement, the common set of positioning reference signals │
│  comprising downlink positioning reference signals from one or │
│  more base stations to be measured by each UE in the plurality of │
│  UEs, uplink positioning reference signals from the plurality of UEs │
│     to be measured by the one or more base stations, sidelink │
│  positioning reference signals from UEs in the plurality of UEs to be │
│    measured by other UEs in the plurality of UEs, or a combination │
│                           thereof                       │
└─────────────────────────────────────────────────────────┘ ⟶ 1202
                              │
                              ▼
┌─────────────────────────────────────────────────────────┐
│   Receive location information from one or more of each UE in the │
│      plurality of UEs, the one or more base stations, or a combination │
│         thereof, the location information from each UE comprising │
│           downlink positioning reference signal measurements, uplink │
│          positioning reference signal measurements, round trip time │
│   measurements, sidelink positioning reference signal measurements, │
│     or the combination thereof generated from the common set of │
│                   positioning reference signals         │
└─────────────────────────────────────────────────────────┘ ⟶ 1204
                              │
                              ▼
┌─────────────────────────────────────────────────────────┐
│  Determine jointly a position estimate for each UE using the location │
│                      information received               │
└─────────────────────────────────────────────────────────┘ ⟶ 1206
```

Fig. 12

POSITIONING REFERENCE SIGNAL MEASUREMENT FOR JOINT POSITIONING

BACKGROUND

Field

The subject matter disclosed herein relates to wireless communications systems, and more particularly to systems, methods, and devices that support joint positioning.

Relevant Background

Wireless communication systems are widely deployed to provide various telecommunication services such as telephony, video, data, messaging, positioning, and broadcasts. Typical wireless communication systems may employ multiple-access technologies capable of supporting communication with multiple users by sharing available system resources (e.g., bandwidth, transmit power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems.

In some examples, a wireless multiple-access communication system may include a number of base stations, each simultaneously supporting communication for multiple communication devices, otherwise known as user equipment (UEs). In LTE or LTE-A network, a set of one or more base stations may define an e NodeB (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, gNB, etc.). A base station or DU may communicate with a set of UEs on downlink channels (e.g., for transmissions from a base station or to a UE) and uplink channels (e.g., for transmissions from a UE to a base station or distributed unit). Additionally, UEs may communicate directly with each other using sidelink channels.

The location of UE may be useful or essential to a number of applications including emergency calls, navigation, direction finding, asset tracking and Internet service. The location of a UE may be estimated based on information gathered from various systems. In a cellular network implemented according to LTE or 5G NR, for example, a base station may send downlink reference signals with which positioning measurements are performed by a UE and/or the UE may send uplink reference signals with which positioning measurements are performed by the base stations. Additionally, sidelink reference signals may be transmitted by UEs and positioning measurements performed by a UE. The UE may compute an estimate of its own location using the positioning measurements in UE-based positioning or may send the positioning measurements to a network entity, e.g., location server, which may compute the UE location based on the positioning measurements in UE-assisted positioning.

It may be desirable for positioning improvements implemented in newer technologies, such as 5G NR, to assist in positioning of multiple UEs more efficiently.

SUMMARY

The positions of multiple user equipments (UEs) are jointly determined by a location server using positioning measurements from a comment set of positioning reference signals (PRS), which may include downlink (DL) PRS, uplink (UL) PRS, sidelink (SL) PRS, or a combination thereof. The common set of PRS may be selected by the location server, e.g., based on a rough estimate of position of the UEs determined by the location server, a recommendation from the UEs, or a position report from the UEs. Once selected by the location server, an indication of the common set of PRS is sent to the UEs. The common set of PRS, alternatively, may be selected by one or more UEs, e.g., by a controlling UE or consensus, and one or more UEs provide an indication of the common set of PRS to the location server. The UEs perform positioning measurements using the common set of PRS and provide a report to the location server, which jointly determines the positions of the UEs.

In one implementation, a method for supporting joint positioning of a plurality of user equipments (UEs) performed by a location server, includes selecting a common set of positioning reference signals for measurement, the common set of positioning reference signals comprising downlink positioning reference signals from one or more base stations to be measured by each UE in the plurality of UEs, uplink positioning reference signals from the plurality of UEs to be measured by the one or more base stations, sidelink positioning reference signals from UEs in the plurality of UEs to be measured by other UEs in the plurality of UEs, or a combination thereof; sending a message to each UE in the plurality of UEs, the message comprising an indication of the common set of positioning reference signals; receiving location information from one or more of each UE in the plurality of UEs, the one or more base stations, or a combination thereof, the location information comprising downlink positioning reference signal measurements, uplink positioning reference signal measurements, round trip time measurements, sidelink positioning reference signal measurements, or the combination thereof that is generated based on the indication of the common set of positioning reference signals; and determining jointly a position estimate for each UE using the location information received.

In one implementation, a location server configured to support joint positioning of a plurality of user equipments (UEs), includes a communications interface configured to communicate with entities in a wireless network; at least one memory; and at least one processor coupled to the communications interface and the at least one memory, wherein the at least one processor is configured to: select a common set of positioning reference signals for measurement, the common set of positioning reference signals comprising downlink positioning reference signals from one or more base stations to be measured by each UE in the plurality of UEs, uplink positioning reference signals from the plurality of UEs to be measured by the one or more base stations, sidelink positioning reference signals from UEs in the plurality of UEs to be measured by other UEs in the plurality of UEs, or a combination thereof; send, via the communications interface, a message to each UE in the plurality of UEs, the message comprising an indication of the common set of positioning reference signals; receive, via the communications interface, location information from one or more of each UE in the plurality of UEs, the one or more base stations, or a combination thereof, the location information comprising downlink positioning reference signal measurements, uplink positioning reference signal measurements, round trip time measurements, sidelink positioning reference signal measurements, or the combination thereof that is generated based on the indication of the common set of positioning reference signals; and determine jointly a position estimate for each UE using the location information received.

In one implementation, a location server configured to support joint positioning of a plurality of user equipments (UEs), includes means for selecting a common set of positioning reference signals for measurement, the common set of positioning reference signals comprising downlink positioning reference signals from one or more base stations to be measured by each UE in the plurality of UEs, uplink positioning reference signals from the plurality of UEs to be measured by the one or more base stations, sidelink positioning reference signals from UEs in the plurality of UEs to be measured by other UEs in the plurality of UEs, or a combination thereof; means for sending a message to each UE in the plurality of UEs, the message comprising an indication of the common set of positioning reference signals; means for receiving location information from one or more of each UE in the plurality of UEs, the one or more base stations, or a combination thereof, the location information comprising downlink positioning reference signal measurements, uplink positioning reference signal measurements, round trip time measurements, sidelink positioning reference signal measurements, or the combination thereof that is generated based on the indication of the common set of positioning reference signals; and means for determining jointly a position estimate for each UE using the location information received.

In one implementation, a non-transitory storage medium including program code stored thereon, the program code is operable to configure at least one processor in a location server to support joint positioning of a plurality of user equipments (UEs), includes program code to select a common set of positioning reference signals for measurement, the common set of positioning reference signals comprising downlink positioning reference signals from one or more base stations to be measured by each UE in the plurality of UEs, uplink positioning reference signals from the plurality of UEs to be measured by the one or more base stations, sidelink positioning reference signals from UEs in the plurality of UEs to be measured by other UEs in the plurality of UEs, or a combination thereof; program code to send a message to each UE in the plurality of UEs, the message comprising an indication of the common set of positioning reference signals; program code to receive location information from one or more of each UE in the plurality of UEs, the one or more base stations, or a combination thereof, the location information comprising downlink positioning reference signal measurements, uplink positioning reference signal measurements, round trip time measurements, sidelink positioning reference signal measurements, or the combination thereof that is generated based on the indication of the common set of positioning reference signals; and program code to determine jointly a position estimate for each UE using the location information received.

In one implementation, a method for supporting joint positioning of a plurality of user equipments (UEs) performed by a first UE in the plurality of UEs, includes sending to a location server a recommendation for downlink positioning reference signals from one or more base stations to be measured by each UE in the plurality of UEs, uplink positioning reference signals from the plurality of UEs to be measured by the one or more base stations, sidelink positioning reference signals from UEs in the plurality of UEs to be measured by other UEs in the plurality of UEs, or a combination thereof for joint positioning of the plurality of UEs, wherein the location server selects a common set of positioning reference signals for measurement based on the recommendation, the common set of positioning reference signals comprising selected downlink positioning reference signals, uplink positioning reference signals, sidelink positioning reference signals, or a combination thereof; receiving a message from the location server comprising an indication of the common set of positioning reference signals for measurement by the first UE; performing positioning measurements of the downlink positioning reference signals, the sidelink positioning reference signals, transmitting uplink positioning reference signals, or the combination thereof based on the indication of the common set of positioning reference signals.

In one implementation, a first user equipment (UE) in a plurality of UEs configured to support joint positioning of the plurality of UEs, includes a wireless transceiver configured to communicate with entities in a wireless network; at least one memory; and at least one processor coupled to the wireless transceiver and the at least one memory, wherein the at least one processor is configured to: send, via the wireless transceiver, to a location server a recommendation for downlink positioning reference signals from one or more base stations to be measured by each UE in the plurality of UEs, uplink positioning reference signals from the plurality of UEs to be measured by the one or more base stations, sidelink positioning reference signals from UEs in the plurality of UEs to be measured by other UEs in the plurality of UEs, or a combination thereof for joint positioning of the plurality of UEs, wherein the location server selects a common set of positioning reference signals for measurement based on the recommendation, the common set of positioning reference signals comprising selected downlink positioning reference signals, uplink positioning reference signals, sidelink positioning reference signals, or a combination thereof; receive, via the wireless transceiver, a message from the location server comprising an indication of the common set of positioning reference signals for measurement by the first UE; and perform positioning measurements of the downlink positioning reference signals, the sidelink positioning reference signals, transmitting uplink positioning reference signals, or the combination thereof based on the indication of the common set of positioning reference signals.

In one implementation, a first user equipment (UE) in a plurality of UEs configured to support joint positioning of the plurality of UEs, includes means for sending to a location server a recommendation for downlink positioning reference signals from one or more base stations to be measured by each UE in the plurality of UEs, uplink positioning reference signals from the plurality of UEs to be measured by the one or more base stations, sidelink positioning reference signals from UEs in the plurality of UEs to be measured by other UEs in the plurality of UEs, or a combination thereof for joint positioning of the plurality of UEs, wherein the location server selects a common set of positioning reference signals for measurement based on the recommendation, the common set of positioning reference signals comprising selected downlink positioning reference signals, uplink positioning reference signals, sidelink positioning reference signals, or a combination thereof; means for receiving a message from the location server comprising an indication of the common set of positioning reference signals for measurement by the first UE; means for performing positioning measurements of the downlink positioning reference signals, the sidelink positioning reference signals, transmitting uplink positioning reference signals, or the combination thereof based on the indication of the common set of positioning reference signals.

In one implementation, a non-transitory storage medium including program code stored thereon, the program code is operable to configure at least one processor in a first user equipment (UE) in a plurality of UEs to support joint positioning of the plurality of UEs, includes program code to send to a location server a recommendation for downlink positioning reference signals from one or more base stations to be measured by each UE in the plurality of UEs, uplink positioning reference signals from the plurality of UEs to be measured by the one or more base stations, sidelink positioning reference signals from UEs in the plurality of UEs to be measured by other UEs in the plurality of UEs, or a combination thereof for joint positioning of the plurality of UEs, wherein the location server selects a common set of positioning reference signals for measurement based on the recommendation, the common set of positioning reference signals comprising selected downlink positioning reference signals, uplink positioning reference signals, sidelink positioning reference signals, or a combination thereof; program code to receive a message from the location server comprising an indication of the common set of positioning reference signals for measurement by the first UE; program code to perform positioning measurements of the downlink positioning reference signals, the sidelink positioning reference signals, transmitting uplink positioning reference signals, or the combination thereof based on the indication of the common set of positioning reference signals.

In one implementation, a method for supporting joint positioning of a plurality of user equipments (UEs) performed by a location server, includes receiving, from one or more UEs from the plurality of UEs, an indication of a common set of positioning reference signals for measurement, the common set of positioning reference signals comprising downlink positioning reference signals from one or more base stations to be measured by each UE in the plurality of UEs, uplink positioning reference signals from the plurality of UEs to be measured by the one or more base stations, sidelink positioning reference signals from UEs in the plurality of UEs to be measured by other UEs in the plurality of UEs, or a combination thereof; receiving location information from one or more of each UE in the plurality of UEs, the one or more base stations, or a combination thereof, the location information comprising downlink positioning reference signal measurements, uplink positioning reference signal measurements, round trip time measurements, sidelink positioning reference signal measurements, or the combination thereof generated from the common set of positioning reference signals; and determining jointly a position estimate for each UE using the location information received.

In one implementation, a location server configured to support joint positioning of a plurality of user equipments (UEs), includes a communications interface configured to communicate with entities in a wireless network; at least one memory; and at least one processor coupled to the communications interface and the at least one memory, wherein the at least one processor is configured to: receive, from one or more UEs from the plurality of UEs via the communications interface, an indication of a common set of positioning reference signals for measurement, the common set of positioning reference signals comprising downlink positioning reference signals from one or more base stations to be measured by each UE in the plurality of UEs, uplink positioning reference signals from the plurality of UEs to be measured by the one or more base stations, sidelink positioning reference signals from UEs in the plurality of UEs to be measured by other UEs in the plurality of UEs, or a combination thereof; receive, via the communications interface, location information from one or more of each UE in the plurality of UEs, the one or more base stations, or a combination thereof, the location information comprising downlink positioning reference signal measurements, uplink positioning reference signal measurements, round trip time measurements, sidelink positioning reference signal measurements, or the combination thereof generated from the common set of positioning reference signals; and determine jointly a position estimate for each UE using the location information received.

In one implementation, a location server configured to support joint positioning of a plurality of user equipments (UEs), includes means for receiving, from one or more UEs from the plurality of UEs, an indication of a common set of positioning reference signals for measurement, the common set of positioning reference signals comprising downlink positioning reference signals from one or more base stations to be measured by each UE in the plurality of UEs, uplink positioning reference signals from the plurality of UEs to be measured by the one or more base stations, sidelink positioning reference signals from UEs in the plurality of UEs to be measured by other UEs in the plurality of UEs, or a combination thereof; means for receiving location information from one or more of each UE in the plurality of UEs, the one or more base stations, or a combination thereof, the location information comprising downlink positioning reference signal measurements, uplink positioning reference signal measurements, round trip time measurements, sidelink positioning reference signal measurements, or the combination thereof generated from the common set of positioning reference signals; and means for determining jointly a position estimate for each UE using the location information received.

In one implementation, a non-transitory storage medium including program code stored thereon, the program code is operable to configure at least one processor in a location server to support joint positioning of a plurality of user equipments (UEs), includes program code to receive, from one or more UEs from the plurality of UEs, an indication of a common set of positioning reference signals for measurement, the common set of positioning reference signals comprising downlink positioning reference signals from one or more base stations to be measured by each UE in the plurality of UEs, uplink positioning reference signals from the plurality of UEs to be measured by the one or more base stations, sidelink positioning reference signals from UEs in the plurality of UEs to be measured by other UEs in the plurality of UEs, or a combination thereof; program code to receive location information from one or more of each UE in the plurality of UEs, the one or more base stations, or a combination thereof, the location information comprising downlink positioning reference signal measurements, uplink positioning reference signal measurements, round trip time measurements, sidelink positioning reference signal measurements, or the combination thereof generated from the common set of positioning reference signals; and program code to determine jointly a position estimate for each UE using the location information received.

In one implementation, a method for supporting joint positioning of a plurality of user equipments (UEs) performed by a first UE in the plurality of UEs, includes receiving from a location server an identification of the plurality of UEs and an indication that the plurality of UEs is included in a joint positioning session; sending to the location server an indication of a common set of positioning reference signals for measurement, the common set of positioning reference signals comprising downlink positioning reference signals from one or more base stations to be measured by each UE in the plurality of UEs, uplink positioning reference signals from the plurality of UEs to be measured by the one or more base stations, sidelink positioning reference signals from UEs in the plurality of UEs to be measured by other UEs in the plurality of UEs, or a combination thereof; performing positioning measurements of the downlink positioning reference signals, the sidelink positioning reference signals from the common set of positioning reference signals, transmitting uplink positioning reference signals, or the combination thereof from the common set of positioning reference signals.

In one implementation, a first user equipment (UE) in a plurality of UEs configured to support joint positioning of a plurality of user equipments (UEs), includes a wireless transceiver configured to communicate with entities in a wireless network; at least one memory; and at least one processor coupled to the wireless transceiver and the at least one memory, wherein the at least one processor is configured to: receive from a location server, via the wireless transceiver, an identification of the plurality of UEs and an indication that the plurality of UEs is included in a joint positioning session; send to the location server, via the wireless transceiver, an indication of a common set of positioning reference signals for measurement, the common set of positioning reference signals comprising downlink positioning reference signals from one or more base stations to be measured by each UE in the plurality of UEs, uplink positioning reference signals from the plurality of UEs to be measured by the one or more base stations, sidelink positioning reference signals from UEs in the plurality of UEs to be measured by other UEs in the plurality of UEs, or a combination thereof; perform positioning measurements of the downlink positioning reference signals, the sidelink positioning reference signals from the common set of positioning reference signals, transmitting uplink positioning reference signals, or the combination thereof from the common set of positioning reference signals.

In one implementation, a first user equipment (UE) in a plurality of UEs configured to support joint positioning of a plurality of user equipments (UEs), includes means for receiving from a location server an identification of the plurality of UEs and an indication that the plurality of UEs is included in a joint positioning session; means for sending to the location server an indication of a common set of positioning reference signals for measurement, the common set of positioning reference signals comprising downlink positioning reference signals from one or more base stations to be measured by each UE in the plurality of UEs, uplink positioning reference signals from the plurality of UEs to be measured by the one or more base stations, sidelink positioning reference signals from UEs in the plurality of UEs to be measured by other UEs in the plurality of UEs, or a combination thereof; means for performing positioning measurements of the downlink positioning reference signals, the sidelink positioning reference signals from the common set of positioning reference signals, transmitting uplink positioning reference signals, or the combination thereof from the common set of positioning reference signals.

In one implementation, a non-transitory storage medium including program code stored thereon, the program code is operable to configure at least one processor in a first user equipment (UE) in a plurality of UEs to support joint positioning of a plurality of user equipments (UEs), includes program code to receive from a location server an identification of the plurality of UEs and an indication that the plurality of UEs is included in a joint positioning session; program code to send to the location server an indication of a common set of positioning reference signals for measurement, the common set of positioning reference signals comprising downlink positioning reference signals from one or more base stations to be measured by each UE in the plurality of UEs, uplink positioning reference signals from the plurality of UEs to be measured by the one or more base stations, sidelink positioning reference signals from UEs in the plurality of UEs to be measured by other UEs in the plurality of UEs, or a combination thereof; program code to perform positioning measurements of the downlink positioning reference signals, the sidelink positioning reference signals from the common set of positioning reference signals, transmitting uplink positioning reference signals, or the combination thereof from the common set of positioning reference signals.

BRIEF DESCRIPTION OF THE DRAWINGS

FIG. 12 shows a flowchart for an exemplary method to support joint positioning of a plurality of UEs, in a manner consistent with disclosed implementation

DETAILED DESCRIPTION

Figure 1:
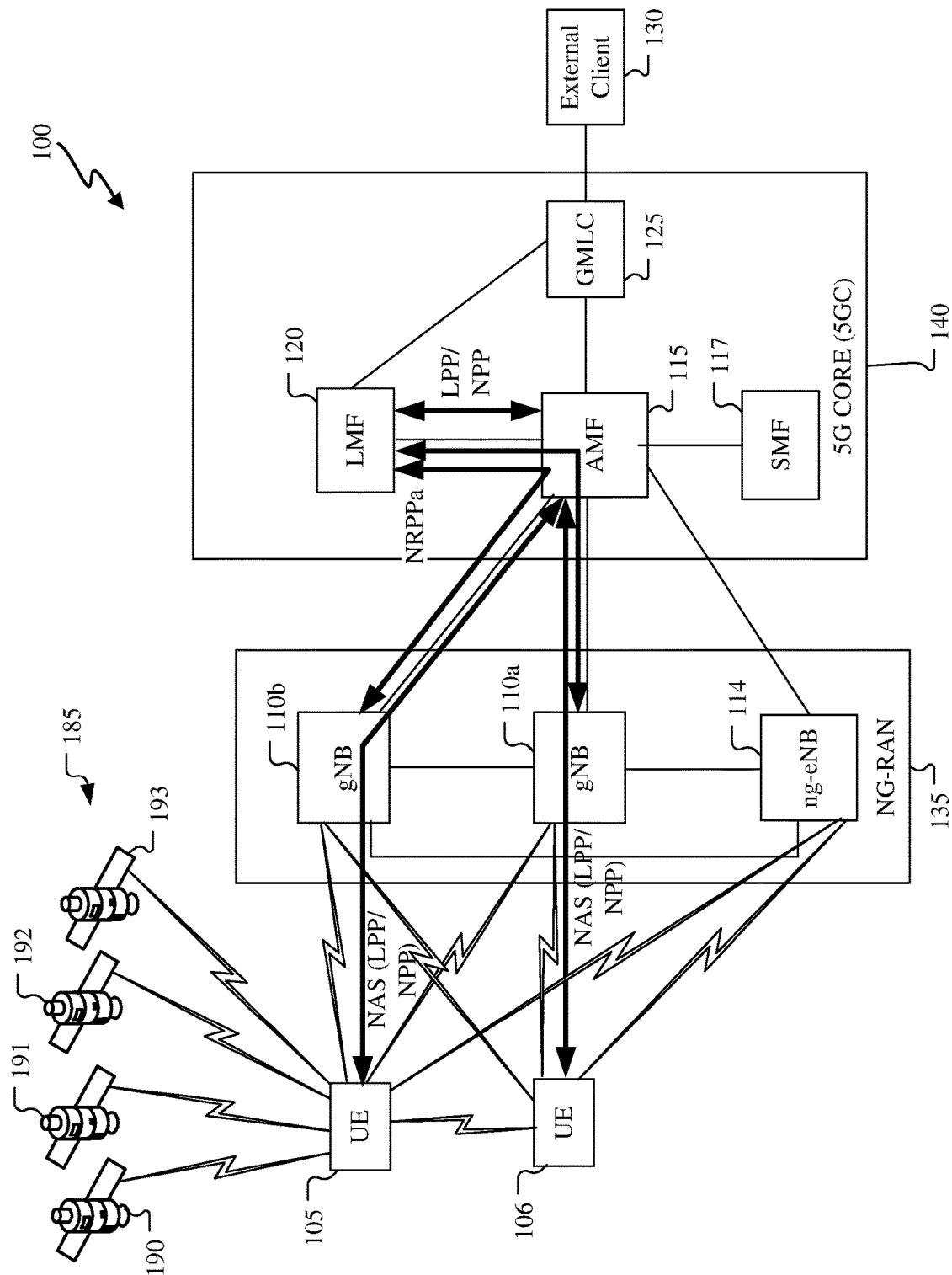
FIG. 1 shows an architecture of communication system including a number of UEs, a Radio Access Network (RAN), and a 5G Core Network (5GC).

Techniques are discussed herein for a joint positioning session for a plurality of user equipments (UEs) using a common set of positioning reference signals (PRS) for measurement by a plurality of UEs. The common set of PRS may be downlink (DL) PRS to be measured by each UE in the plurality of UEs, sidelink (SL) PRS from UEs in the plurality of UEs to be measured by other UEs in the plurality of UEs, or a combination thereof. The common set of PRS may be one or more of PRS resource identifiers (IDs), PRS resource set IDs, transmission point (TRP) IDs, Cell IDs, SL-PRS IDs, UE IDs, Subscriber Identity Modules (SIMs), or any combination thereof. The common set of PRS may be selected by a location server or selected by one or more UEs in the plurality of UEs. By using a common set of PRS, the connection density of the wireless network is increased, which provides superior positioning performance compared to a sparsely connected wireless network, such as when the UEs have no or only few PRS measurements in common.

The description may refer to sequences of actions to be performed, for example, by elements of a computing device. Various actions described herein can be performed by specific circuits (e.g., an application specific integrated circuit (ASIC)), by program instructions being executed by one or more processors, or by a combination of both. Sequences of actions described herein may be embodied within a non-transitory computer-readable medium having stored thereon a corresponding set of computer instructions that upon execution would cause an associated processor to perform the functionality described herein. Thus, the various aspects described herein may be embodied in a number of different forms, all of which are within the scope of the disclosure, including claimed subject matter.

As used herein, the terms "user equipment" (UE) and "base station" are not specific to or otherwise limited to any particular Radio Access Technology (RAT), unless otherwise noted. In general, such UEs may be any wireless communication device (e.g., a mobile phone, router, tablet computer, laptop computer, tracking device, Internet of Things (IoT) device, etc.) used by a user to communicate over a wireless communications network. A UE may be mobile or may (e.g., at certain times) be stationary, and may communicate with a Radio Access Network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, WiFi networks (e.g., based on IEEE 802.11, etc.) and so on.

A base station may operate according to one of several RATs in communication with UEs depending on the network in which it is deployed, and may be alternatively referred to as an Access Point (AP), a Network Node, a NodeB, an evolved NodeB (eNB), a general Node B (gNodeB, gNB), etc. In addition, in some systems a base station may provide purely edge node signaling functions while in other systems it may provide additional control and/or network management functions.

UEs may be embodied by any of a number of types of devices including but not limited to printed circuit (PC) cards, compact flash devices, external or internal modems, wireless or wireline phones, smartphones, tablets, tracking devices, asset tags, and so on. A communication link through which UEs can send signals to a RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). A communication link through which UEs can send signals to other UEs is called a sidelink channel. As used herein the term traffic channel (TCH) can refer to either an uplink/reverse or downlink/forward or sidelink traffic channel As used herein, the term "cell" or "sector" may correspond to one of a plurality of cells of a base station, or to the base station itself, depending on the context. The term "cell" may refer to a logical communication entity used for communication with a base station (for example, over a carrier), and may be associated with an identifier for distinguishing neighboring cells (for example, a physical cell identifier (PCID), a virtual cell identifier (VCID)) operating via the same or a different carrier. In some examples, a carrier may support multiple cells, and different cells may be configured according to different protocol types (for example, machine-type communication (MTC), narrowband Internet-of-Things (NB-IoT), enhanced mobile broadband (eMBB), or others) that may provide access for different types of devices. In some examples, the term "cell" may refer to a portion of a geographic coverage area (for example, a sector) over which the logical entity operates.

FIG. 1 shows an example of a communication system 100 includes a UE 105, a UE 106, a Radio Access Network (RAN) 135, here a Fifth Generation (5G) Next Generation (NG) RAN (NG-RAN), and a 5G Core Network (5GC) 140. The UE 105 and/or the UE 106 may be, e.g., an IoT device, a location tracker device, a cellular telephone, a vehicle, or other device. A 5G network may also be referred to as a New Radio (NR) network; NG-RAN 135 may be referred to as a 5G RAN or as an NR RAN; and 5GC 140 may be referred to as an NG Core network (NGC). Standardization of an NG-RAN and 5GC is ongoing in the 3rd Generation Partnership Project (3GPP). Accordingly, the NG-RAN 135 and the 5GC 140 may conform to current or future standards for 5G support from 3GPP. The RAN 135 may be another type of RAN, e.g., a 3G RAN, a 4G Long Term Evolution (LTE) RAN, etc. The UE 106 may be configured and coupled similarly to the UE 105 to send and/or receive signals to/from similar other entities in the system 100. The communication system 100 may utilize information from a constellation 185 of satellite vehicles (SVs) 190, 191, 192, 193 for a Satellite Positioning System (SPS) (e.g., a Global Navigation Satellite System (GNSS)) like the Global Positioning System (GPS), the Global Navigation Satellite System (GLONASS), Galileo, or Beidou or some other local or regional SPS such as the Indian Regional Navigational Satellite System (IRNSS), the European Geostationary Navigation Overlay Service (EGNOS), or the Wide Area Augmentation System (WAAS). Additional components of the communication system 100 are described below. The communication system 100 may include additional or alternative components.

As shown in FIG. 1, the NG-RAN 135 includes NR nodeBs (gNBs) 110*a*, 110*b*, and a next generation eNodeB (ng-eNB) 114, and the 5GC 140 includes an Access and Mobility Management Function (AMF) 115, a Session Management Function (SMF) 117, a Location Management Function (LMF) 120, and a Gateway Mobile Location Center (GMLC) 125. The gNBs 110*a*, 110*b* and the ng-eNB 114 are communicatively coupled to each other, are each configured wirelessly communicate to bi-directionally with the UE 105 and UE 106, and are each communicatively coupled to, and configured to bi-directionally communicate with, the AMF 115. The gNBs 110*a*, 110*b*, and the ng-eNB 114 may be referred to as base stations (BSs). The AMF 115, the SMF 117, the LMF 120, and the GMLC 125 are communicatively coupled to each other, and the GMLC 125 is communicatively coupled to an external client 130. The SMF 117 may serve as an initial contact point of a Service Control Function (SCF) (not shown) to create, control, and delete media sessions. The BSs 110*a*, 110*b*, 114 may be a macro cell (e.g., a high-power cellular base station), or a small cell (e.g., a low-power cellular base station), or an access point (e.g., a short-range base station configured to communicate with short-range technology such as WiFi, WiFi-Direct (WiFi-D), Bluetooth®, Bluetooth®-low energy (BLE), Zigbee, etc. One or more of the BSs 110*a*, 110*b*, 114 may be configured to communicate with the UEs 105 and 106 via multiple carriers. Each of the BSs 110*a*, 110*b*, 114 may provide communication coverage for a respective geographic region, e.g., a cell. Each cell may be partitioned into multiple sectors as a function of the base station antennas.

FIG. 1 provides a generalized illustration of various components, any or all of which may be utilized as appropriate, and each of which may be duplicated or omitted, as necessary. Specifically, although only UEs 105 and 106 are illustrated, many UEs (e.g., hundreds, thousands, millions, etc.) may be utilized in the communication system 100. Similarly, the communication system 100 may include a larger (or smaller) number of SVs (i.e., more or fewer than the four SVs 190-193 shown), gNBs 110*a*, 110*b*, ng-eNBs 114, AMFs 115, external clients 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1 illustrates a 5G-based network, similar network implementations and configurations may be used for other communication technologies, such as 3G, Long Term Evolution (LTE), etc. Implementations described herein (be they for 5G technology and/or for one or more other communication technologies and/or protocols) may be used to transmit (or broadcast) directional synchronization signals, receive and measure directional signals at UEs (e.g., the UEs 105, 106) or at BSs 110*a*, 110*b*, 114 and/or provide location assistance to the UEs 105, 106 (via the GMLC 125 or other location server) and/or compute a location for the UEs 105, 106 at a location-capable device such as the UEs 105, 106, the BSs 110*a*, 110*b*, or the LMF 120 based on measurement quantities received at the UEs 105, 106 or the BSs 110*a*, 110*b*, 114 for such directionally-transmitted signals. The gateway mobile location center (GMLC) 125, the location management function (LMF) 120, the access and mobility management function (AMF) 115, the SMF 117, the ng-eNB (eNodeB) 114 and the gNBs (gNodeBs) 110*a*, 110*b* are examples and may, in various embodiments, be replaced by or include various other location server functionality and/or base station functionality, respectively.

The system 100 is capable of wireless communication in that components of the system 100 can communicate with one another (at least sometimes using wireless connections) directly or indirectly, e.g., via the BSs 110*a*, 110*b*, 114 and/or the network 140 (and/or one or more other devices not shown, such as one or more other base transceiver stations). For indirect communications, the communications may be altered during transmission from one entity to another, e.g., to alter header information of data packets, to change format, etc. The UEs 105, 106 may include multiple UEs and may be a mobile wireless communication device but may communicate wirelessly and via wired connections. The UEs 105, 106 may be any of a variety of devices, e.g., a smartphone, a tablet computer, a vehicle-based device, etc., but these are examples only as the UEs 105, 106 is not required to be any of these configurations, and other configurations of UEs may be used. Other UEs may include wearable devices (e.g., smart watches, smart jewelry, smart glasses, or headsets, etc.). Still other UEs may be used, whether currently existing or developed in the future. Further, other wireless devices (whether mobile or not) may be implemented within the system 100 and may communicate with each other and/or with the UEs 105, 106, the BSs 110*a*, 110*b*, 114, the core network 140, and/or the external client 130. For example, such other devices may include internet of thing (IoT) devices, medical devices, home entertainment and/or automation devices, etc. The core network 140 may communicate with the external client 130 (e.g., a computer system), e.g., to allow the external client 130 to request and/or receive location information regarding the UEs 105, 106 (e.g., via the GMLC 125).

The UEs 105, 106 or other devices may be configured to communicate in various networks and/or for various purposes and/or using various technologies (e.g., 5G, Wi-Fi communication, multiple frequencies of Wi-Fi communication, satellite positioning, one or more types of communications (e.g., GSM (Global System for Mobiles), CDMA (Code Division Multiple Access), LTE (Long-Term Evolution), V2X (e.g., V2P (Vehicle-to-Pedestrian), V2I (Vehicle-to-Infrastructure), V2V (Vehicle-to-Vehicle), etc.), IEEE 802.11p, etc.). V2X communications may be cellular (Cellular-V2X (C-V2X)) and/or WiFi (e.g., DSRC (Dedicated Short-Range Connection)). The system 100 may support operation on multiple carriers (waveform signals of different frequencies). Multi-carrier transmitters can transmit modulated signals simultaneously on the multiple carriers. Each modulated signal may be a Code Division Multiple Access (CDMA) signal, a Time Division Multiple Access (TDMA) signal, an Orthogonal Frequency Division Multiple Access (OFDMA) signal, a Single-Carrier Frequency Division Multiple Access (SC-FDMA) signal, etc. Each modulated signal may be sent on a different carrier and may carry pilot, overhead information, data, etc. The UEs 105, 106 may communicate with each other through UE-to-UE sidelink (SL) communications by transmitting over one or more sidelink channels, such as a physical sidelink synchronization channel (PSSCH), a physical sidelink broadcast channel (PSBCH), a physical sidelink control channel (PSCCH), sidelink channel state information reference signal (SL-CSIRS), physical sidelink feedback channel (PSFCH), or sidelink sounding reference signals (SL-SRS).

The UEs 105, 106 may comprise and/or may be referred to as a device, a mobile device, a wireless device, a mobile terminal, a terminal, a mobile station (MS), a Secure User Plane Location (SUPL) Enabled Terminal (SET), or by some other name. Moreover, the UEs 105, 106 may correspond to a cellphone, smartphone, laptop, tablet, PDA, tracking device, navigation device, Internet of Things (IoT) device, asset tracker, health monitors, security systems, smart city sensors, smart meters, wearable trackers, or some other portable or moveable device. Typically, though not necessarily, the UEs 105, 106 may support wireless communication using one or more Radio Access Technologies (RATs) such as Global System for Mobile communication (GSM), Code Division Multiple Access (CDMA), Wideband CDMA (WCDMA), LTE, High Rate Packet Data (HRPD), IEEE 802.11 WiFi (also referred to as Wi-Fi), Bluetooth® (BT), Worldwide Interoperability for Microwave Access (WiMAX), 5G new radio (NR) (e.g., using the NG-RAN 135 and the 5GC 140), etc. The UEs 105, 106 may support wireless communication using a Wireless Local Area Network (WLAN) which may connect to other networks (e.g., the Internet) using a Digital Subscriber Line (DSL) or packet cable, for example. The use of one or more of these RATs may allow the UEs 105, 106 to communicate with the external client 130 (e.g., via elements of the 5GC 140 not shown in FIG. 1, or possibly via the GMLC 125) and/or allow the external client 130 to receive location information regarding the UEs 105, 106 (e.g., via the GMLC 125).

Each of the UEs 105, 106 may include a single entity or may include multiple entities such as in a personal area network where a user may employ audio, video and/or data I/O (input/output) devices and/or body sensors and a separate wireline or wireless modem. An estimate of a location of a UE, e.g., UE 105 or UE 106, may be referred to as a location, location estimate, location fix, fix, position, position estimate, or position fix, and may be geographic, thus providing location coordinates for the UE (e.g., latitude and longitude) which may or may not include an altitude component (e.g., height above sea level, height above or depth below ground level, floor level, or basement level). Alternatively, a location of the UE may be expressed as a civic location (e.g., as a postal address or the designation of some point or small area in a building such as a particular room or floor). A location of the UE may be expressed as an area or volume (defined either geographically or in civic form) within which the UE is expected to be located with some probability or confidence level (e.g., 67%, 95%, etc.). A location of the UE may be expressed as a relative location comprising, for example, a distance and direction from a known location. The relative location may be expressed as relative coordinates (e.g., X, Y (and Z) coordinates) defined relative to some origin at a known location which may be defined, e.g., geographically, in civic terms, or by reference to a point, area, or volume, e.g., indicated on a map, floor plan, or building plan. In the description contained herein, the use of the term location may comprise any of these variants unless indicated otherwise. When computing the location of a UE, it is common to solve for local x, y, and possibly z coordinates and then, if desired, convert the local coordinates into absolute coordinates (e.g., for latitude, longitude, and altitude above or below mean sea level).

The UEs 105, 106 may be configured to communicate with other entities using one or more of a variety of technologies. The UEs 105, 106 may be configured to connect indirectly to one or more communication networks via one or more device-to-device (D2D) peer-to-peer (P2P) links. The D2D P2P links may be supported with any appropriate D2D radio access technology (RAT), such as LTE Direct (LTE-D), WiFi Direct (WiFi-D), Bluetooth®, and so on. One or more of a group of UEs utilizing D2D communications may be within a geographic coverage area of a Transmission/Reception Point (TRP) such as one or more of the gNBs 110*a*, 110*b*, and/or the ng-eNB 114. Other UEs in such a group may be outside such geographic coverage areas or may be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP. One or more of a group of UEs utilizing D2D communications may be within a geographic coverage area of a TRP. Other UEs in such a group may be outside such geographic coverage areas or be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP.

Base stations (BSs) in the NG-RAN 135 shown in FIG. 1 include NR Node Bs, referred to as the gNBs 110*a* and 110*b*. Pairs of the gNBs 110*a*, 110*b* in the NG-RAN 135 may be connected to one another via one or more other gNBs. Access to the 5G network is provided to the UEs 105, 106 via wireless communication between the UEs and one or more of the gNBs 110*a*, 110*b*, which may provide wireless communications access to the 5GC 140 on behalf of the UE using 5G. In FIG. 1, the serving gNB for the UE is assumed to be the gNB 110*b*, while the serving gNB for the UE 106 is assumed to be the gNB 110*a*, although another gNB may act as a serving gNB if the UEs 105, 106 move to another location or may act as a secondary gNB to provide additional throughput and bandwidth to the UEs 105, 106 and the UEs 105, 106 may share the same serving gNB.

Base stations (BSs) in the NG-RAN 135 shown in FIG. 1 may include the ng-eNB 114, also referred to as a next generation evolved Node B. The ng-eNB 114 may be connected to one or more of the gNBs 110*a*, 110*b* in the NG-RAN 135, possibly via one or more other gNBs and/or one or more other ng-eNBs. The ng-eNB 114 may provide LTE wireless access and/or evolved LTE (eLTE) wireless access to the UEs 105, 106. One or more of the gNBs 110*a*, 110*b* and/or the ng-eNB 114 may be configured to function as positioning-only beacons which may transmit signals to assist with determining the position of the UEs 105, 106 but may not receive signals from the UEs 105, 106 or from other UEs.

The BSs 110*a*, 110*b*, 114 may each comprise one or more TRPs. For example, each sector within a cell of a BS may comprise a TRP, although multiple TRPs may share one or more components (e.g., share a processor but have separate antennas). The system 100 may include only macro TRPs or the system 100 may have TRPs of different types, e.g., macro, pico, and/or femto TRPs, etc. A macro TRP may cover a relatively large geographic area (e.g., several kilometers in radius) and may allow unrestricted access by terminals with service subscription. A pico TRP may cover a relatively small geographic area (e.g., a pico cell) and may allow unrestricted access by terminals with service subscription. A femto or home TRP may cover a relatively small geographic area (e.g., a femto cell) and may allow restricted access by terminals having association with the femto cell (e.g., terminals for users in a home).

Communications system 100 may support NR and support communications between the one or more base stations 110a, 110b, 114 and supported UEs 105 and 106. The UEs may be dispersed throughout the wireless communications system 100, and each UE may be stationary or mobile. As part of the communication, each of the base stations 110a, 110b, 114 and UEs 105 and 106 may support reference signal transmission for operations, including channel estimation, beam management and scheduling, and wireless device positioning within the coverage areas of one or more base stations.

For example, the base stations 110a, 110b, 114 may transmit one or more downlink reference signals for NR communications, including channel state information reference signal (CSI-RS) transmission. Each of the CSI-RS transmissions may be configured for a specific UE 105, 106 to estimate the channel and report channel quality information. The reported channel quality information may be used for scheduling or link adaptation at the base stations 110a, 110b, 114 or as part of a mobility or beam management procedure for directional transmission associated with the enhanced channel resources. Similarly, the UEs 105 and 106 may be configured to transmit uplink signals to one or more base stations 110a, 110b, 114 and sidelink transmissions between UEs 105 and 106.

The base stations 110a, 110b, 114 may transmit one or more additional downlink reference signals, including a positioning reference signal (PRS) transmission. The PRS transmission may be configured for a specific UE 105, 106, UE 106 to measure and report one or more report parameters (for example, report quantities) associated with positioning and location information. The PRS transmission and report parameter feedback may support various location services (for example, navigation systems and emergency communications). In some examples, the report parameters supplement one or more additional location systems supported by the UE 105, 106 (such as global positioning system (GPS) technology).

A base station 110a, 110b, 114 may configure a PRS transmission on one or more PRS resources of a channel. A PRS resource may span resource elements of multiple physical resource blocks (PRBs) within one or more OFDM symbols of a slot depending on a configured number of ports. For example, a PRS resource may span one symbol of a slot and contain one port for transmission. In any OFDM symbol, the PRS resources may occupy consecutive PRBs. In some examples, the PRS transmission may be mapped to consecutive OFDM symbols of the slot. In other examples, the PRS transmission may be mapped to interspersed OFDM symbols of the slot. Additionally, the PRS transmission may support frequency hopping within PRBs of the channel The one or more PRS resources may span a number of PRS resource sets according to a PRS resource setting of the base station 110a, 110b, 114. The structure of the one or more PRS resources, PRS resource sets, and PRS resource settings within a PRS transmission may be referred to as a multi-level resource setting. For example, multi-level PRS resource setting of the base station 110a, 110b, 114 may include multiple PRS resource sets and each PRS resource set may contain a set of PRS resources (such as a set of 4 PRS resources).

The UEs 105, 106 may receive the PRS transmission over the one or more PRS resources of the slot. The UEs 105, 106 may determine a report parameter for at least some of if not each PRS resource included in the transmission. The report parameter (which may include a report quantity) for each PRS resource may include one or more of a time of arrival (TOA), a reference signal time difference (RSTD), a reference signal receive power (RSRP), an angle, a PRS identification number, a reception to transmission difference (UE Rx-Tx), a signal-to-noise ratio (SNR), or a reference signal receive quality (RSRQ).

Similarly, the UEs 105, 106 may be configured to transmit one or more additional uplink reference signals that may be received by base stations 110a, 110b, 114 and used for positioning. For example, UEs 105 may transmit sounding reference signal (SRS) for positioning. Base stations 110a, 110b, 114 that receive uplink reference signals from a UEs 105, 106 may perform positioning measurements, such as one or more of a time of arrival (TOA), reception to transmission difference (UE Rx-Tx).

Aspects of wireless communications system 100 may include use of downlink PRS transmissions by the base station 110a, 110b, 114 or uplink SRS transmissions by a UE, e.g., UE 105 or UE 106, for UE location determination. For downlink-based UE location determination, a location server, e.g., LMF 120 in a NR network, or E-SMLC in LTE (sometimes referred to as location server 120), may be used to provide positioning assistance, such as PRS assistance data (AD) to the UE. In UE-assisted positioning, the location server may receive measurement reports from the UE that indicates position measurements for one or multiple base stations 110a, 110b, 114 with which location server may determine a position estimate for the UE, e.g., using TDOA, or other desired techniques. The location server 120 is illustrated in FIG. 1 as being located in the core network 140, but may be external to the core network 140, e.g., in an NG-RAN.

A position estimation of the UE may be determined using reference signals, such as PRS signals or SRS for positioning signals, or other reference signals, from one or more base stations 110a, 110b, 114 or the UE. Positioning methods, such as Time Difference of Arrival (TDOA), DL Time Difference of Arrival (DL-TDOA), DL Angle of Departure (DL AoD), Enhanced Cell ID (ECID) are position methods that may be used to estimate the position of the UE using reference signals from base stations. TDOA, for example, relies on measuring Reference Signal Time Differences (RSTDs) between downlink (DL) signals received from a base station for a reference cell and base station(s) for one or more neighbor cells. The DL signals for which RTSDs may be obtained comprise a Cell-specific Reference Signal (CRS) and a Positioning Reference Signal (PRS)—e.g., as defined in 3GPP TS 36.211.

Other positioning methods may use reference signals transmitted by the UE including uplink based positioning methods and downlink and uplink based positioning methods. For example, uplink based positioning methods include, e.g., UL Time Difference of Arrival (UL-TDOA), UL Angle of Arrival (UL AoA), UL Relative Time of Arrival (UL-RTOA) and downlink and uplink based positioning methods, e.g., Round-trip time (RTT) with one or more neighboring base stations. Additionally, sidelink based positioning may be used in which UEs transmit and/or receive sidelink positioning reference signals that are measured and used for positioning.

As noted, while FIG. 1 depicts nodes configured to communicate according to 5G communication protocols, nodes configured to communicate according to other communication protocols, such as, for example, an LTE protocol or IEEE 802.11x protocol, may be used. For example, in an Evolved Packet System (EPS) providing LTE wireless access to the UEs 105, 106, a RAN may comprise an Evolved Universal Mobile Telecommunications System (UMTS) Terrestrial Radio Access Network (E-UTRAN) which may comprise base stations comprising evolved Node Bs (eNBs). A core network for EPS may comprise an Evolved Packet Core (EPC). An EPS may comprise an E-UTRAN plus EPC, where the E-UTRAN corresponds to the NG-RAN 135 and the EPC corresponds to the 5GC 140 in FIG. 1.

The gNBs 110a, 110b and the ng-eNB 114 may communicate with the AMF 115, which, for positioning functionality, communicates with the LMF 120. The AMF 115 may support mobility of the UEs 105, 106, including cell change and handover and may participate in supporting a signaling connection to the UEs 105, 106 and possibly data and voice bearers for the UEs 105, 106. The LMF 120 may communicate directly with the UEs 105, 106, e.g., through wireless communications, or directly with the BSs 110a, 110b, 114. The LMF 120 may support positioning of the UEs 105, 106 when the UEs 105, 106 accesses the NG-RAN 135 and may support position procedures/methods such as Assisted GNSS (A-GNSS), Time Difference of Arrival (TDOA) (e.g., Downlink (DL) TDOA or Uplink (UL) TDOA), Real Time Kinematics (RTK), Precise Point Positioning (PPP), Differential GNSS (DGNSS), Enhanced Cell ID (E-CID), angle of arrival (AOA), angle of departure (AOD), and/or other position methods. The LMF 120 may process location services requests for the UEs 105, 106, e.g., received from the AMF 115 or from the GMLC 125. The LMF 120 may be connected to the AMF 115 and/or to the GMLC 125. The LMF 120 may be referred to by other names such as a Location Manager (LM), Location Function (LF), commercial LMF (CLMF), or value added LMF (VLMF). A node/system that implements the LMF 120 may additionally or alternatively implement other types of location-support modules, such as an Enhanced Serving Mobile Location Center (E-SMLC) or a Secure User Plane Location (SUPL) Location Platform (SLP). At least part of the positioning functionality (including derivation of the location of the UE) may be performed at the UE (e.g., using signal measurements obtained by the UE for signals transmitted by wireless nodes such as the gNBs 110a, 110b and/or the ng-eNB 114, and/or assistance data provided to the UE, e.g., by the LMF 120). At least part of the positioning functionality (including derivation of the location of the UE) alternatively may be performed at the LMF 120 (e.g., using signal measurements obtained by the gNBs 110a, 110b and/or the ng-eNB 114. The AMF 115 may serve as a control node that processes signaling between the UEs 105, 106 and the core network 140, and provides QoS (Quality of Service) flow and session management. The AMF 115 may support mobility of the UEs 105, 106 including cell change and handover and may participate in supporting signaling connection to the UEs 105, 106.

The GMLC 125 may support a location request for the UEs 105, 106 received from the external client 130 and may forward such a location request to the AMF 115 for forwarding by the AMF 115 to the LMF 120 or may forward the location request directly to the LMF 120. A location response from the LMF 120 (e.g., containing a location estimate for the UEs 105, 106) may be returned to the GMLC 125 either directly or via the AMF 115 and the GMLC 125 may then return the location response (e.g., containing the location estimate) to the external client 130. The GMLC 125 is shown connected to both the AMF 115 and LMF 120, though only one of these connections may be supported by the 5GC 140 in some implementations.

As further illustrated in FIG. 1, the LMF 120 may communicate with the gNBs 110a, 110b and/or the ng-eNB 114 using a New Radio Position Protocol A (which may be referred to as NPPa or NRPPa), which may be defined in 3GPP Technical Specification (TS) 38.455. NRPPa may be the same as, similar to, or an extension of the LTE Positioning Protocol A (LPPa) defined in 3GPP TS 36.455, with NRPPa messages being transferred between the gNB 110a (or the gNB 110b) and the LMF 120, and/or between the ng-eNB 114 and the LMF 120, via the AMF 115. As further illustrated in FIG. 1, the LMF 120 and the UEs 105, 106 may communicate using an LTE Positioning Protocol (LPP), which may be defined in 3GPP TS 36.355. The LMF 120 and the UEs 105, 106 may also or instead communicate using a New Radio Positioning Protocol (which may be referred to as NPP or NRPP), which may be the same as, similar to, or an extension of LPP. Here, LPP and/or NPP messages may be transferred between the UEs 105, 106 and the LMF 120 via the AMF 115 and the serving gNB 110a, 110b or the serving ng-eNB 114 for the UEs 105, 106. For example, LPP and/or NPP messages may be transferred between the LMF 120 and the AMF 115 using a 5G Location Services Application Protocol (LCS AP) and may be transferred between the AMF 115 and the UEs 105, 106 using a 5G Non-Access Stratum (NAS) protocol. Communication between the LMF 120 and UEs 105, 106 using LPP protocol, may sometimes referred to herein as direct communication, as the messages are transparent to the serving gNB, i.e., the serving gNB does not need to understand the content of the message, but simply forwards the communication between the LMF 120 and UEs 105,106. In contrast, during communications using NPP protocol, such as NRPPa, the serving gNB unpacks the message, picks out the content, which is packed and sent to UE, e.g., in a Uu air interface via Radio Resource Control (RRC), Medium Access Control—Control Element (MAC-CE), Downlink Control Information (DCI), etc. The LPP and/or NPP protocol may be used to support positioning of the UEs 105, 106 using UE-assisted and/or UE-based position methods such as A-GNSS, RTK, TDOA, AOA, AOD, and/or E-CID. The NRPPa protocol may be used to support positioning of the UEs 105, 106 using network-based position methods such as E-CID (e.g., when used with measurements obtained by the gNB 110a, 110b or the ng-eNB 114) and/or may be used by the LMF 120 to obtain location related information from the gNBs 110a, 110b and/or the ng-eNB 114, such as parameters defining directional Synchronization Signal (SS) transmissions from the gNBs 110a, 110b, and/or the ng-eNB 114. The LMF 120 may be co-located or integrated with a gNB or a TRP, or may be disposed remote from the gNB and/or the TRP and configured to communicate directly or indirectly with the gNB and/or the TRP.

With a UE-assisted position method, the UE, e.g., UE 105 or UE 106 may obtain location measurements and send the measurements to a location server (e.g., the LMF 120) for computation of a location estimate for the UE. For example, the location measurements may include one or more of a Received Signal Strength Indication (RSSI), Round Trip signal propagation Time (RTT), Reference Signal Time Difference (RSTD), Reference Signal Received Power (RSRP) and/or Reference Signal Received Quality (RSRQ), AOA, AOD, for the gNBs 110a, 110b, the ng-eNB 114, and/or a WLAN AP. The location measurements may also or instead include measurements of GNSS pseudorange, code phase, and/or carrier phase for the SVs 190-193.

With a UE-based position method, the UE, e.g., UE 105 or UE 106, may obtain location measurements (e.g., which may be the same as or similar to location measurements for a UE-assisted position method) and may compute a location of the UE (e.g., with the help of assistance data received from a location server such as the LMF 120 or broadcast by the gNBs 110a, 110b, the ng-eNB 114, or other base stations or APs).

With a network-based position method, one or more base stations (e.g., the gNBs 110a, 110b, and/or the ng-eNB 114), sidelink UEs, or APs may obtain location measurements (e.g., measurements of RSSI, RTT, RSRP, RSRQ, AOA, AOD, or Time of Arrival (ToA) for signals transmitted by the UE, e.g., UE 105 or UE 106) and/or may receive measurements obtained by the UE. The one or more base stations or APs may send the measurements to a location server (e.g., the LMF 120) for computation of a location estimate for the UE.

Information provided by the gNBs 110a, 110b, and/or the ng-eNB 114 to the LMF 120 using NRPPa may include timing and configuration information for directional SS transmissions and location coordinates. The LMF 120 may provide some or all of this information to the UEs 105, 106 as assistance data in an LPP and/or NPP message via the NG-RAN 135 and the 5GC 140.

An LPP or NPP message sent from the LMF 120 to the UEs 105, 106 may instruct the UEs 105, 106 to do any of a variety of things depending on desired functionality. For example, the LPP or NPP message could contain an instruction for the UEs 105, 106 to obtain measurements for GNSS (or A-GNSS), WLAN, E-CID, and/or TDOA (or some other position method). In the case of E-CID, the LPP or NPP message may instruct the UEs 105, 106 to obtain one or more measurement quantities (e.g., beam ID, beam width, mean angle, RSRP, RSRQ measurements) of directional signals transmitted within particular cells supported by one or more of the gNBs 110a, 110b, and/or the ng-eNB 114 (or supported by some other type of base station such as an eNB or WiFi AP). The UEs 105, 106 may send the measurement quantities back to the LMF 120 in an LPP or NPP message (e.g., inside a 5G NAS message) via the serving gNB 110a (or the serving ng-eNB 114) and the AMF 115.

As noted, while the communication system 100 is described in relation to 5G technology, the communication system 100 may be implemented to support other communication technologies, such as GSM, WCDMA, LTE, etc., that are used for supporting and interacting with mobile devices such as the UEs 105, 106 (e.g., to implement voice, data, positioning, and other functionalities). In some such embodiments, the 5GC 140 may be configured to control different air interfaces. For example, the 5GC 140 may be connected to a WLAN using a Non-3GPP InterWorking Function (N3IWF, not shown FIG. 1) in the 5GC 150. For example, the WLAN may support IEEE 802.11 WiFi access for the UEs 105, 106 and may comprise one or more WiFi APs. Here, the N3IWF may connect to the WLAN and to other elements in the 5GC 140 such as the AMF 115. In some embodiments, both the NG-RAN 135 and the 5GC 140 may be replaced by one or more other RANs and one or more other core networks. For example, in an EPS, the NG-RAN 135 may be replaced by an E-UTRAN containing eNBs and the 5GC 140 may be replaced by an EPC containing a Mobility Management Entity (MME) in place of the AMF 115, an E-SMLC in place of the LMF 120, and a GMLC that may be similar to the GMLC 125. In such an EPS, the E-SMLC may use LPPa in place of NRPPa to send and receive location information to and from the eNBs in the E-UTRAN and may use LPP to support positioning of the UEs 105, 106. In these other embodiments, positioning of the UEs 105, 106 using directional PRSs may be supported in an analogous manner to that described herein for a 5G network with the difference that functions and procedures described herein for the gNBs 110a, 110b, the ng-eNB 114, the AMF 115, and the LMF 120 may, in some cases, apply instead to other network elements such eNBs, WiFi APs, an MME, and an E-SMLC.

Positioning for UEs in a radio network, such as communication system 100 shown in FIG. 1, typically uses Uu interfaces, i.e., radio interface between the UE and the radio access network, for DL PRS and/or UL PRS. Positioning for UEs may use sidelink PRS (SL-PRS), which may be a specific sidelink defined reference signal for positioning or may reuse Uu PRS, e.g., UL PRS, sometimes referred to as Sounding Reference Signal for positioning (SRSPos), or other reference signals may be transmitted in the sidelink channel. Sidelink positioning may enhance UE positioning by providing an additional transmission (or reception) node.

Figure 2A:
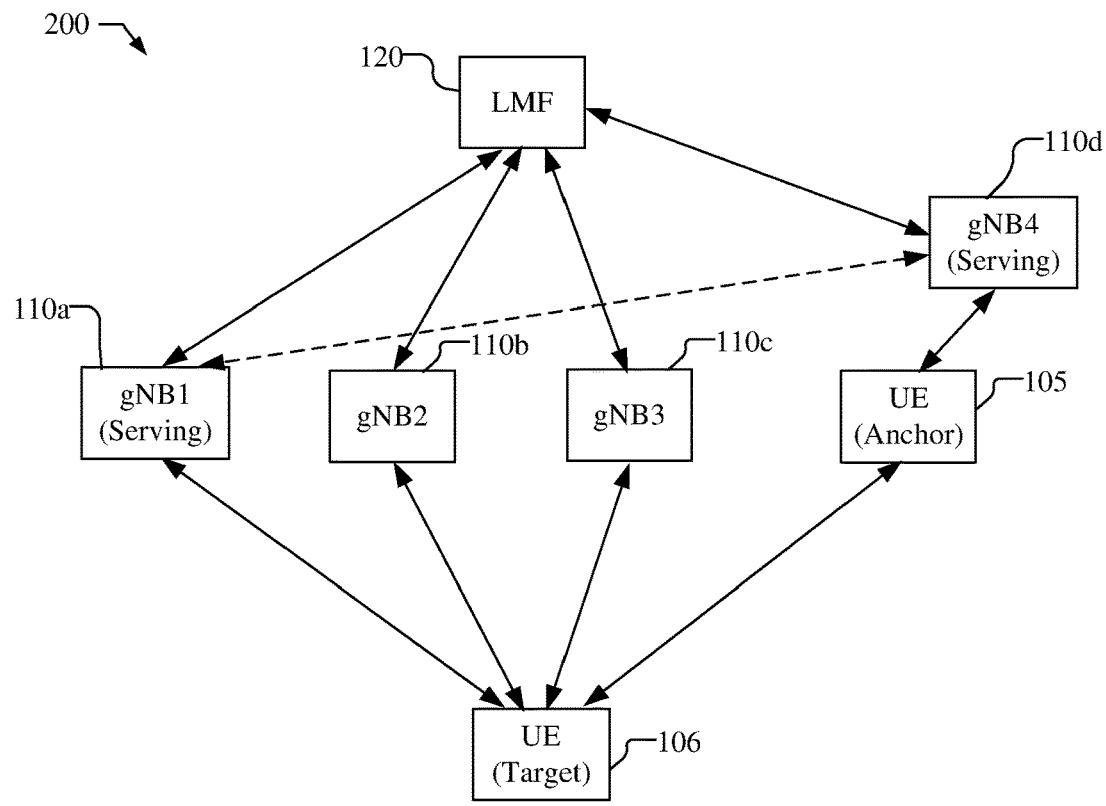
FIG. 2A illustrates the use of sidelink positioning to enhance positioning of a UE in a wireless communications system.

FIG. 2A, for example, illustrates the use of sidelink positioning to enhance positioning of a UE in a wireless communications system 200, in which a position of the target UE 106 may be determined using downlink PRS and/or uplink PRS from/to a number of base stations 110a, 110b, 110c (gNB1, gNB2, gNB3, respectively) with another UE 105 acting as an additional positioning (anchor) node via a sidelink channel with target UE 106. As illustrated, the target UE 106 communicates with a location server (LMF 120) via the serving base station 110a, while the anchor UE 105 communicates with the location server (LMF 120) via a separate serving base station 110d (gNB4), but if desired, anchor UE 105 may communicate to the LMF 120 via the serving base station 110a for the target UE 106. Moreover, while FIG. 2A illustrates a single anchor UE 105, it should be understood that a plurality of anchor UEs may be used if desired.

During a positioning session for the target UE 106, the target UE 106 may receive downlink PRS from and/or transmit uplink PRS to the base stations 110a, 110b, and 110c. The receiving nodes, e.g., target UE 106 and/or each of the base stations 110a, 110b, and 110c, may measure the received positioning reference signals, e.g., using timing based measurements, such as RSTD, ToA, RTT, or angle based measurements, such as AoA or AoD, and report the positioning measurements to the LMF 120. Additionally, the anchor UE 105 and/or the target UE 106 may transmit SL-PRS in the sidelink channel, which may be measured using time based measurements or angle based measurements and reported to the LMF 120 by the UEs 105 and/or 106, via their respective serving base stations 110a and 110d.

The LMF 120 may determine the position of the target UE 106 based on the positioning measurements of the Uu PRS, e.g., DL PRS and/or UL PRS, as measured by the target UE 106 and/or base stations 110a, 110b, and 110c, respectively, and the SL-PRS as measured by the target UE 106 and/or anchor UE 105. The LMF 120 may further use the known positions of the base stations 110a, 110b, and 110c and anchor UE 105 to determine the position of the target UE 106. For example, the LMF 120 may determine ranges between the target UE 106 and the base stations 110a, 110b, and 110c and anchor UE 105, e.g., using TDOA, RTT, etc., and may determine the position of the target UE 106 using the known absolute positions of the base stations 110a, 110b, and 110c and anchor UE 105, e.g., using multilateration.

Figure 2B:
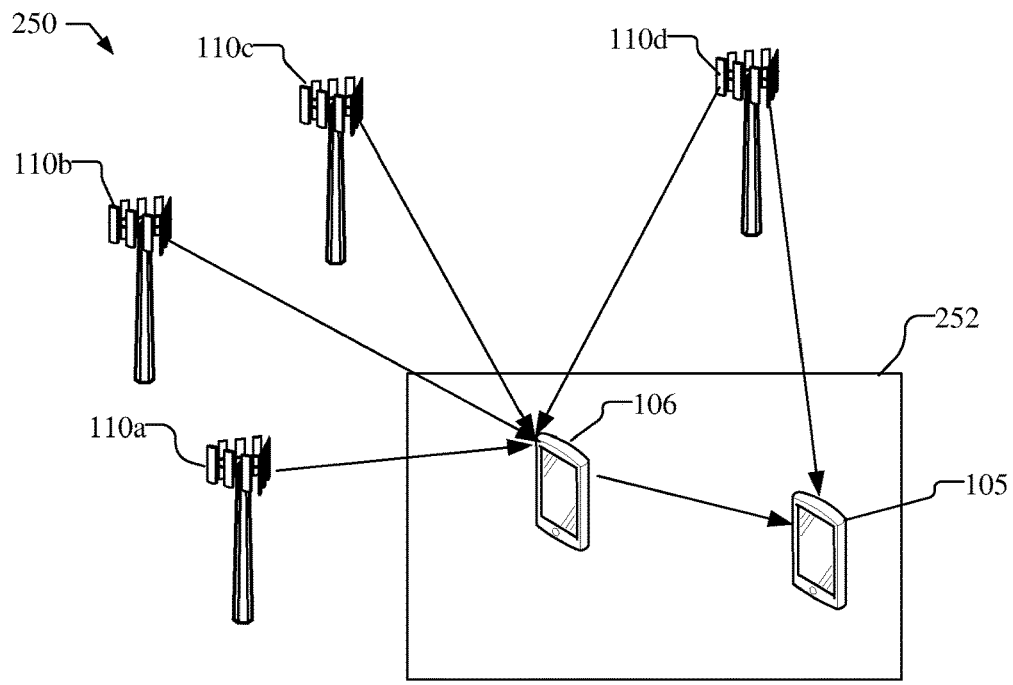
FIG. 2B illustrates joint positioning of UEs in a wireless communications system, in which sidelink positioning between the UEs is used.

FIG. 2B illustrates joint positioning of UEs in a wireless communications system 250, in which sidelink positioning is used to enhance positioning. Both UEs 105 and 106 are jointly positioned (as illustrated by box 252) using downlink PRS and/or uplink PRS from/to a number of base stations 110a, 110b, 110c, and 110d and SL-PRS between the UEs 105 and 106. As illustrated in FIG. 2B, during the joint positioning session, UE 106 measures DL PRS from base stations 110a, 110b, 110c, and 110d, e.g., using timing, angle, or power based measurements, which is reported to the LMF 120 (not shown). The UE 106 further transmits SL-PRS. The UE 105 measures DL PRS from base station 110d and measures the SL-PRS received from UE 106, e.g., using timing, angle, or power based measurements, which is reported to the LMF 120.

During joint positioning, the LMF 120 determines the position of both UE 105 and UE 106 jointly based on the positioning measurements received from UEs 105 and 106 for the measurement of the Uu PRS, e.g., DL PRS from base stations 110a, 110b, 110c, and 110d measured by the UE 106 and DL PRS from base station 110d measured by the UE 105, and the SL-PRS from UE 106 as measured by the UE 105. In joint positioning of the UEs 105 and 106, both UE 105 and 106 are treated as target UEs, and each UE may serve as an anchor node for the other UE. For example, the LMF 120 may determine ranges between the UE 106 and base stations 110a, 110b, 110c, and 110d, and the range between UE 105 and base station 110d, and the range between UEs 105 and 106, e.g., using TDOA, RTT, etc. The LMF 120 may simultaneously determine the positions of UE 105 and 106 using the determined ranges and known absolute positions of the base stations 110a, 110b, 110c, and 110d, e.g., using multilateration.

Figure 3:
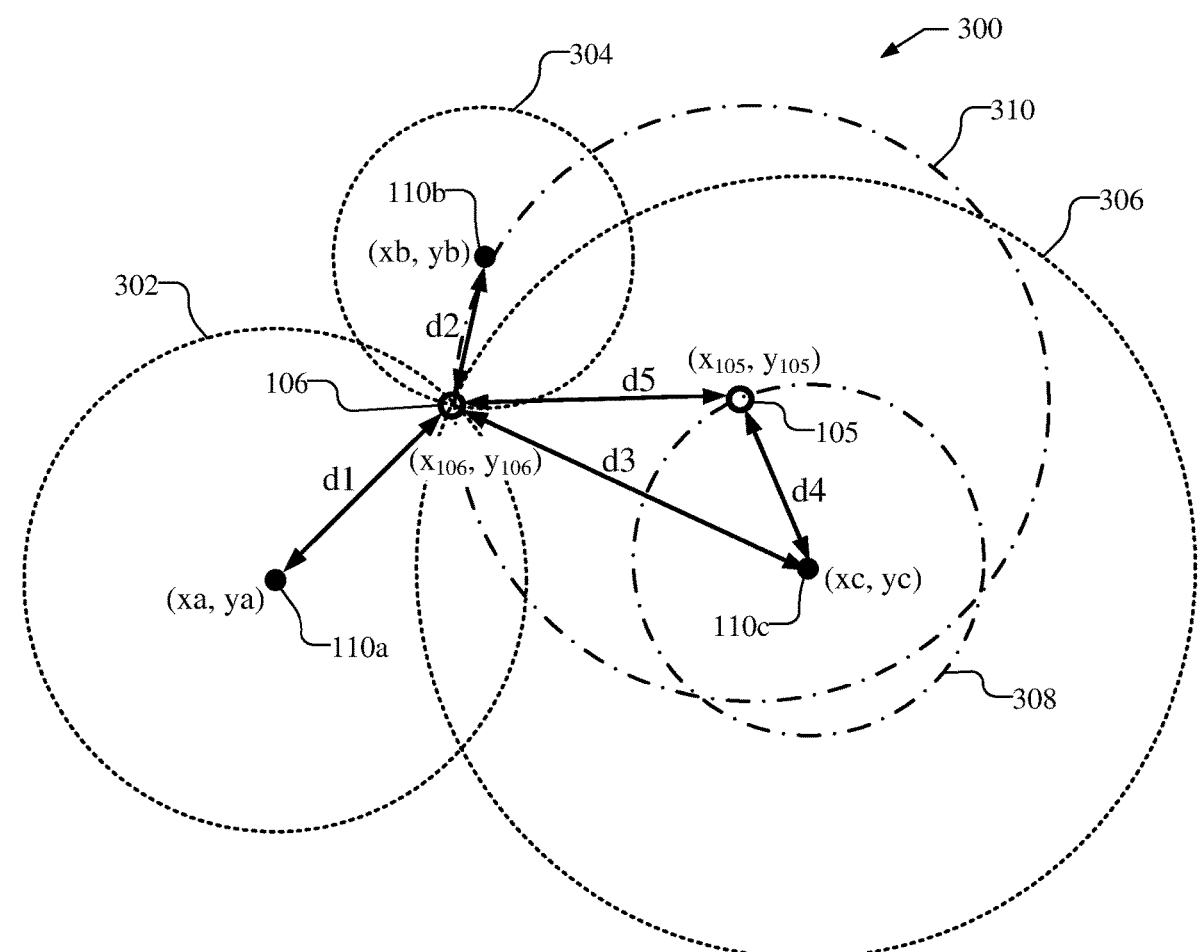
FIG. 3 illustrates a simplified wireless network environment and an exemplary technique for joint positioning of UEs using ranges between the UEs and base stations.

FIG. 3 illustrates a simplified wireless network environment 300 and an exemplary technique for joint positioning of UEs 105 and 106 using ranges between the UEs and base stations, e.g., determined using multi-RTT or other type of PRS measurements. Joint positioning of UEs 105 and 106 may be performed, for example, using multi-dimensional scaling, and may use RTT (as illustrated in FIG. 3), TDOA, double differential RTT, or double differential TDOA (which may be performed in a similar manner as differential GPS), etc. The position of UEs 105 and 106 that is to be jointly determined may be represented in 2 dimensions by Cartesian coordinates $(x_{105}, y_{105})$ and $(x_{106}, y_{106})$, respectively. Ranging measurements may be obtained for one or more anchor points or nodes, illustrated as gNBs, 110a, 110b and 110c, with coordinates (xk, yk), where k=a, b, c, using DL and/or UL PRS measurements. In some implementations, the range between the UEs 105 and 106 may also be obtained based on measurements of SL-PRS between the UEs 105 and 106. A location server, e.g., LMF 120, may determine distances d1, d2, d3, from UE106 to each of the three gNBs 110a, gNBs 110b, and gNBs 110c, respectively, and distance d4 from UE 105 to gNB110c, and the distance d5 between the UEs 105 and 106. Based on RTT measurements, the distance d between two nodes is given by:

$$d = RTT*c/2 \quad \text{(Eq. 1)}$$

where RTT is the measured RTT for a gNB 110 or a sidelink UE and c is the signal speed (e.g., speed of light).

Once each distances d is determined, the location server 120 may solve for the actual positions $(x_{105}, y_{105})$ and $(x_{106}, y_{106})$ of the UE 105 using a variety of known geometric techniques, such as, for example, multilateration, based on the known absolute locations of the gNBs 110a, 110b, and 110c. In FIG. 3, it can be seen that the position of the UE 105 ideally lies at the common intersection of all of the circles with radii defined by the determined distances between the nodes and the center defined by the position of the nodes, where the center of circles 302, 304, 306, and 308 are defined by the known actual positions of the gNBs 110a, 110b, and 110c, and the center of circle 310 may be defined as the unknown position of UE 105, or equivalently the unknown position of UE 106. In practice, the intersection of these circles may not lie at a single point due to noise and other errors in obtaining RTT measurements. The method, as illustrated in FIG. 3, can be extended to a greater number of gNBs 110 and additional or fewer UEs and may be used to determine a three-dimensional location of the UEs 105, 106 (e.g., from the common intersection point of spheres centered on each of the gNBs 110) if the gNBs 110 are at different heights. Such extensions are commonly known to those versed in the art.

In general, joint positioning may be modeled as a graph where a subset of the nodes are gNBs and another subset of the nodes are the UEs. Each edge in the graph represents a PRS measurement between two nodes, e.g., either unidirectional measurement, such as DL or UL, or bidirectional measurements in either Uu or sidelink. By increasing the number of edges in the graph, the graph becomes more connected and denser.

Figure 4:
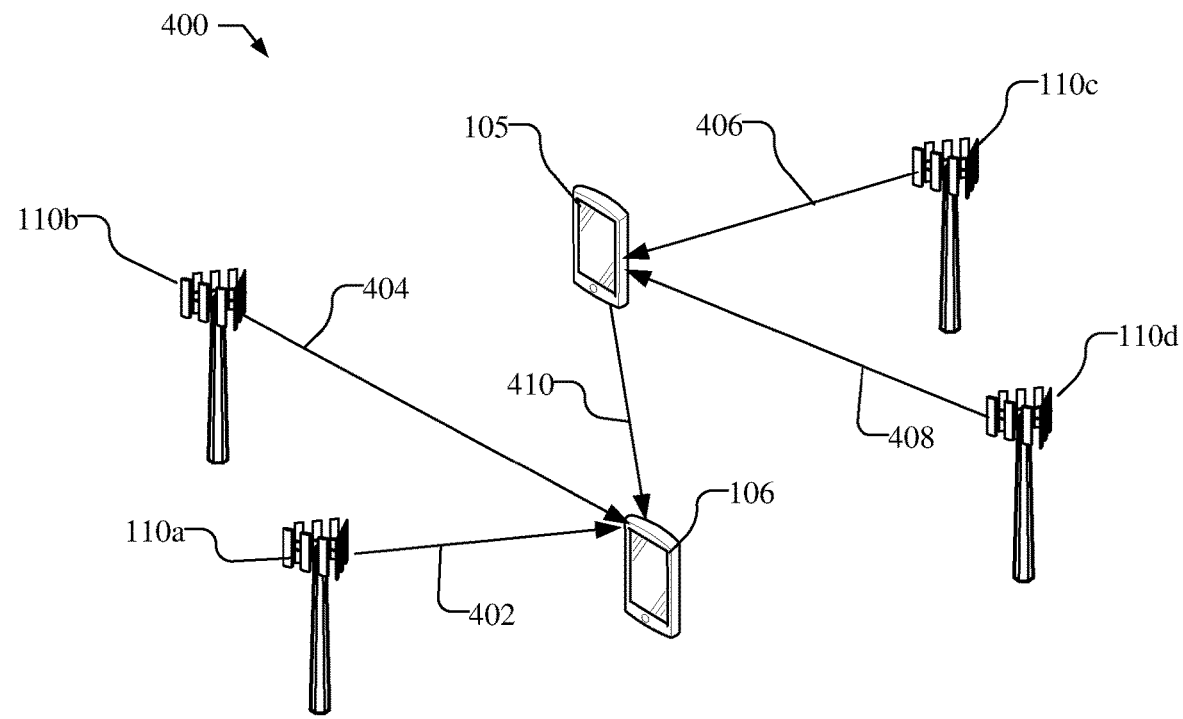
FIG. 4 illustrates a joint positioning session for UEs in a sparsely connected wireless network environment.

FIG. 4 illustrates a joint positioning session 400 for UEs 105 and 106 in a sparsely connected wireless network environment using DL PRS 402, 404, 406, and 408 from base stations 110a, 110b, 110c, 110d, and SL-PRS 410 from UE 105 to UE 106. As illustrated, UE 106 receives DL PRS 402 and 404 from base stations 110a and 110b, while UE 105 receives DL PRS 406 and 408 from base stations 110c and 110d.

As can be seen, UE 105 measures a significantly different set of PRS than UE 106. Thus, in FIG. 4, each UE 105 and 106 selects a unique subset of PRS to measure, and there is no intersection of the sets of PRS measured by the UE 105 and UE 106. Thus, a graph of the positioning session 400 may be considered sparsely connected (there is a relatively low number of edges in the graph), and consequently, the joint positioning session will have relatively inferior positioning performance.

In positioning, if the number of common PRS measurements between different node pairs that include anchors (e.g., base stations or other UEs) is increased, thereby increasing the number of edges within the graph, the positioning accuracy may be improved by the additional redundancy and uncertainty or ambiguity of the measurement may be reduced. Moreover, positioning algorithms may be improved, e.g., due to compressive sensing, dimension reduction, etc., to achieve better accuracy by increasing the density of the graph.

To increase the density of PRS measurements for joint positioning, a common set of PRS for PRS measurement may be used. The common set of PRS may be DL PRS, UL-PRS, RTT, SL-PRS, or a combination thereof, and may be identified based on one or more PRS resource IDs, PRS resource set IDs, TRP IDs, Cell IDs, SL-PRS IDs, UE IDs, SIMs, or any combination thereof.

Figure 5:
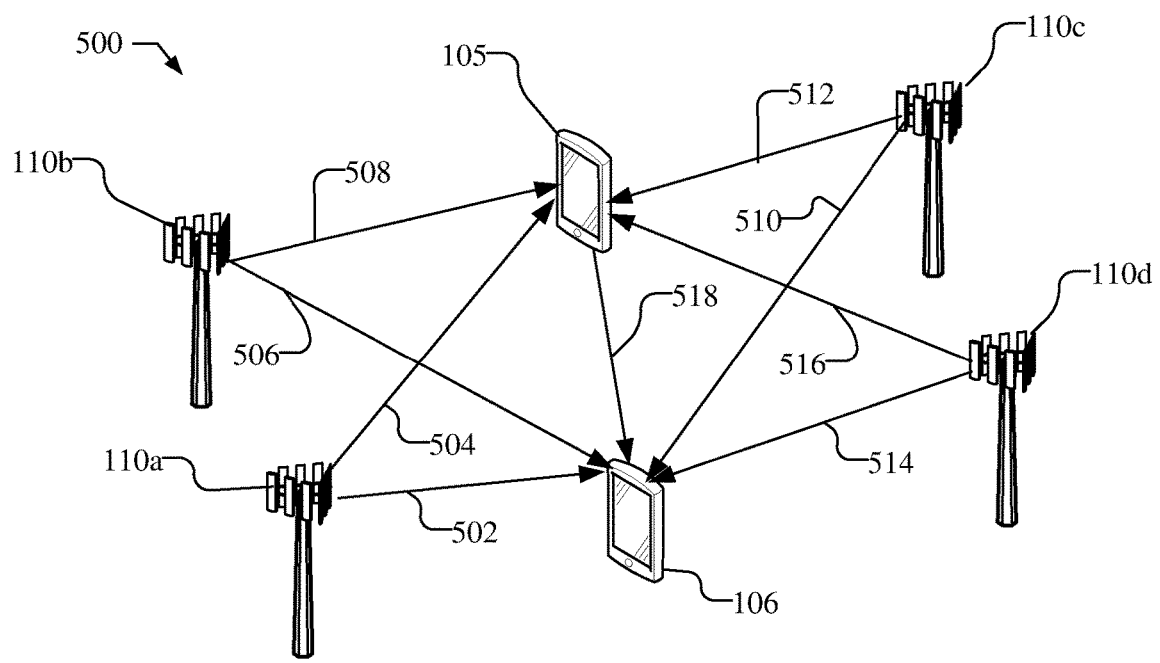
FIG. 5 illustrates a joint positioning session for UEs in a densely connected wireless network environment.

FIG. 5, by way of example, illustrates another joint positioning session 500 for UEs 105 and 106 in a densely connected wireless network environment using DL PRS from base stations 110a, 110b, 110c, 110d to UEs 105 and 106 and measured by UE 106 and SL-PRS from UE 105 to UE 106. FIG. 5 is similar to FIG. 4 but has an increased density of PRS. Unlike FIG. 4, which illustrates a relatively sparse connection, FIG. 5 illustrates each UE 105 and 106 measuring PRS from each base station, e.g., DL PRS 502, 506, 510, and 514 from base stations 110a, 110b, 110c, 110d are measured by UE 106 and DL PRS 504, 508, 512, and 516 from base stations 110a, 110b, 110c, 110d are measured by UE 105.

As can be seen in FIG. 5, UE 105 and UE 106 measures the substantially the same set of PRS. Thus, UEs 105 and 106 in FIG. 5 measure a common set of PRS. The common set of PRS refers to the set of PRS that a group of UEs, e.g., UEs 105 and 106 in FIG. 5, are recommended or suggested or required to conduct measurements over the same PRS session.

The SL-PRS 518 may be, but is not necessarily, included in the anchor set of PRS. For example, if the UEs 105 and 106 are in close proximity to each other, which may be determined based on previous position determinations for the UEs or based on wireless connections of the UEs, such as sharing the same serving cell, a sidelink channel may be established between the UEs 105 and 106 and sidelink assisted positioning may be used in the positioning session.

When the UEs 105 and 106 are in proximity to each other, they may have similar environments, indicating that they may both measure the same PRSs within the environment and that may find similar "good" PRS, i.e., PRS with good signal-to-interference-plus-noise (SINR), good line of sight (LOS) conditions, etc. By defining a common set of PRS for measurement by UEs in a joint positioning session, the UEs may measure all the PRSs in the common set of PRS and include these measurements in a location information report for the location server, resulting in an increased density of connections, and accordingly, improved positioning accuracy.

In some implementations, a location server, e.g., LMF 120, may select and assign the common set of PRS to all UEs to measure and include in a location information report during a joint positioning session. In some implementations, one or more UEs in the joint positioning session may select the common anchor set of PRS to be measured and included in a location information report.

Figure 6:
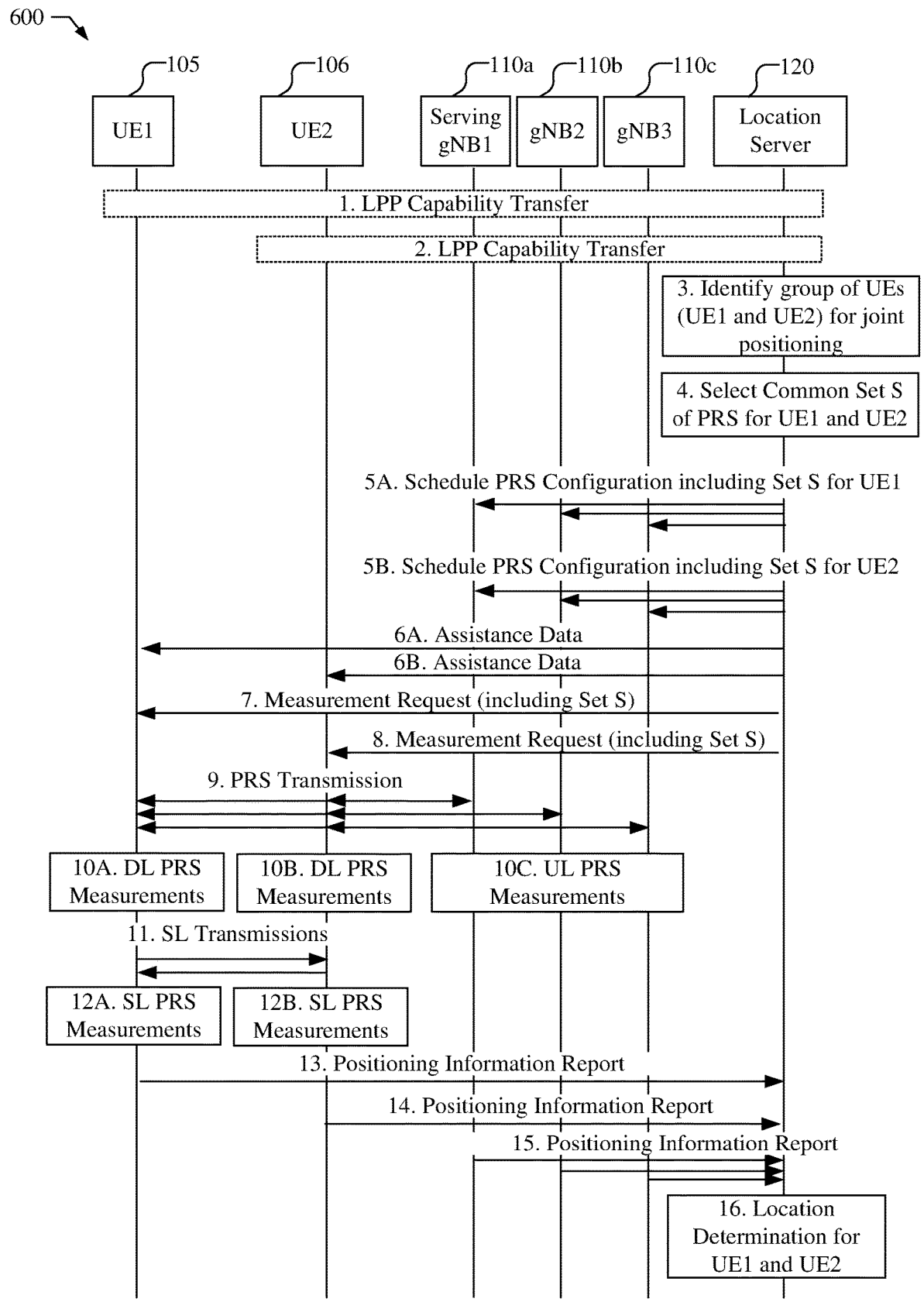
FIG. 6 is a signaling flow that illustrates various messages sent between components of a communication system during a joint positioning session using a common set of PRS that is selected by the location server.

FIG. 6 is a signaling flow 600 that illustrates various messages sent between components of the communication system 100 depicted in FIG. 1, during a joint positioning session for UE1 105 and UE2 106 using a common set of PRS to be measured and reported by UEs 105 and 106. The common set of PRS in FIG. 6 is selected and provided to the UEs by the location server, e.g., LMF 120. The UEs 105 and 106 may be configured to perform network based positioning, in which the UEs 105 and 106 receive and measure DL PRS from common base stations, e.g., serving gNB 110a, gNB 110b, and gNB 110c (sometimes collectively referred to as gNBs 110 or base stations 110). In some implementations, the UEs 105 and 106 may be further configured to perform sidelink assisted positioning by transmitting and/or receiving SL-PRS and reporting to the location server 120. During the joint positioning session in signaling flow 600 shown in FIG. 6, additional or fewer messages may be exchanged or the order of messages may be altered. For example, in some implementations, the UEs 105 and 106 may additionally, or alternatively, transmit UL PRS that is received by the base stations 110 and reported to the location server 120. Further some messages may be combined, e.g., broadcast to multiple nodes or may be eliminated. Additional messages may be transmitted, such as a request for location information from the location server 120 to the UEs 105 and 106 or to enable UL PRS transmission by the UEs 105 and 106 to be measured by gNBs 110. In the signaling flow 600, it is assumed that the UEs 105 and 106 and location server 120 communicate using the LPP positioning protocol referred to earlier, although use of NPP or a combination of LPP and NPP or other future protocol, such as NRPPa, is also possible.

At stages 1 and 2, the UE 105 and UE 106, respectively, and the location server 120 perform a capability transfer, which may use LPP or NRPPa positioning protocols. For example, the location server 120 may send a request capabilities message to the UEs 105 and 106, e.g., to request the capabilities from the UEs, and the UEs 105 and 106 return a provide capabilities message to the location server 120, for example, in which the UEs 105 and 106 may indicate the capability for sidelink-assisted positioning.

At stage 3, the location server 120 may select a group of UEs for joint positioning. For example, the location server 120 may select UEs for joint positioning based on proximity of the UEs and receiving request for position information for the UEs at approximately the same time. The location server 120 may determine if the UEs 105 and 106 are in proximity, e.g., based on previous position estimates of the UEs 105 and 106 determined by the location server 120 or reported by one or more UEs 105 and 106, or based on whether the UEs 105 and 106 already have a sidelink connection or whether the UEs 105 and 106 are using the same serving base station 110a, which may be determined from previous messages. The location server 120 may further determine whether sidelink assisted positioning may be used in the joint positioning session, for example, based on UE capabilities and proximity At stage 4, the location server 120 selects a common set S of PRSs that each UE in the joint positioning session (UEs 105 and 106) should measure and report. The common set S of PRS may include DL PRS, UL-PRS, RTT, SL-PRS, or a combination thereof. It may not be appropriate to request each UE to measure the same PRS resource from the same TRP because the UEs 105 and 106 may have different location and may have different LOS path conditions. Accordingly, the common set S of PRS may include a list of one or more of PRS resource ID, PRS resource set ID, TRP ID, Cell ID, SL-PRS ID, UE ID, Subscriber Identity Module (SIM), or any combination thereof.

The location server 120 may select the common set S of PRSs based on a variety of factors. For example, the location server 120 may determine a rough estimate for the group of UEs in the joint positioning session, e.g., based on previously determined positions of the UEs or cell information for the UEs (e.g., all UEs are attached to the same serving base station), etc., and may determine the common set S of PRSs based on the estimated location of the group of UEs. In another example, one or more of the UEs 105 and 106 may provide a recommendation to the location server 120 for the common set S of PRSs, e.g., in message such as the capability transfer or a request assistance data message (not shown) or other type of message to the location server 120, and the location server 120 determines the DL PRS, UL-PRS, RTT, SL-PRS, or the combination thereof to include in the common set S of PRS. In another example, the location server 120 may receive a location measurement report from one or more UEs 105 and 106 that includes a pre-estimation of the position of the one or more UEs 105 and 106 and the location server 120 may determine the common set S of PRSs based on the pre-estimation of the position of the UEs as received from the UEs.

At optional stage 5A, the location server 120 may schedule (or reschedule) the PRS configuration for UE1 105 with each base station 110 included in the common set S of PRS, illustrated as gNB1 110a, gNB2 110b, and gNB3 110c. In some implementations, the PRS might already be configured and the location server 120 may select the common PRS set based on the already configured PRS, in which case stage 5A is not necessary. The PRS configuration includes at least the common set S of PRS, but in some implementations may include additional PRS configurations which may not be in the common set S for all UEs. For example, in addition to the common set S of PRS, the location server 120 may schedule a PRS configuration for UE1 105 with one or more additional base stations (not shown) that will not be measured by UE2 106. The location server 120 may further schedule measurement of UL PRS transmitted from the UEs if included in the common set S of PRS.

At optional stage 5B, the location server 120 may schedule (or reschedule) the PRS configuration for UE2 106 with each base station 110 included in the common set S of PRS, illustrated as gNB1 110a, gNB2 110b, and gNB3 110c. In some implementations, stage 5B may be combined with stage 5A. Moreover, in some implementations, the PRS might already be configured and the location server 120 may select the common PRS set based on the already configured PRS, in which case stage 5B is not necessary. The PRS configuration includes at least the common set S of PRS, but in some implementations may include additional PRS configurations which may not be in the common set S for all UEs. For example, in addition to the common set S of PRS, the location server 120 may schedule a PRS configuration for UE2 106 with one or more additional base stations (not shown) that will not be measured by UE1 105. The location server 120 may further schedule measurement of UL PRS transmitted from the UEs if included in the common set S of PRS.

At stages 6A and 6B, the location server 120 may send assistance data to the UE1 105 and UE2 106, respectively. The assistance data may include configuration information for PRS that may be available for measurement, e.g., for a plurality of DL PRS, UL PRS, SL PRS, or a combination thereof that may be included in the common set S of PRS. In some implementations, additional PRS may be included in the assistance data. By way of example, configuration information DL PRS for the common set S of PRS may be configured in assistance data as illustrated in Table 1, which illustrates a fragment of Abstract Syntax Notation One (ASN.1) showing the NR-DL-PRS-Config information element (IE) that may be used to define DL PRS configuration.

TABLE 1

```
-- ASN1START
NR-DL-PRS-Config-r16 ::=            SEQUENCE {
   nr-DL-PRS-ResourceSetList        SEQUENCE (SIZE
NR-DL-PRS-ResourceSet-r16,          (1..nrMaxSetsPerTRP))
   nr-DL-PRS-SFN0-Offset-r16        SEQUENCE {
      sfn-Offset-r16                INTERGER (0..1023),
      intergerSubframeOffset-r16    INTERGER (0..9),
Need OP                             OPTIONAL, --
   } OPTIONAL,
      . . .
}
```

At stage 7, the location server 120 sends a message, such as a measurement request, to UE1 105 that may include a request for location measurement and may include an indication of at least the common set S of PRS to be measured. In some implementations, the indication may be, for example, the identifiers for the PRS in the common set S of PRS. In some implementations, the indication may be a reference to an index that includes the PRS in the common set of PRS. The common set S of PRS may be indicated in other ways if desired. In some implementations, the indication or identification of the common set S of PRS may be provided in a message other than the measurement request message, such as in the assistance data message in stage 6A, or in a different type of message.

At stage 8, similar to stage 7, the location server 120 sends a message, such as a measurement request, to UE2 106 that may include a request for location measurement and may include an indication of at least the common set S of PRS to be measured. In some implementations, the indication may be, for example, the identifiers for the PRS in the common set S of PRS. In some implementations, the indication may be a reference to an index that includes the PRS in the common set of PRS. The common set S of PRS may be indicated in other ways if desired. In some implementations, the indication or identification of the common set S of PRS may be provided in a message other than the measurement request message, such as in the assistance data message in stage 6B, or in a different type of message.

At stage 9, the PRSs are transmitted, e.g., gNBs 110 may broadcast the DL PRSs as configured by location server 120, the UE 1 105 and UE2 106 may broadcast the UL PRSs as configured by location server 120, or both, e.g., for RTT.

At stage 10, illustrated with stages 10A, 10B, and 10C, the received PRS from the common set S of PRS is measured, e.g., illustrated by stages 10A and 10B in which UE1 105 and UE2 106, respectively, measure the received DL PRSs from the common set S of PRS (if present), and stage 10C in which the gNBs 110 measure the received UL PRSs from the common set of PRS (if present). The measurements, for example, may be timing based measurements, such as TOA, Rx-Tx, RTT, etc., angle based measurements, such as AoA, or power based measurements, such as RSRP, etc.

At stage 11, if sideline assisted positioning is used in the positioning session, one or both of the UEs 105 and 106 may transmit SL-PRS. As illustrated in FIG. 6, UE1 105 transmits SL-PRS to UE2 106 and UE2 106 transmits SL-PRS to UE1 105, but in some implementations, only one of the UEs may transmit the SL-PRS.

At stages 12A and 12B, UE1 105 and UE2 106, respectively measure the received SL-PRS transmitted at stage 11, if included in the common set S of PRS. The measurements, for example, may be timing based measurements, such as TOA, Rx-Tx, etc., angle based measurements, such as AoA, or power based measurements, such as RSRP, etc. It should be understood that in some implementations, the SL-PRS may be transmitted and measured before the DL PRS is transmitted and measured, e.g., stages 11, 12A and 12B may be performed before stages 9, 10A, and 10B.

At stage 13, UE1 105 transmits a positioning information report to the location server 120 that includes the positioning measurements obtained in stages 10A and 12A.

At stage 14, UE2 106 transmits a positioning information report to the location server 120 that includes the positioning measurements obtained in stages 10B and 12B.

At stage 15, gNBs 110 transmits a positioning information report to the location server 120 that includes the positioning measurements obtained in stage 10C, if any.

At stage 16, the location server 120 jointly determines the locations of UE1 105 and UE2 106 based on the measurement responses received at stages 13, 14 and 15, along with known positions of the gNBs 110, e.g., using multi RTT, TDOA, double differential RTT, double differential TDOA, and multilateration, the intersection of multiple AoAs, etc. The location server 120 may send the locations to the UEs 105 and 106 or to a requesting external client (not shown).

Figure 7:
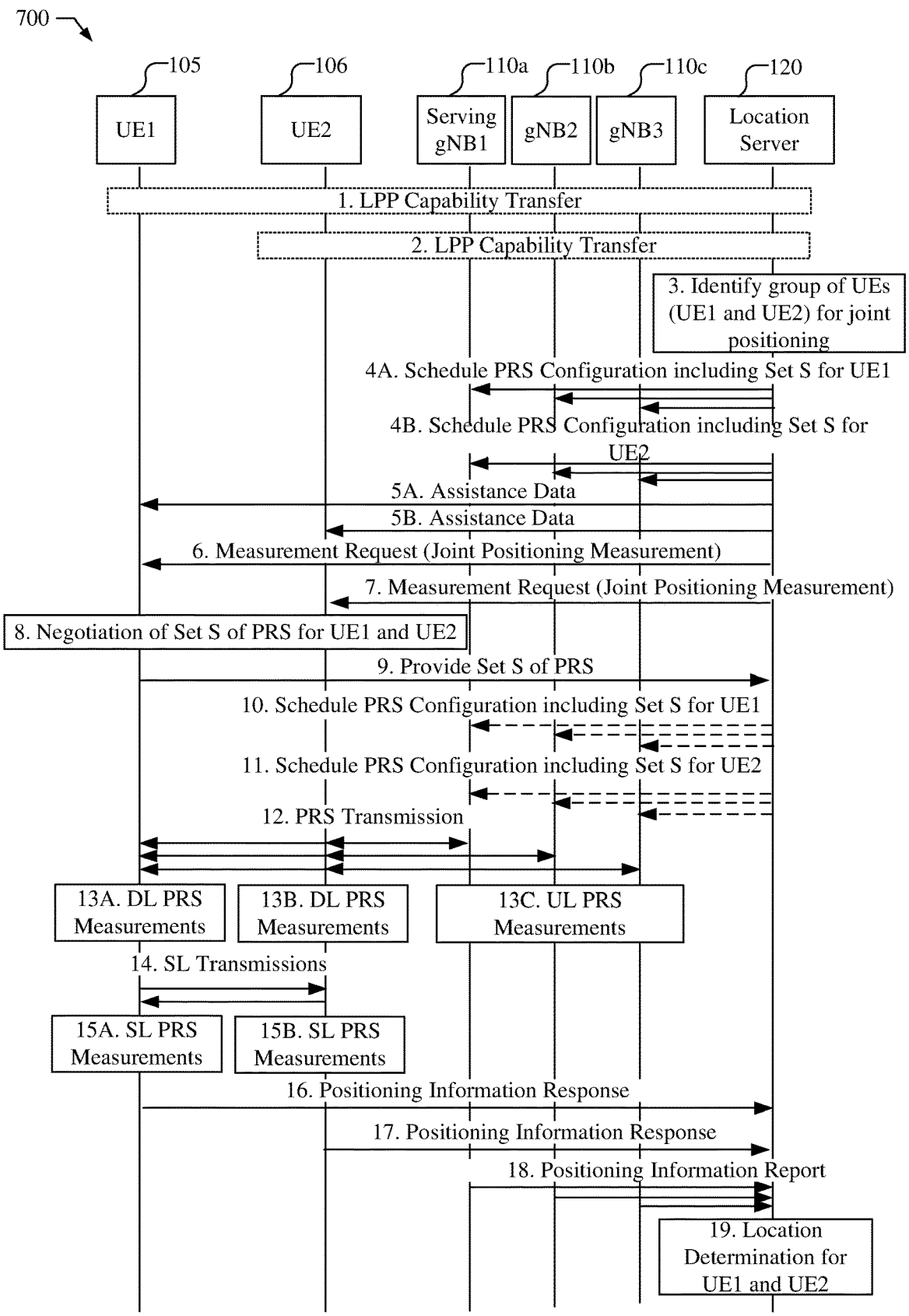
FIG. 7 is a signaling flow that illustrates various messages sent between components of a communication system during a joint positioning session using a common set of PRS that is selected by the UEs.

FIG. 7 is a signaling flow 700 that illustrates various messages sent between components of the communication system 100 depicted in FIG. 1, during a joint positioning session for UE1 105 and UE2 106 using a common set of PRS to be measured and reported by UEs 105 and 106, that is selected by one or more of the UEs 105 and 106. Similar to the joint positioning session in signaling flow 600 shown in FIG. 6, the UEs 105 and 106 may be configured to perform network based positioning, in which the UEs 105 and 106 receive and measure DL PRS from a common set of a number of base stations, e.g., serving gNB 110a, gNB 110b, and gNB 110c (sometimes collectively referred to as gNBs 110 or base stations 110). In some implementations, the UEs 105 and 106 may be further configured to perform sidelink assisted positioning by transmitting and/or receiving SL-PRS and reporting to the location server 120. During the joint positioning session in signaling flow 700 shown in FIG. 7, additional or fewer messages may be exchanged or the order of messages may be altered. For example, in some implementations, the UEs 105 and 106 may additionally, or alternatively, transmit UL PRS that is received by the base stations 110 and reported to the location server 120. Additionally, some messages may be combined, e.g., broadcast to multiple nodes or may be eliminated. Additional messages may be transmitted, such as a request for location information from the location server 120 to the UEs 105 and 106 or to enable UL PRS transmission by the UEs 105 and 106 to be measured by gNBs 110. In the signaling flow 700, it is assumed that the UEs 105 and 106 and location server 120 communicate using the LPP positioning protocol referred to earlier, although use of NPP or a combination of LPP and NPP or other future protocol, such as NRPPa, is also possible.

At stages 1 and 2, the UE 105 and UE 106, respectively, and the location server 120 perform a capability transfer, which may use LPP or NRPPa positioning protocols. For example, the location server 120 may send a request capabilities message to the UEs 105 and 106, e.g., to request the capabilities from the UEs, and the UEs 105 and 106 return a provide capabilities message to the location server 120, for example, in which the UEs 105 and 106 may indicate the capability for sidelink-assisted positioning.

At stage 3, the location server 120 may select a group of UEs for joint positioning. For example, the location server 120 may select UEs for joint positioning based on proximity of the UEs and receiving request for position information for the UEs at approximately the same time. The location server 120 may determine if the UEs 105 and 106 are in proximity, e.g., based on previous position estimates of the UEs 105 and 106 determined by the location server 120 or reported by one or more UEs 105 and 106, or based on whether the UEs 105 and 106 already have a sidelink connection or whether the UEs 105 and 106 are using the same serving base station 110a, which may be determined from previous messages. The location server 120 may further determine whether sidelink assisted positioning may be used in the joint positioning session, for example, based on UE capabilities and proximity At optional stages 4A and 4B (which may be combined in a single stage), the location server 120 may schedule PRS configurations for UE1 105 and UE2 106, respectively, with a group of base stations 110, e.g., illustrated as gNB1 110a, gNB2 110b, and gNB3 110c. In some implementations, the PRS may not be changed, e.g., if the PRS is periodic and broadcasting, but if the PRS is on-demand, or aperiodic then stages 4A and 4B may be performed.

At stages 5A and 5B, the location server 120 may send assistance data to the UE1 105 and UE2 106, respectively. The assistance data may include configuration information for PRS that may be available for measurement, e.g., for a plurality of DL PRS, UL PRS, SL PRS, or a combination thereof.

At stage 6, the location server 120 sends a message, such as a measurement request, to UE1 105 that may indicate that the UE1 is included in a joint positioning session and may identify the other UEs, e.g., UE2 106. The measurement request may indicate that one or more of the UEs in the joint positioning session is to determine the common set S of PRS. In some implementations, the message at stage 6 may indicate PRS that is available for measurement by UE1 105, and which may be included in a common set of PRS. In some implementations, the indication may be, for example, the identifiers for the PRS that are available for measurement. In some implementations, the indication may be a reference to an index that includes the PRS that are available. The common set S of PRS may be indicated in other ways if desired. In some implementations, the location server 120 may indicate that the UE is included in a group positioning session and may provide an indication of available PRS in a different message, such as in the assistance data message of stage 5A.

At stage 7, the location server 120 sends a message, such as a measurement request, to UE2 106 that may indicate that the UE2 is included in a joint positioning session and may identify the other UEs, e.g., UE1 105. The measurement request may indicate that one or more of the UEs in the joint positioning session is to determine the common set S of PRS. In some implementations, the message at stage 6 may indicate PRS that is available for measurement by UE2 106, and which may be included in a common set of PRS. In some implementations, the indication may be, for example, the identifiers for the PRS that are available for measurement. In some implementations, the indication may be a reference to an index that includes the PRS that are available. The common set S of PRS may be indicated in other ways if desired. In some implementations, the location server 120 may indicate that the UE is included in a group positioning session and may provide an indication of available PRS in a different message, such as in the assistance data message of stage 5B.

At stage 8, the UEs 105 and 106 may determine a recommended common set S of PRSs that each UE in the joint positioning session (UEs 105 and 106) should measure and report. The common set S of PRS may include DL PRS, UL-PRS, RTT, SL-PRS, or a combination thereof. The common set S of PRS may include a list of one or more of PRS resource ID, PRS resource set ID, TRP ID, Cell ID, SL-PRS ID, UE ID, Subscriber Identity Module (SIM), or any combination thereof.

The UEs 105 and 106 may determine the common set S of PRSs, e.g., via sidelink communications with other UEs in the group (by unicast, broadcast, multicast). For example, once the UEs 105 and 106 determine that they are included in a group for joint positioning and the identity of other UEs in the group, one or more of the UEs 105 and 106 may initiate sidelink communications. The common set S of PRSs may be chosen by the UEs 105 and 106 based on the PRSs provided in the message received in states 6 and 7. In one implementation, one of the UEs, e.g., UE 105, may server as a controlling UE and gather the recommended sets of PRS from each other UE included in the group, e.g., from UE 106. Based on the received recommended sets of PRS from other UEs, the controlling UE 105 may determine a common set S of PRS for the UEs to be used in the joint positioning. The controlling UE 105 may send the common set S of PRS to the location server 120 (e.g., in stage 9) and distribute the common set S of PRS to the other UEs in the group. In another implementation, the UEs 105 and 106 may send recommended sets of PRS to each other, e.g., in multiple iterations, until a consensus on the common set S of PRS is reached. For example, the UEs may distribute recommended common sets S of PRS in a round-robin procedure (e.g., from UE1 to UE2 to UE3 (not shown) and back to UE1 etc.), or in a distributed voting procedure (e.g., from UE2 and UE3 (not shown) to UE1, which may coordinate and decide on the common set S of PRS). For example, all elements in the common set S of PRS may be selected individually by polling each UE in the group or by each UE voting for each element of the set of PRS and sharing the vote with other UEs until a consensus is reached. Once agreement on the common set S of PRS is reached, one or more UE's, e.g., UE 105 may send the common set S of PRS to the location server 120 (e.g., in stage 9) and distribute the common set S of PRS to the other UEs in the group.

At stage 9, the UE 105, for example, may send an indication of the common set S of PRS determined at stage 8 to the location server 120. The indication of the common set S of PRS may be, for example, the identifiers for the PRS that are included in the common set S of PRS. In some implementations, another type of indication may be used, such as reference to an index that includes the PRS that are available.

At optional stages 10 and 11 (which may be combined in a single stage), the location server 120 may reschedule PRS configurations for UE1 105 and UE2 106, respectively, with a group of base stations 110, e.g., illustrated as gNB1 110a, gNB2 110b, and gNB3 110c, based on the common set S of PRS received from the one or more UEs at stage 9. As with stages 4A and 4B, in some implementations, the PRS may not be changed, e.g., if the PRS is periodic and broadcasting, but if the PRS is on-demand, or aperiodic then stages 10 and 11 may be performed. The location server 120 may further schedule measurement of UL PRS transmitted from the UEs if included in the common set S of PRS.

At stage 12, the PRSs are transmitted, e.g., gNBs 110 broadcast the DL PRSs as configured by location server 120, the UE 1 105 and UE2 106 may broadcast the UL PRSs as configured by location server 120, or both, e.g., for RTT.

At stage 13, illustrated with stages 13A, 13B, and 13C, the received PRS from the common set S of PRS is measured, e.g., illustrated by stage 13A and 13B in which UE1 105 and UE2 106, respectively, measure the received DL PRSs from the common set S of PRS (if present), and stage 13C in which the gNBs 110 measure the received UL PRSs from the common set of PRS (if present). The measurements, for example, may be timing based measurements, such as TOA, Rx-Tx, RTT, etc., angle based measurements, such as AoA, or power based measurements, such as RSRP, etc.

At stage 14, if sideline assisted positioning is used in the positioning session, one or both of the UEs 105 and 106 may transmit SL-PRS. As illustrated in FIG. 6, UE1 105 transmits SL-PRS to UE2 106 and UE2 106 transmits SL-PRS to UE1 105, but in some implementations, only one of the UEs may transmit the SL-PRS.

At stages 15A and 15B, UE1 105 and UE2 106, respectively measure the received SL-PRS transmitted at stage 14, if included in the common set S of PRS. The measurements, for example, may be timing based measurements, such as TOA, Rx-Tx, etc., angle based measurements, such as AoA, or power based measurements, such as RSRP, etc. It should be understood that in some implementations, the SL-PRS may be transmitted and measured before the DL PRS is transmitted and measured, e.g., stages 14, 15A and 15B may be performed before stages 12, 13A, and 13B.

At stage 16, UE1 105 transmits a positioning information report to the location server 120 that includes the positioning measurements obtained in stages 13A and 15A.

At stage 17, UE2 106 transmits a positioning information report to the location server 120 that includes the positioning measurements obtained in stages 13B and 15B.

At stage 18, gNBs 110 transmits a positioning information report to the location server 120 that includes the positioning measurements obtained in stage 13C, if any.

At stage 19, the location server 120 jointly determines the locations of UE1 105 and UE2 106 based on the measurement responses received at stages 16, 17, and 18, along with known positions of the gNBs 110, e.g., using multi RTT, TDOA, double differential RTT, double differential TDOA, and multilateration, the intersection of multiple AoAs, etc. The location server 120 may send the locations to the UEs 105 and 106 or to a requesting external client (not shown).

Figure 8:
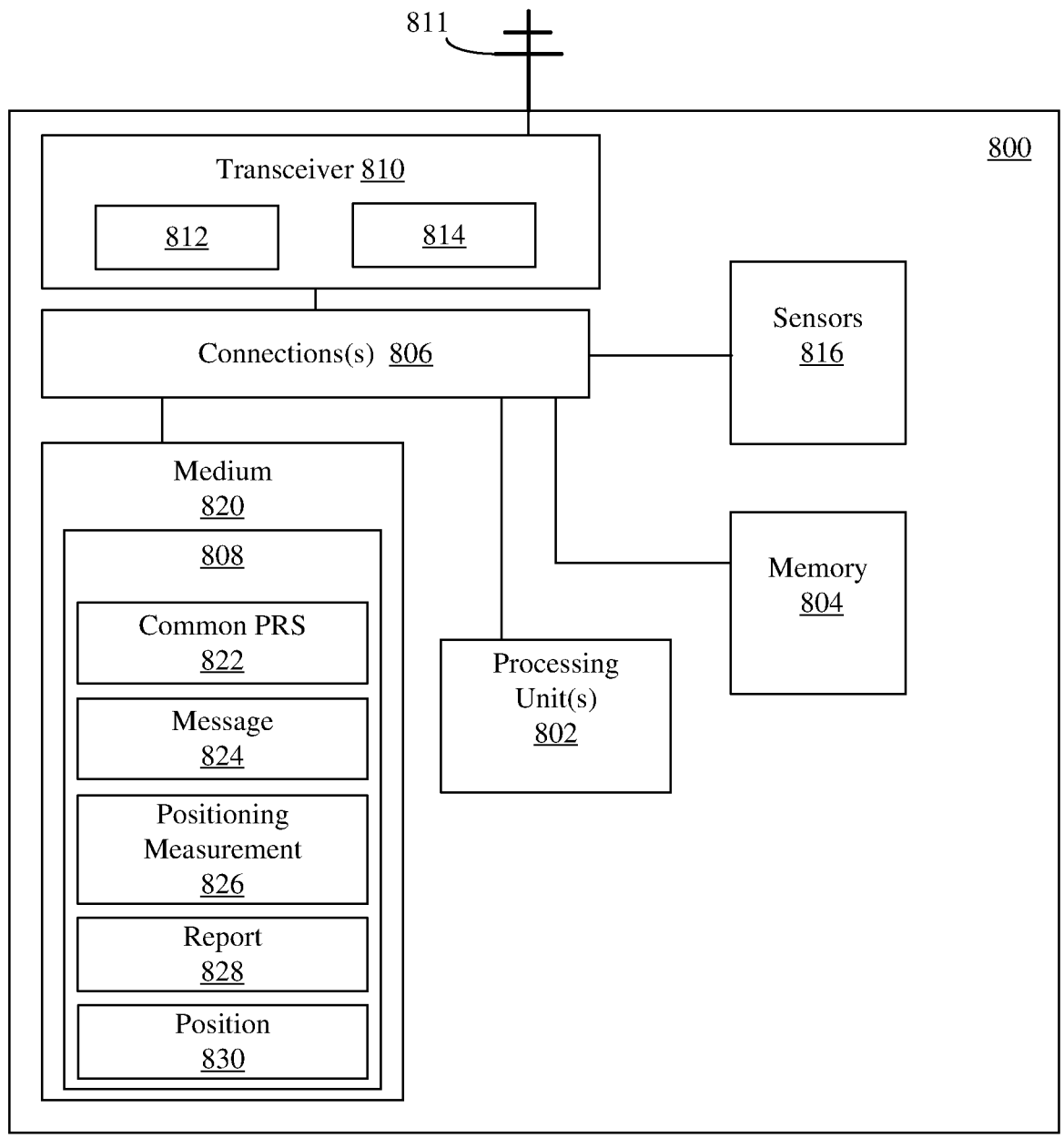
FIG. 8 shows a schematic block diagram illustrating certain exemplary features of a hardware implementation of a UE enabled to support the joint positioning of a group of UEs using a common set of PRS that are measured and reported by each UE.

FIG. 8 shows a schematic block diagram illustrating certain exemplary features of a hardware implementation of a UE 800, which may be UE 105 or UE 106, that is enabled to support the joint positioning of a group of UEs, including itself, based on a selected common set of PRS that are measured and reported by each UE in the group of UEs, and in some implementations, using sidelink assisted positioning, in a manner consistent with disclosed implementation. The common set of PRS, for example, may include DL PRS, UL-PRS, RTT, SL-PRS, or a combination thereof. The UE 800 includes, e.g., hardware components such as one or more processors 802, memory 804, a sensor unit 816, and a transceiver 810 (e.g., wireless network interface), which may be operatively coupled with one or more connections 806 (e.g., buses, lines, fibers, links, etc.) to non-transitory computer readable medium 820 and memory 804. The UE 800 may further include additional items, which are not shown, such as a user interface that may include e.g., a display, a keypad or other input device, such as virtual keypad on the display, through which a user may interface with the UE, or a satellite positioning system receiver. In certain example implementations, all or part of UE 800 may take the form of a chipset, and/or the like.

The transceiver 810 may, for example, include a transmitter 812 enabled to transmit one or more signals over one or more types of wireless communication networks and a receiver 814 to receive one or more signals transmitted over the one or more types of wireless communication networks. In some embodiments, UE 800 may include antenna 811, which may be internal or external. UE antenna 811 may be used to transmit and/or receive signals processed by transceiver 810. In some embodiments, UE antenna 811 may be coupled to transceiver 810. In some embodiments, measurements of signals received (transmitted) by UE 800 may be performed at the point of connection of the UE antenna 811 and transceiver 810. For example, the measurement point of reference for received (transmitted) RF signal measurements may be an input (output) terminal of the receiver 814 (transmitter 812) and an output (input) terminal of the UE antenna 811. In a UE 800 with an antenna 811 that includes multiple antennas or an antenna array, the antenna connector may be viewed as a virtual point representing the aggregate output (input) of multiple UE antennas. The phase difference of received signals at multiple antennas or antenna array may be used to the AoA of the signal with respect to the antenna array, which may be converted to a local or global reference frame based on a known orientation of the UE 800. In some embodiments, UE 800 may measure received signals including timing measurements, angle measurements, or signal strength measurements and the raw measurements may be processed by the one or more processors 802.

The sensor unit 816 may comprise, for example, one or more of various types of sensors such as one or more inertial sensors, one or more magnetometers, one or more environment sensors, one or more optical sensors, one or more weight sensors, and/or one or more radio frequency (RF) sensors, etc. For example, the sensor unit 816 may include one or more accelerometers (e.g., collectively responding to acceleration of the UE 800 in three dimensions) and/or one or more gyroscopes (e.g., three-dimensional gyroscope(s)), one or more magnetometers (e.g., three-dimensional magnetometer(s)) to determine orientation (e.g., relative to magnetic north and/or true north), one or more temperature sensors, one or more barometric pressure sensors, one or more ambient light sensors, one or more camera imagers, and/or one or more microphones, etc. The sensor unit 816 may generate analog and/or digital signals indications of which may be stored in the memory 804 and processed by the processing units 802 in support of one or more applications such as, for example, applications directed to positioning and/or navigation operations. The sensor unit 816 may be used in relative location measurements, relative location determination, motion determination, etc. Information detected by the sensor unit 816 may be used for motion detection, relative displacement, dead reckoning, sensor-based location determination, and/or sensor-assisted location determination. The sensor unit 816, for example, may be useful to determine the orientation of the anchor UE 800. The orientation of the UE 800 may be used to convert the AoA of sidelink communication signals received from the target UE 106 to a local or global reference frame.

The one or more processors 802 may be implemented using a combination of hardware, firmware, and software. For example, the one or more processors 802 may be configured to perform the functions discussed herein by implementing one or more instructions or program code 808 on a non-transitory computer readable medium, such as medium 820 and/or memory 804. In some embodiments, the one or more processors 802 may represent one or more circuits configurable to perform at least a portion of a data signal computing procedure or process related to the operation of UE 800.

The medium 820 and/or memory 804 may store instructions or program code 808 that contain executable code or software instructions that when executed by the one or more processors 802 cause the one or more processors 802 to operate as a special purpose computer programmed to perform the techniques disclosed herein. As illustrated in UE 800, the medium 820 and/or memory 804 may include one or more components or modules that may be implemented by the one or more processors 802 to perform the methodologies described herein. While the components or modules are illustrated as software in medium 820 that is executable by the one or more processors 802, it should be understood that the components or modules may be stored in memory 804 or may be dedicated hardware either in the one or more processors 802 or off the processors.

A number of software modules and data tables may reside in the medium 820 and/or memory 804 and be utilized by the one or more processors 802 in order to manage both communications and the functionality described herein. It should be appreciated that the organization of the contents of the medium 820 and/or memory 804 as shown in UE 800 is merely exemplary, and as such the functionality of the modules and/or data structures may be combined, separated, and/or be structured in different ways depending upon the implementation of the UE 800.

The medium 820 and/or memory 804 may include a common PRS unit 822 that that when implemented by the one or more processors 802 configures the one or more processors 802 to determine a common set of PRS, including DL PRS from one or more base stations to be measured by each UE in the plurality of UEs, SL-PRS from UEs, or a combination thereof for joint positioning of the plurality of UEs. The comment set of PRS, for example, may include one or more of PRS IDs, PRS resource set IDs, TRP Ids, Cell IDs, SL-PRS IDs, UE ID, SIMs, or any combination thereof. The one or more processors 802 may be configured to send or receive, via the wireless transceiver 810, an indication of the common set of PRS to or from a location server or another UE. The indication, for example, may be identifiers of the PRS or reference to one or more indices that include the PRS. In one implementation, the one or more processors 802 may be configured to receive, via the wireless transceiver 810, from a location server an identification of a plurality of UEs and an indication that the plurality of UEs are included in a joint positioning session. The one or more processors 802 may be configured to receive, via the wireless transceiver 810, from at least one other UE, configuration information for DL PRS, UL-PRS, RTT, SL-PRS, or combination thereof, that is available for measurement and that may be included in the common set of PRS and to determine which DL PRS, UL-PRS, RTT, SL-PRS, or combination thereof are included in the common set of PRS accordingly, and to send, via the wireless transceiver 810, an indication of the common set of PRS to each other UE. The one or more processors 802 may be configured to send, via the wireless transceiver 810, to at least one other UE, a recommendation for the DL PRS, UL-PRS, RTT, SL-PRS, or combination thereof, to be included in the common set of PRS, and to receive, via the wireless transceiver 810, from at least one other UE, a recommendation for the DL PRS, UL-PRS, RTT, SL-PRS, or combination thereof, to be included in the common set of PRS, wherein the common set of PRS is determined by consensus of the plurality of UEs. In another implementation, the one or more processors 802 may be configured to send, via the wireless transceiver 810, a recommendation for the DL PRS, UL-PRS, RTT, SL-PRS, or a combination thereof to a location server that selects the common set of PRS and to receive an indication of the common set of PRS from the location server, via the wireless transceiver 810.

The medium 820 and/or memory 804 may include a message unit 824 that that when implemented by the one or more processors 802 configures the one or more processors 802 to receive, via the wireless transceiver 810, messages from a location server, such as a measurement request and/or assistance data. In some implementations, the message may include an indication of the common set of PRS to be measured, such as an identifier of PRS or reference to one or more indices that identify the PRS. In some implementations, the message my comprise configuration information for a plurality of DL PRS, a plurality of SL-PRS, or a combination thereof, from which the common set of PRS may be selected by one or more UEs. The message may further include an identification of a plurality of UEs and an indication that the plurality of UEs is included in a joint positioning session.

The medium 820 and/or memory 804 may include a positioning measurement unit 826 that that when implemented by the one or more processors 802 configures the one or more processors 802 to perform positioning measurements, via the wireless transceiver 810, of the DL PRS, UL-PRS, RTT, SL-PRS, or the combination thereof from the common set of PRS. The positioning measurements, for example, may be timing measurement such as TOA, Rx-Tx, RTT, etc., an angle measurement such as AoA, a power measurement such as RSRP, or a combination thereof.

The medium 820 and/or memory 804 may include a report unit 828 that that when implemented by the one or more processors 802 configures the one or more processors 802 to send, via the wireless transceiver 810, to a location information report to the location server that comprises the positioning measurements of the DL PRS, UL-PRS, RTT, SL-PRS, or the combination thereof.

The medium 820 and/or memory 804 may include a position unit 830 that that when implemented by the one or more processors 802 configures the one or more processors 802 to receive, via the wireless transceiver 810, from the location server a position estimate for the UE that was determined by the location server jointly with the positions of other UEs.

The methodologies described herein may be implemented by various means depending upon the application. For example, these methodologies may be implemented in hardware, firmware, software, or any combination thereof. For a hardware implementation, the one or more processors 802 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored in a memory and executed by one or more processor units, causing the processor units to operate as a special purpose computer programmed to perform the algorithms disclosed herein. Memory may be implemented within the one or more processors or external to the one or more processors. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or program code 808 on a non-transitory computer readable medium, such as medium 820 and/or memory 804. Examples include computer readable media encoded with a data structure and computer readable media encoded with a computer program 808. For example, the non-transitory computer readable medium including program code 808 stored thereon may include program code 808 to support joint positioning sessions that use a selected common set of PRS, and in some implementations sidelink assisted positioning, in a manner consistent with disclosed embodiments. Non-transitory computer readable medium 820 includes physical computer storage media. A storage medium may be any available medium that can be accessed by a computer. By way of example, and not limitation, such non-transitory computer readable media can comprise RAM, ROM, EEPROM, CD-ROM or other optical disk storage, magnetic disk storage or other magnetic storage devices, or any other medium that can be used to store desired program code 808 in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer readable media.

In addition to storage on computer readable medium 820, instructions and/or data may be provided as signals on transmission media included in a communication apparatus. For example, a communication apparatus may include a transceiver 810 having signals indicative of instructions and data. The instructions and data are configured to cause one or more processors to implement the functions outlined in the claims. That is, the communication apparatus includes transmission media with signals indicative of information to perform disclosed functions.

Memory 804 may represent any data storage mechanism. Memory 804 may include, for example, a primary memory and/or a secondary memory. Primary memory may include, for example, a random access memory, read only memory, etc. While illustrated in this example as being separate from one or more processors 802, it should be understood that all or part of a primary memory may be provided within or otherwise co-located/coupled with the one or more processors 802. Secondary memory may include, for example, the same or similar type of memory as primary memory and/or one or more data storage devices or systems, such as, for example, a disk drive, an optical disc drive, a tape drive, a solid state memory drive, etc.

In certain implementations, secondary memory may be operatively receptive of, or otherwise configurable to couple to a non-transitory computer readable medium 820. As such, in certain example implementations, the methods and/or apparatuses presented herein may take the form in whole or part of a computer readable medium 820 that may include computer implementable code 808 stored thereon, which if executed by at least one processors 802 may be operatively enabled to perform all or portions of the example operations as described herein. Computer readable medium 820 may be a part of memory 804.

Figure 9:
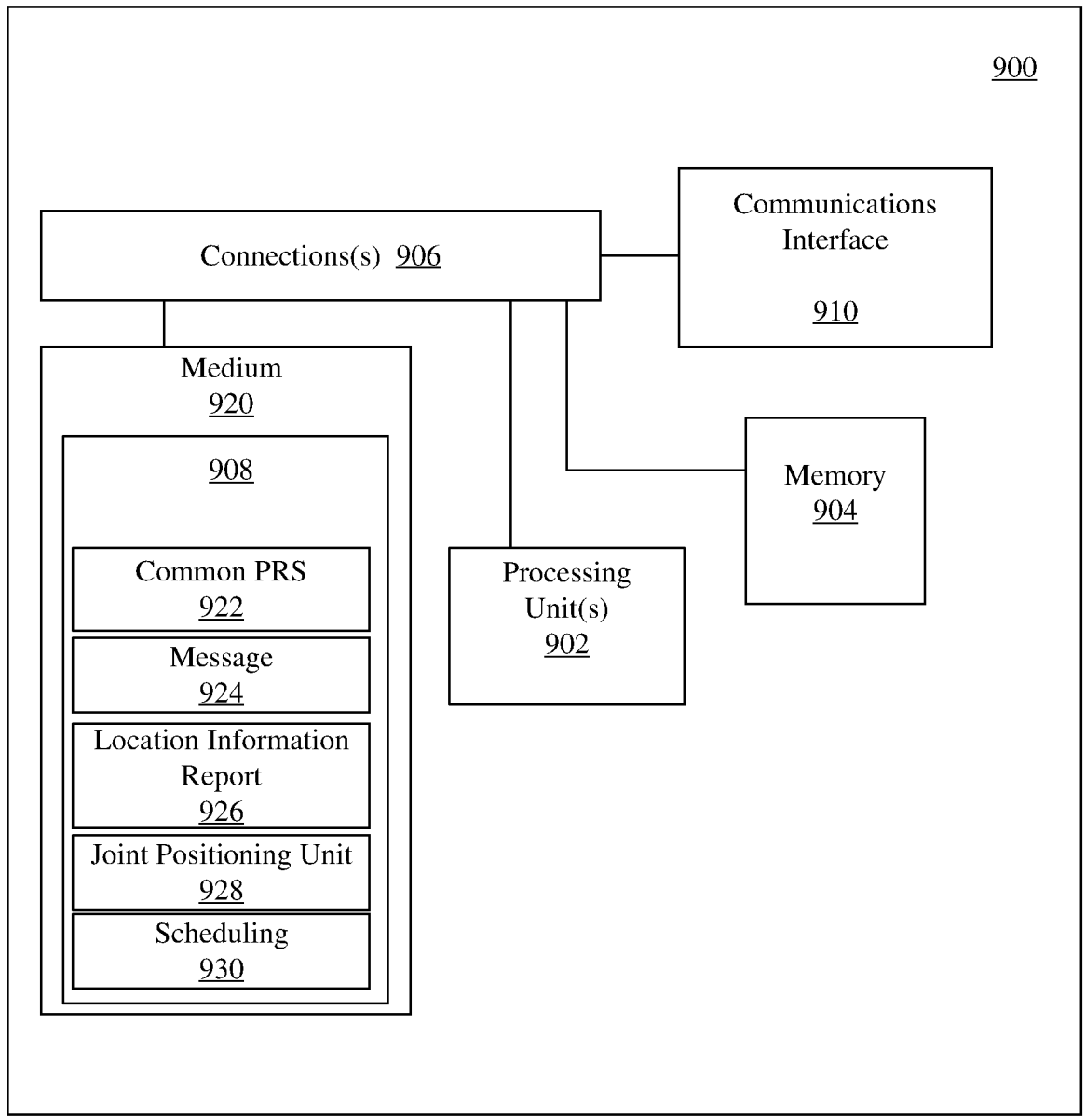
FIG. 9 is a schematic block diagram illustrating certain exemplary features of a hardware implementation of a location server enabled to support joint positioning of a group of UEs using a common set of PRS that are measured and reported by each UE.

FIG. 9 is a schematic block diagram illustrating certain exemplary features of a hardware implementation of a location server 900, such as LMF 120, enabled to support joint positioning of a group of UEs based on a selected common set of PRS that are measured and reported by each UE in the group of UEs, and in some implementations, using sidelink assisted positioning, in a manner consistent with disclosed implementation. The common set of PRS, for example, may include DL PRS, UL-PRS, RTT, SL-PRS, or a combination thereof. The location server 900 includes, e.g., hardware components such as one or more processors 902, memory 904, and a communications interface 910, which may be operatively coupled with one or more connections 906 (e.g., buses, lines, fibers, links, etc.) to non-transitory computer readable medium 920 and memory 904. The external interface 910 may be a wired and/or wireless interface capable of connecting to a transmission-reception point or a base station or, such as gNBs 110, via one or more intermediate entities, such as an AMF, and capable of communicating with UEs, such as a target UE 106 and an anchor UE 105.

The one or more processors 902 may be implemented using a combination of hardware, firmware, and software. For example, the one or more processors 902 may be configured to perform the functions discussed herein by implementing one or more instructions or program code 908 on a non-transitory computer readable medium, such as medium 920 and/or memory 904. In some embodiments, the one or more processors 902 may represent one or more circuits configurable to perform at least a portion of a data signal computing procedure or process related to the operation of location server 900.

The medium 920 and/or memory 904 may store instructions or program code 908 that contain executable code or software instructions that when executed by the one or more processors 902 cause the one or more processors 902 to operate as a special purpose computer programmed to perform the techniques disclosed herein. As illustrated in location server 900, the medium 920 and/or memory 904 may include one or more components or modules that may be implemented by the one or more processors 902 to perform the methodologies described herein. While the components or modules are illustrated as software in medium 920 that is executable by the one or more processors 902, it should be understood that the components or modules may be stored in memory 904 or may be dedicated hardware either in the one or more processors 902 or off the processors.

A number of software modules and data tables may reside in the medium 920 and/or memory 904 and be utilized by the one or more processors 902 in order to manage both communications and the functionality described herein. It should be appreciated that the organization of the contents of the medium 920 and/or memory 904 as shown in location server 900 is merely exemplary, and as such the functionality of the modules and/or data structures may be combined, separated, and/or be structured in different ways depending upon the implementation of the location server 900.

The medium 920 and/or memory 904 may include a common PRS unit 922 that when implemented by the one or more processors 902 configures the one or more processors 902 to select a common set of PRS for measurement. The common set of PRS may comprise DL PRS from one or more base stations to be measured by each UE in the plurality of UEs, UL PRS from the plurality of UEs to be measured by the one or more base stations, SL-PRS from UEs in the plurality of UEs to be measured by other UEs in the plurality of UEs, or a combination thereof. The comment set of PRS, for example, may include one or more of PRS IDs, PRS resource set IDs, TRP Ids, Cell IDs, SL-PRS IDs, UE ID, SIMs, or any combination thereof. By way of example, the one or more processors 902 may be configured to determine a location estimation for the plurality of UEs, and determine the DL PRS, UL-PRS, RTT, SL-PRS, or combination thereof for the common set of PRS accordingly. In another example, the one or more processors 902 may receive, via communication interface 910, a recommendation for the DL PRS, UL-PRS, RTT, SL-PRS, or combination thereof, from one or more UEs and may determine the DL PRS, UL-PRS, RTT, SL-PRS, or combination thereof for the common set of PRS based on the recommendation. In another example, the one or more processors 902 may receive a location measurement report from one or more UEs, and determine the DL PRS, UL-PRS, RTT, SL-PRS, or combination thereof for the common set of PRS based on the location of the UEs from the location measurement report. In another implementation, the one or more processors 902 may receive, via communication interface 910, may receive the common set of PRS from one or more UEs, e.g., where the one or more UEs have selected the DL PRS, UL-PRS, RTT, SL-PRS, or combination thereof, to be used in the common set of PRS.

The medium 920 and/or memory 904 may include a message unit 924 that when implemented by the one or more processors 902 configures the one or more processors 902 to send, via the communications interface 910, messages to each UE in a plurality of UEs, such as measurement requests or assistance data messages. In some implementations, the message may comprise an indication of the common set of PRS selected by the location server 900, e.g., based on identifiers of the PRS or reference to indices from which the common set of PRS may be determined. In some implementations, the message may comprise configuration information for a plurality of DL PRS, UL-PRS, RTT, SL-PRS, or combination thereof, and/or an indication of PRS available for measurement and from which the common set of positioning reference signals may be selected by the UEs. In some implementations, the message may include an identification of a plurality of UEs and an indication that the plurality of UEs is included in a joint positioning session.

The medium 920 and/or memory 904 may include location information report unit 926 that when implemented by the one or more processors 902 configures the one or more processors 902 to receive, via the communications interface 910, location information from each UE and/or base station in the joint positioning session. The location information from each UE may include, e.g., the DL PRS measurements, UL PRS measurements, RTT measurements, SL-PRS measurements, or a combination thereof, made by each UE. The positioning measurement, for example, may be a timing measurement such as TOA, Rx-Tx, RTT, etc., an angle measurement such as AoA, a power measurement such as RSRP, or a combination thereof.

The medium 920 and/or memory 904 may include a joint positioning unit 928 that when implemented by the one or more processors 902 configures the one or more processors 902 to jointly determine a position estimate for each UE using the location information received from each UE. For example, the position measurements from each UE, along with known positions of the base stations, may be used to determine the position of each UE using multilateration, the intersection of multiple AoAs, or other known positioning techniques. The one or more processors 902 may be further configured to send to each UE, via the communication interface 910, the position estimate that corresponds to each UE. The one or more processors 902 may be further configured to select a group of UEs for the joint positioning session, e.g., based on previously determined positions of the UEs or common server cell IDs, etc.

The medium 920 and/or memory 904 may include a scheduling unit 930 that when implemented by the one or more processors 902 configures the one or more processors 902 to schedule the DL PRS with the one or more base stations included in the common set of PRS.

The methodologies described herein may be implemented by various means depending upon the application. For example, these methodologies may be implemented in hardware, firmware, software, or any combination thereof. For a hardware implementation, the one or more processors may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For an implementation involving firmware and/or software, the methodologies may be implemented with modules (e.g., procedures, functions, and so on) that perform the separate functions described herein. Any machine-readable medium tangibly embodying instructions may be used in implementing the methodologies described herein. For example, software codes may be stored in a memory and executed by one or more processor units, causing the processor units to operate as a special purpose computer programmed to perform the algorithms disclosed herein. Memory may be implemented within the one or more processors or external to the one or more processors. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or program code 908 on a non-transitory computer readable medium, such as medium 920 and/or memory 904. Examples include computer readable media encoded with a data structure and computer readable media encoded with a computer program 908. For example, the non-transitory computer readable medium including program code 908 stored thereon may include program code 908 to support joint positioning sessions that use a selected common set of PRS, and in some implementations sidelink assisted positioning, in a manner consistent with disclosed embodiments. Non-transitory computer readable medium 920 includes physical computer storage media. A storage medium may be any available medium that can be accessed by a computer. By way of example, and not limitation, such non-transitory computer readable media can comprise RAM, ROM, EEPROM, CD-ROM or other optical disk storage, magnetic disk storage or other magnetic storage devices, or any other medium that can be used to store desired program code 908 in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer readable media.

In addition to storage on computer-readable storage medium, instructions and/or data may be provided as signals on transmission media included in a communication apparatus. For example, a communication apparatus may include a transceiver having signals indicative of instructions and data. The instructions and data are stored on non-transitory computer readable media, e.g., memory 904, and are configured to cause the one or more processors to operate as a special purpose computer programmed to perform the procedures and techniques disclosed herein. That is, the communication apparatus includes transmission media with signals indicative of information to perform disclosed functions.

Figure 10:
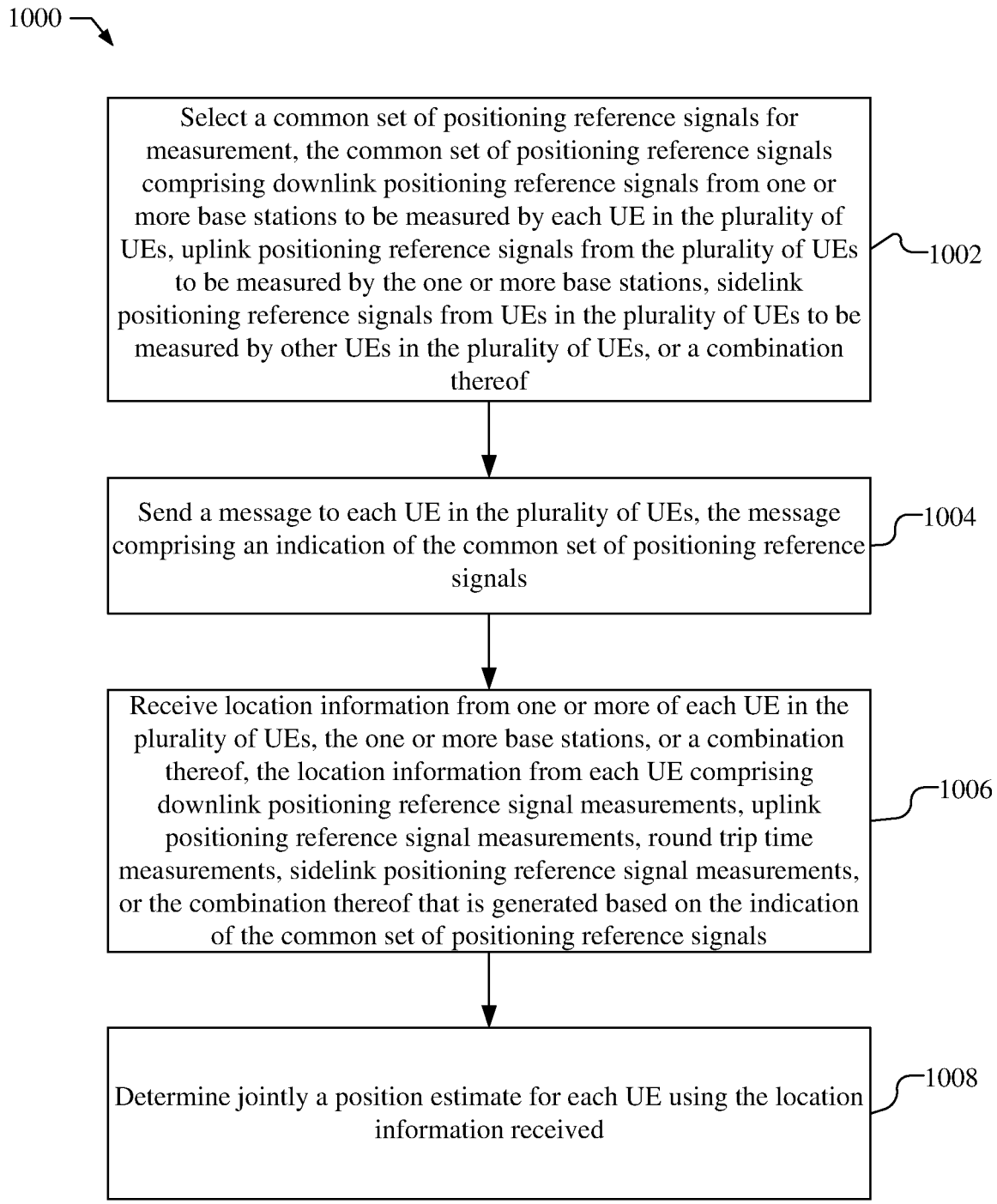
FIG. 10 shows a flowchart for an exemplary method to support joint positioning of a plurality of UEs, in a manner consistent with disclosed implementation

FIG. 10 shows a flowchart for an exemplary method 1000, e.g., performed by a location server such as LMF 120, to support joint positioning of a plurality of user equipments (UEs), such as UEs 105 and 106, in a manner consistent with disclosed implementation.

At block 1002, a common set of positioning reference signals for measurement are selected, the common set of positioning reference signals comprising downlink positioning reference signals from one or more base stations to be measured by each UE in the plurality of UEs, uplink positioning reference signals from the plurality of UEs to be measured by the one or more base stations, sidelink positioning reference signals from UEs in the plurality of UEs to be measured by other UEs in the plurality of UEs, or a combination thereof, e.g., as discussed at stage 4 of FIG. 6. The common set of positioning reference signals, for example, may comprise one or more of positioning reference signal (PRS) resource identifier (ID), PRS resource set ID, transmission point (TRP) ID, Cell ID, sidelink-PRS ID, UE ID, Subscriber Identity Module (SIM), or any combination thereof. A means for selecting a common set of positioning reference signals for measurement, the common set of positioning reference signals comprising downlink positioning reference signals from one or more base stations to be measured by each UE in the plurality of UEs, uplink positioning reference signals from the plurality of UEs to be measured by the one or more base stations, sidelink positioning reference signals from UEs in the plurality of UEs to be measured by other UEs in the plurality of UEs, or a combination thereof may be, e.g., the one or more processors 902 with dedicated hardware or implementing executable code or software instructions in memory 904 and/or medium 920 such as the common PRS unit 922 of location server 900.

At block 1004, a message is sent to each UE in the plurality of UEs, the message comprising an indication of the common set of positioning reference signals, e.g., as discussed at stages 7 and 8 of FIG. 6. A means for sending a message to each UE in the plurality of UEs, the message comprising an indication of the common set of positioning reference signals may be, e.g., the communications interface 910 and one or more processors 902 with dedicated hardware or implementing executable code or software instructions in memory 904 and/or medium 920 such as the message unit 924 of location server 900.

At block 1006, location information from one or more of each UE in the plurality of UEs, the one or more base stations, or a combination thereof, is received, the location information comprising downlink positioning reference signal measurements, uplink positioning reference signal measurements, round trip time measurements, sidelink positioning reference signal measurements, or the combination thereof that is generated based on the indication of the common set of positioning reference signals, e.g., as discussed at stages 13, 14 and 15 of FIG. 6. A means for receiving location information from one or more of each UE in the plurality of UEs, the one or more base stations, or a combination thereof, the location information from each UE comprising downlink positioning reference signal measurements, uplink positioning reference signal measurements, round trip time measurements, sidelink positioning reference signal measurements, or the combination thereof that is generated based on the indication of the common set of positioning reference signals may be, e.g., the communications interface 910 and one or more processors 902 with dedicated hardware or implementing executable code or software instructions in memory 904 and/or medium 920 such as the location information report unit 926 of location server 900.

At block 1008, the location server determines jointly a position estimate for each UE using the location information received, e.g., as discussed at stage 16 of FIG. 6. A means for determining jointly a position estimate for each UE using the location information received may be, e.g., the one or more processors 902 with dedicated hardware or implementing executable code or software instructions in memory 904 and/or medium 920 such as the joint positioning unit 928 of location server 900.

In one implementation, the location server may select the plurality of UEs for joint positioning before selecting the common set of positioning reference signals, e.g., as discussed at stage 3 of FIG. 6. A means for selecting the plurality of UEs for joint positioning before selecting the common set of positioning reference signals may be, e.g., the one or more processors 902 with dedicated hardware or implementing executable code or software instructions in memory 904 and/or medium 920 such as the joint positioning unit 928 of location server 900.

In one implementation, the common set of positioning reference signals for measurement may be selected by the UE by determining a location estimation for the plurality of UEs, and determining the downlink positioning reference signals, the uplink positioning reference signals, the sidelink positioning reference signals, or the combination thereof included in the common set of positioning reference signals based on the location estimation for the plurality of UEs and the UEs included in the plurality of UEs, e.g., as discussed at stage 3 of FIG. 6. A means for determining a location estimation for the plurality of UEs, and a means for determining the downlink positioning reference signals, the uplink positioning reference signals, the sidelink positioning reference signals, or the combination thereof included in the common set of positioning reference signals based on the location estimation for the plurality of UEs and the UEs included in the plurality of UEs may be, e.g., the communications interface 910 and one or more processors 902 with dedicated hardware or implementing executable code or software instructions in memory 904 and/or medium 920 such as the common PRS unit 922 of location server 900.

In one implementation, the common set of positioning reference signals for measurement may be selected by the UE by receiving, from one or more UEs from the plurality of UEs, a recommendation for the downlink positioning reference signals, the uplink positioning reference signals, the sidelink positioning reference signals, or the combination thereof to be included in the common set of positioning reference signals; and determining the downlink positioning reference signals, the uplink positioning reference signals, the sidelink positioning reference signals, or the combination thereof included in the common set of positioning reference signals based on the recommendation received from the one or more UEs, e.g., as discussed at stage 3 of FIG. 6. A means for receiving, from one or more UEs from the plurality of UEs, a recommendation for the downlink positioning reference signals, the uplink positioning reference signals, the sidelink positioning reference signals, or the combination thereof to be included in the common set of positioning reference signals; and a means for determining the downlink positioning reference signals, the uplink positioning reference signals, the sidelink positioning reference signals, or the combination thereof included in the common set of positioning reference signals based on the recommendation received from the one or more UEs may be, e.g., the communications interface 910 and one or more processors 902 with dedicated hardware or implementing executable code or software instructions in memory 904 and/or medium 920 such as the common PRS unit 922 of location server 900.

In one implementation, the common set of positioning reference signals for measurement may be selected by the UE by receiving a location measurement report from one or more UEs from the plurality of UEs; and determining the downlink positioning reference signals, the uplink positioning reference signals, the sidelink positioning reference signals, or the combination thereof included in the common set of positioning reference signals based on the location measurement report received from the one or more UEs, e.g., as discussed at stage 3 of FIG. 6. A means for receiving a location measurement report from one or more UEs from the plurality of UEs; and determining the downlink positioning reference signals, the uplink positioning reference signals, the sidelink positioning reference signals, or the combination thereof included in the common set of positioning reference signals based on the location measurement report received from the one or more UEs may be, e.g., the communications interface 910 and one or more processors 902 with dedicated hardware or implementing executable code or software instructions in memory 904 and/or medium 920 such as the common PRS unit 922 of location server 900.

In one implementation, the location server may further schedule the downlink positioning reference signals with the one or more base stations included in the common set of positioning reference signals, e.g., as discussed at stages 5A and 5B of FIG. 6. A means for scheduling the downlink positioning reference signals with the one or more base stations included in the common set of positioning reference signals may be, e.g., the communications interface 910 and one or more processors 902 with dedicated hardware or implementing executable code or software instructions in memory 904 and/or medium 920 such as the scheduling unit 930 of location server 900.

In one implementation, the location server may further send each UE in the plurality of UEs a corresponding position estimate, e.g., as discussed at stage 16 of FIG. 6. A means for sending each UE in the plurality of UEs a corresponding position estimate may be, e.g., the one or more processors 902 with dedicated hardware or implementing executable code or software instructions in memory 904 and/or medium 920 such as the joint positioning unit 928 of location server 900.

Figure 11:
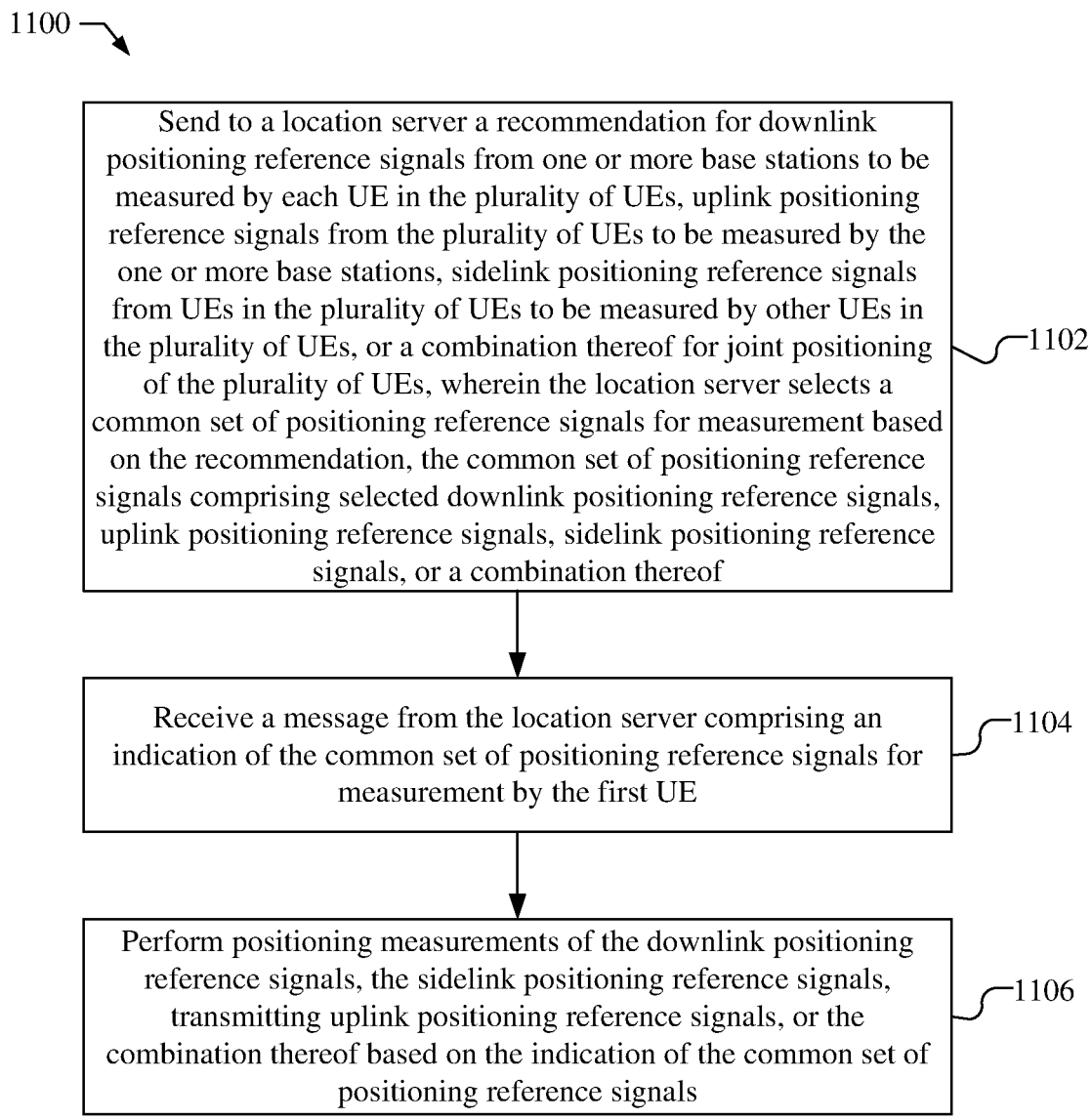
FIG. 11 shows a flowchart for an exemplary method to support joint positioning of a plurality of UEs, in a manner consistent with disclosed implementation

FIG. 11 shows a flowchart for an exemplary method 1100, e.g., performed by a UE, such as UE 105, to support joint positioning of a plurality of user equipments (UEs), such as UEs 105 and 106, in a manner consistent with disclosed implementation.

At block 1102, the UE sends to a location server a recommendation for downlink positioning reference signals from one or more base stations to be measured by each UE in the plurality of UEs, uplink positioning reference signals from the plurality of UEs to be measured by the one or more base stations, sidelink positioning reference signals from UEs in the plurality of UEs to be measured by other UEs in the plurality of UEs, or a combination thereof for joint positioning of the plurality of UEs, wherein the location server selects a common set of positioning reference signals for measurement based on the recommendation, the common set of positioning reference signals comprising selected downlink positioning reference signals, uplink positioning reference signals, sidelink positioning reference signals, or a combination thereof, e.g., as discussed at stage 4 of FIG. 6. For example, the plurality of UEs for the joint positioning may be selected by the location server. The common set of positioning reference signals may comprise one or more of positioning reference signal (PRS) resource identifier (ID), PRS resource set ID, transmission point (TRP) ID, Cell ID, sidelink-PRS ID, UE ID, Subscriber Identity Module (SIM), or any combination thereof. A means for sending to a location server a recommendation for downlink positioning reference signals from one or more base stations to be measured by each UE in the plurality of UEs, uplink positioning reference signals from the plurality of UEs to be measured by the one or more base stations, sidelink positioning reference signals from UEs in the plurality of UEs to be measured by other UEs in the plurality of UEs, or a combination thereof for joint positioning of the plurality of UEs, wherein the location server selects a common set of positioning reference signals for measurement based on the recommendation, the common set of positioning reference signals comprising selected downlink positioning reference signals, uplink positioning reference signals, sidelink positioning reference signals, or a combination thereof may be, e.g., the wireless transceiver 810 and one or more processors 802 with dedicated hardware or implementing executable code or software instructions in memory 804 and/or medium 820 such as the common PRS unit 822 of UE 800.

At block 1104, a message is received from the location server that comprises an indication of the common set of positioning reference signals for measurement by the first UE, e.g., as discussed at stage 7 of FIG. 6. A means for receiving a message from the location server comprising an indication of the common set of positioning reference signals for measurement by the first UE may be, e.g., the wireless transceiver 810 and one or more processors 802 with dedicated hardware or implementing executable code or software instructions in memory 804 and/or medium 820 such as the message unit 824 of UE 800.

At block 1106, the UE performs positioning measurements of the downlink positioning reference signals, the sidelink positioning reference signals, transmitting uplink positioning reference signals, or the combination thereof based on the indication of the common set of positioning reference signals, e.g., as discussed at stages 10A and 12A of FIG. 6. A means for performing positioning measurements of the downlink positioning reference signals, the sidelink positioning reference signals, transmitting uplink positioning reference signals, or the combination thereof based on the indication of the common set of positioning reference signals may be, e.g., the wireless transceiver 810 and one or more processors 802 with dedicated hardware or implementing executable code or software instructions in memory 804 and/or medium 820 such as the positioning measurement unit 826 of UE 800.

In one implementation, the UE may send a location information report to the location server that comprises the positioning measurements of the downlink positioning reference signals, the sidelink positioning reference signals, or the combination thereof, e.g., as discussed at stage 13 of FIG. 6. A means for sending a location information report to the location server comprising the positioning measurements of the downlink positioning reference signals, the sidelink positioning reference signals, or the combination thereof may be, e.g., the wireless transceiver 810 and one or more processors 802 with dedicated hardware or implementing executable code or software instructions in memory 804 and/or medium 820 such as the reporting unit 828 of UE 800. In one example, the location server may jointly determine a position estimate for each UE in the plurality of UEs based on the location information report and location information reports received from at least one of other UEs and the one or more base stations, or a combination thereof. The UE may further receive from the location server the position estimate for the UE, e.g., as discussed at stage 16 of FIG. 6. A means for receiving from the location server the position estimate for the UE may be, e.g., the wireless transceiver 810 and one or more processors 802 with dedicated hardware or implementing executable code or software instructions in memory 804 and/or medium 820 such as the position unit 830 of UE 800.

FIG. 12 shows a flowchart for an exemplary method 1200, e.g., performed by a location server such as LMF 120, to support joint positioning of a plurality of user equipments (UEs), such as UEs 105 and 106, in a manner consistent with disclosed implementation.

At block 1202, the location server receives, from one or more UEs from the plurality of UEs, an indication of a common set of positioning reference signals for measurement, the common set of positioning reference signals comprising downlink positioning reference signals from one or more base stations to be measured by each UE in the plurality of UEs, uplink positioning reference signals from the plurality of UEs to be measured by the one or more base stations, sidelink positioning reference signals from UEs in the plurality of UEs to be measured by other UEs in the plurality of UEs, or a combination thereof, e.g., as discussed at stages 8 and 9 of FIG. 7. The common set of positioning reference signals, for example, may comprise one or more of positioning reference signal (PRS) resource identifier (ID), PRS resource set ID, transmission point (TRP) ID, Cell ID, sidelink-PRS ID, UE ID, Subscriber Identity Module (SIM), or any combination thereof. A means for receiving, from one or more UEs from the plurality of UEs, an indication of a common set of positioning reference signals for measurement, the common set of positioning reference signals comprising downlink positioning reference signals from one or more base stations to be measured by each UE in the plurality of UEs, uplink positioning reference signals from the plurality of UEs to be measured by the one or more base stations, sidelink positioning reference signals from UEs in the plurality of UEs to be measured by other UEs in the plurality of UEs, or a combination thereof may be, e.g., the communications interface 910 and one or more processors 902 with dedicated hardware or implementing executable code or software instructions in memory 904 and/or medium 920 such as the common PRS unit 922 of location server 900.

At block 1204, the location server receives location information from one or more of each UE in the plurality of UEs, the one or more base stations, or a combination thereof, the location information comprising downlink positioning reference signal measurements, uplink positioning reference signal measurements, round trip time measurements, sidelink positioning reference signal measurements, or the combination thereof generated from the common set of positioning reference signals, e.g., as discussed at stages 16, 17, and 18 of FIG. 7. A means for receiving location information from one or more of each UE in the plurality of UEs, the one or more base stations, or a combination thereof, the location information comprising downlink positioning reference signal measurements, uplink positioning reference signal measurements, round trip time measurements, sidelink positioning reference signal measurements, or the combination thereof generated from the common set of positioning reference signals may be, e.g., the communications interface 910 and one or more processors 902 with dedicated hardware or implementing executable code or software instructions in memory 904 and/or medium 920 such as the location information report unit 926 of location server 900.

At block 1206, the location server determines jointly a position estimate for each UE using the location information received, e.g., as discussed at stage 19 of FIG. 7. A means for determining jointly a position estimate for each UE using the location information received may be, e.g., the one or more processors 902 with dedicated hardware or implementing executable code or software instructions in memory 904 and/or medium 920 such as the joint positioning unit 928 of location server 900.

In one implementation, the location server may send a message to each UE in the plurality of UEs, the message comprising configuration information for a plurality of downlink positioning reference signals, a plurality of uplink positioning reference signals, a plurality of sidelink positioning reference signals, or the combination thereof, from which the common set of positioning reference signals is selected by the one or more UEs, e.g., as discussed at stages 5A and 5B or 6 and 7 of FIG. 7. A means for sending a message to each UE in the plurality of UEs, the message comprising configuration information for a plurality of downlink positioning reference signals, a plurality of uplink positioning reference signals, a plurality of sidelink positioning reference signals, or the combination thereof, from which the common set of positioning reference signals is selected by the one or more UEs may be, e.g., the communications interface 910 and one or more processors 902 with dedicated hardware or implementing executable code or software instructions in memory 904 and/or medium 920 such as the message unit 924 of location server 900.

In one implementation, the location server may further schedule the plurality of downlink positioning reference signals with the one or more base stations before receiving the common set of positioning reference signals, e.g., as discussed at stages 4A and 4B of FIG. 7. A means for scheduling the plurality of downlink positioning reference signals with the one or more base stations before receiving the common set of positioning reference signals may be, e.g., the communications interface 910 and one or more processors 902 with dedicated hardware or implementing executable code or software instructions in memory 904 and/or medium 920 such as the scheduling unit 930 of location server 900. The location server may further schedule the downlink positioning reference signals with the one or more base stations after receiving the common set of positioning reference signals, e.g., as discussed at stages 10 and 11 of FIG. 7. A means for scheduling the downlink positioning reference signals with the one or more base stations after receiving the common set of positioning reference signals may be, e.g., the communications interface 910 and one or more processors 902 with dedicated hardware or implementing executable code or software instructions in memory 904 and/or medium 920 such as the scheduling unit 930 of location server 900.

In one implementation, the location server may further select the plurality of UEs for joint positioning, e.g., as discussed at stage 3 of FIG. 7. The location server may additionally send to each UE in the plurality of UEs an identification of the plurality of UEs and an indication that the plurality of UEs is included in a joint positioning session, e.g., as discussed at stages 6 and 7 of FIG. 7. A means for selecting the plurality of UEs for joint positioning may be, e.g., the one or more processors 902 with dedicated hardware or implementing executable code or software instructions in memory 904 and/or medium 920 such as the joint positioning unit 928 of location server 900. A means for sending to each UE in the plurality of UEs an identification of the plurality of UEs and an indication that the plurality of UEs is included in a joint positioning session may be, e.g., the communications interface 910 and one or more processors 902 with dedicated hardware or implementing executable code or software instructions in memory 904 and/or medium 920 such as the joint positioning unit 928 and the message unit 924 of location server 900.

In one implementation, the location server may further send each UE in the plurality of UEs a corresponding position estimate, e.g., as discussed at stage 19 of FIG. 7. A means for sending each UE in the plurality of UEs a corresponding position estimate may be, e.g., the one or more processors 902 with dedicated hardware or implementing executable code or software instructions in memory 904 and/or medium 920 such as the joint positioning unit 928 of location server 900.

Figure 13:
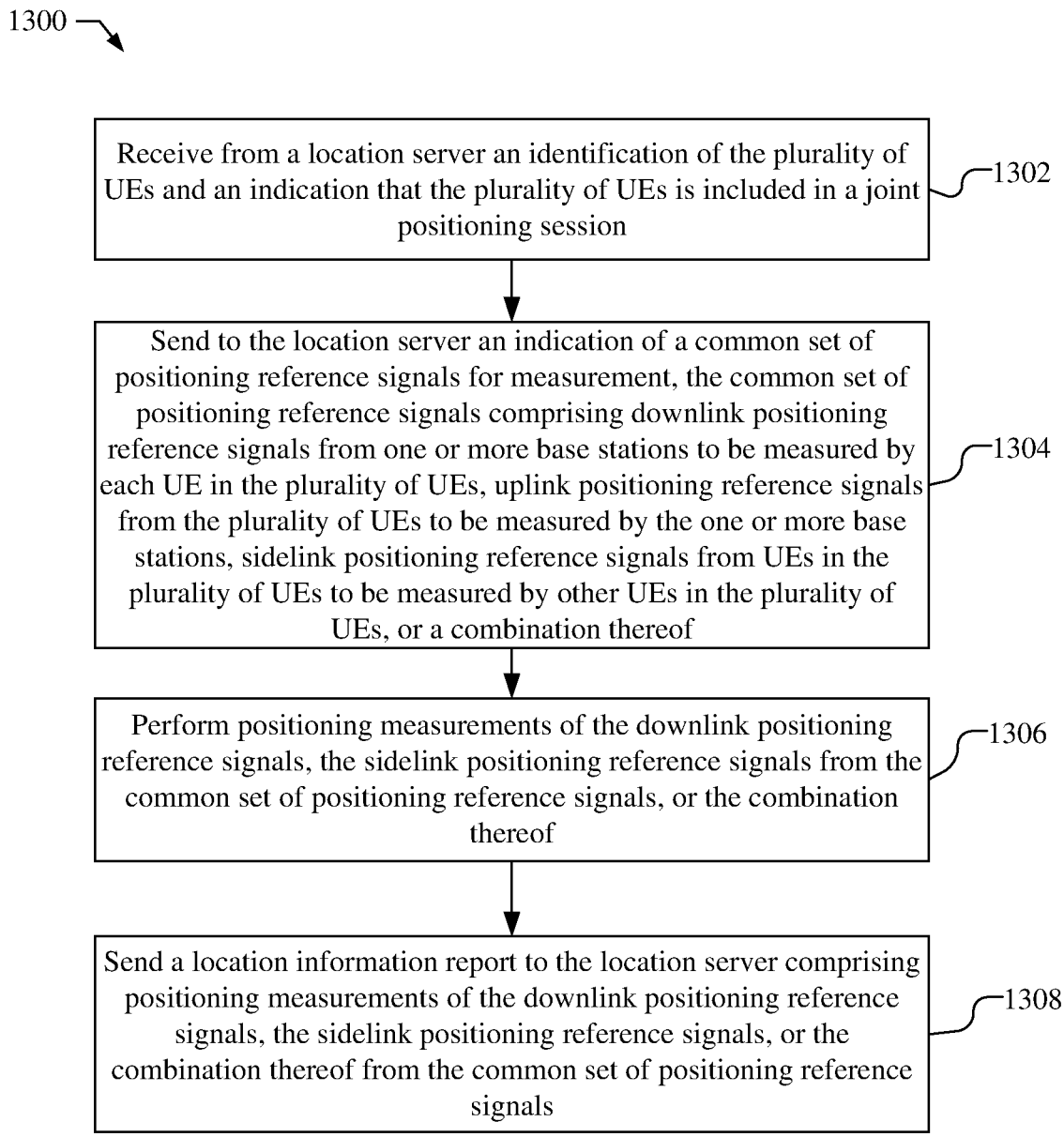
FIG. 13 shows a flowchart for an exemplary method to support joint positioning of a plurality of UEs, in a manner consistent with disclosed implementation Elements are indicated by numeric labels in the figures with like numbered elements in different figures representing the same element or similar elements. Different instances of a common element are indicated by following a numeric label for the common element with a distinct numeric suffix. In this case, a reference to the numeric label without a suffix indicates any instance of the common element.

FIG. 13 shows a flowchart for an exemplary method 1300, e.g., performed by a UE, such as UE 105, to support joint positioning of a plurality of user equipments (UEs), such as UEs 105 and 106, in a manner consistent with disclosed implementation.

At block 1302, the UE receives from a location server an identification of the plurality of UEs and an indication that the plurality of UEs is included in a joint positioning session, e.g., as discussed at stage 6 of FIG. 7. A means for receiving from a location server an identification of the plurality of UEs and an indication that the plurality of UEs is included in a joint positioning session may be, e.g., the wireless transceiver 810 and one or more processors 802 with dedicated hardware or implementing executable code or software instructions in memory 804 and/or medium 820 such as the common PRS unit 822 of UE 800.

At block 1304, the UE sends to the location server an indication of a common set of positioning reference signals for measurement, the common set of positioning reference signals comprising downlink positioning reference signals from one or more base stations to be measured by each UE in the plurality of UEs, uplink positioning reference signals from the plurality of UEs to be measured by the one or more base stations, sidelink positioning reference signals from UEs in the plurality of UEs to be measured by other UEs in the plurality of UEs, or a combination thereof, e.g., as discussed at stage 9 of FIG. 7. The common set of positioning reference signals may comprise one or more of positioning reference signal (PRS) resource identifier (ID), PRS resource set ID, transmission point (TRP) ID, Cell ID, sidelink-PRS ID, UE ID, Subscriber Identity Module (SIM), or any combination thereof. A means for sending to the location server an indication of a common set of positioning reference signals for measurement, the common set of positioning reference signals comprising downlink positioning reference signals from one or more base stations to be measured by each UE in the plurality of UEs, uplink positioning reference signals from the plurality of UEs to be measured by the one or more base stations, sidelink positioning reference signals from UEs in the plurality of UEs to be measured by other UEs in the plurality of UEs, or a combination thereof may be, e.g., the wireless transceiver 810 and one or more processors 802 with dedicated hardware or implementing executable code or software instructions in memory 804 and/or medium 820 such as the common PRS unit 822 of UE 800.

At block 1306, the UE performs positioning measurements of the downlink positioning reference signals, the sidelink positioning reference signals from the common set of positioning reference signals, transmitting uplink positioning reference signals, or the combination thereof from the common set of positioning reference signals, e.g., as discussed at stages 13A and 15A of FIG. 7. A means for performing positioning measurements of the downlink positioning reference signals, the sidelink positioning reference signals from the common set of positioning reference signals, transmitting uplink positioning reference signals, or the combination thereof from the common set of positioning reference signals may be, e.g., the wireless transceiver 810 and one or more processors 802 with dedicated hardware or implementing executable code or software instructions in memory 804 and/or medium 820 such as the positioning measurement unit 826 of UE 800.

In one implementation, the UE may receive a message from the location server, the message comprising configuration information for a plurality of downlink positioning reference signals, a plurality of uplink positioning reference signals, a plurality of sidelink positioning reference signals, or a combination thereof, from which the common set of positioning reference signals is selected by one or more UEs in the plurality of UEs, e.g., as discussed at stages 5A or 6 of FIG. 7. The identification of the plurality of UEs and the indication that the plurality of UEs included in the joint positioning session, for example, may be in the message. A means for receiving a message from the location server, the message comprising configuration information for a plurality of downlink positioning reference signals, a plurality of uplink positioning reference signals, a plurality of sidelink positioning reference signals, or a combination thereof, from which the common set of positioning reference signals is selected by one or more UEs in the plurality of UEs may be, e.g., the wireless transceiver 810 and one or more processors 802 with dedicated hardware or implementing executable code or software instructions in memory 804 and/or medium 820 such as the message unit 824 of UE 800.

In one implementation, the UE may further receive, from at least one other UE in the plurality of UEs, a recommendation for the downlink positioning reference signals, the uplink positioning reference signals, the sidelink positioning reference signals, or the combination thereof to be included in the common set of positioning reference signals, e.g., as discussed at stage 8 of FIG. 7. The UE may determine the downlink positioning reference signals, the uplink positioning reference signals, the sidelink positioning reference signals, or the combination thereof that are included in the common set of positioning reference signals based on the recommendation received from the at least one other UE, e.g., as discussed at stage 8 of FIG. 7. The UE may send the common set of positioning reference signals to each other UE, e.g., as discussed at stage 8 of FIG. 7. A means for receiving, from at least one other UE in the plurality of UEs, a recommendation for the downlink positioning reference signals, the uplink positioning reference signals, the sidelink positioning reference signals, or the combination thereof to be included in the common set of positioning reference signals may be, e.g., the wireless transceiver 810 and one or more processors 802 with dedicated hardware or implementing executable code or software instructions in memory 804 and/or medium 820 such as the common PRS unit 822 of UE 800. A means for determining the downlink positioning reference signals, the uplink positioning reference signals, the sidelink positioning reference signals, or the combination thereof that are included in the common set of positioning reference signals based on the recommendation received from the at least one other UE may be, e.g., the one or more processors 802 with dedicated hardware or implementing executable code or software instructions in memory 804 and/or medium 820 such as the common PRS unit 822 of UE 800. A means for sending the common set of positioning reference signals to each other UE may be, e.g., the wireless transceiver 810 and one or more processors 802 with dedicated hardware or implementing executable code or software instructions in memory 804 and/or medium 820 such as the common PRS unit 822 of UE 800.

In one implementation, the UE may further send, to at least one other UE in the plurality of UEs, a first recommendation for the downlink positioning reference signals, the uplink positioning reference signals, the sidelink positioning reference signals, or the combination thereof to be included in the common set of positioning reference signals, e.g., as discussed at stage 8 of FIG. 7. The UE may receive, from at least one other UE in the plurality of UEs, a second recommendation for the downlink positioning reference signals, the uplink positioning reference signals, the sidelink positioning reference signals, or the combination thereof to be included in the common set of positioning reference signals wherein the common set of positioning reference signals is determined by consensus of the plurality of UEs, e.g., as discussed at stage 8 of FIG. 7. A means for sending, to at least one other UE in the plurality of UEs, a first recommendation for the downlink positioning reference signals, the uplink positioning reference signals, the sidelink positioning reference signals, or the combination thereof to be included in the common set of positioning reference signals may be, e.g., the wireless transceiver 810 and one or more processors 802 with dedicated hardware or implementing executable code or software instructions in memory 804 and/or medium 820 such as the common PRS unit 822 of UE 800. A mean for receiving, from at least one other UE in the plurality of UEs, a second recommendation for the downlink positioning reference signals, the uplink positioning reference signals, the sidelink positioning reference signals, or the combination thereof to be included in the common set of positioning reference signals, wherein the common set of positioning reference signals is determined by consensus of the plurality of UEs may be, e.g., the wireless transceiver 810 and one or more processors 802 with dedicated hardware or implementing executable code or software instructions in memory 804 and/or medium 820 such as the common PRS unit 822 of UE 800.

In one implementation, the UE may send a location information report to the location server comprising the positioning measurements of the downlink positioning reference signals, the sidelink positioning reference signals, or the combination thereof, e.g., as discussed at stage 16 of FIG. 7. A means for sending a location information report to the location server comprising the positioning measurements of the downlink positioning reference signals, the sidelink positioning reference signals, or the combination thereof may be, e.g., the wireless transceiver 810 and one or more processors 802 with dedicated hardware or implementing executable code or software instructions in memory 804 and/or medium 820 such as the reporting unit 828 of UE 800. In one example, the UE may further receive from the location server a position estimate for the UE, determined jointly with position estimates for other UEs in the plurality of UEs based on the location information report and location information reports received from at least one of other UEs and the one or more base stations, or a combination thereof, e.g., as discussed at stage 19 of FIG. 7. A means for receiving from the location server the position estimate for the UE may be, e.g., the wireless transceiver 810 and one or more processors 802 with dedicated hardware or implementing executable code or software instructions in memory 804 and/or medium 820 such as the position unit 830 of UE 800.

Substantial variations may be made in accordance with specific desires. For example, customized hardware might also be used, and/or particular elements might be implemented in hardware, software (including portable software, such as applets, etc.), or both. Further, connection to other computing devices such as network input/output devices may be employed.

Configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Unless defined otherwise, all technical and scientific terms used herein have the same meaning as commonly or conventionally understood. As used herein, the articles "a" and "an" refer to one or to more than one (i.e., to at least one) of the grammatical object of the article. By way of example, "an element" means one element or more than one element. "About" and/or "approximately" as used herein when referring to a measurable value such as an amount, a temporal duration, and the like, encompasses variations of ±20% or ±10%, ±5%, or +0.1% from the specified value, as such variations are appropriate in the context of the systems, devices, circuits, methods, and other implementations described herein. "Substantially" as used herein when referring to a measurable value such as an amount, a temporal duration, a physical attribute (such as frequency), and the like, also encompasses variations of ±20% or ±10%, ±5%, or +0.1% from the specified value, as such variations are appropriate in the context of the systems, devices, circuits, methods, and other implementations described herein.

As used herein, including in the claims, "or" as used in a list of items prefaced by "at least one of" or "one or more of" indicates a disjunctive list such that, for example, a list of "at least one of A, B, or C" means A or B or C or AB or AC or BC or ABC (i.e., A and B and C), or combinations with more than one feature (e.g., AA, AAB, ABBC, etc.). Also, as used herein, unless otherwise stated, a statement that a function or operation is "based on" an item or condition means that the function or operation is based on the stated item or condition and may be based on one or more items and/or conditions in addition to the stated item or condition.

As used herein, a mobile device, user equipment (UE), or mobile station (MS) refers to a device such as a cellular or other wireless communication device, a smartphone, tablet, personal communication system (PCS) device, personal navigation device (PND), Personal Information Manager (PIM), Personal Digital Assistant (PDA), laptop or other suitable mobile device which is capable of receiving wireless communication and/or navigation signals, such as navigation positioning signals. The term "mobile station" (or "mobile device". "wireless device" or "user equipment") is also intended to include devices which communicate with a personal navigation device (PND), such as by short-range wireless, infrared, wireline connection, or other connection—regardless of whether satellite signal reception, assistance data reception, and/or position-related processing occurs at the device or at the PND. Also, a "mobile station" or "user equipment" is intended to include all devices, including wireless communication devices, computers, laptops, tablet devices, etc., which are capable of communication with a server, such as via the Internet, WiFi, or other network, and to communicate with one or more types of nodes, regardless of whether satellite signal reception, assistance data reception, and/or position-related processing occurs at the device, at a server, or at another device or node associated with the network. Any operable combination of the above are also considered a "mobile station" or "user equipment." A mobile device or user equipment (UE) may also be referred to as a mobile terminal, a terminal, a device, a Secure User Plane Location Enabled Terminal (SET), a target device, a target, or by some other name In an embodiment, a first example independent claim may include a method for supporting location of a user equipment (UE) at a first wireless node, comprising receiving a first request for broadcast of an increased quantity of location-related information, the broadcast based on a wireless access type for the first wireless node; and broadcasting the increased quantity of location-related information using the wireless access type and based on the first request.

While some of the techniques, processes, and/or implementations presented herein may comply with all or part of one or more standards, such techniques, processes, and/or implementations may not, in some embodiments, comply with part or all of such one or more standards.

Implementation examples are described in the following numbered clauses:

1. A method for supporting joint positioning of a plurality of user equipments (UEs) performed by a location server, comprising:

selecting a common set of positioning reference signals for measurement, the common set of positioning reference signals comprising downlink positioning reference signals from one or more base stations to be measured by each UE in the plurality of UEs, uplink positioning reference signals from the plurality of UEs to be measured by the one or more base stations, sidelink positioning reference signals from UEs in the plurality of UEs to be measured by other UEs in the plurality of UEs, or a combination thereof;

sending a message to each UE in the plurality of UEs, the message comprising an indication of the common set of positioning reference signals;

receiving location information from one or more of each UE in the plurality of UEs, the one or more base stations, or a combination thereof, the location information comprising downlink positioning reference signal measurements, uplink positioning reference signal measurements, round trip time measurements, sidelink positioning reference signal measurements, or the combination thereof that is generated based on the indication of the common set of positioning reference signals; and determining jointly a position estimate for each UE using the location information received.

2. The method of clause 1, further comprising selecting the plurality of UEs for joint positioning before selecting the common set of positioning reference signals.

3. The method of either of clauses 1 or 2, wherein selecting the common set of positioning reference signals for measurement comprises:

determining a location estimation for the plurality of UEs; and determining the downlink positioning reference signals, the uplink positioning reference signals, the sidelink positioning reference signals, or the combination thereof included in the common set of positioning reference signals based on the location estimation for the plurality of UEs and the UEs included in the plurality of UEs.

4. The method of any of clauses 1-3, wherein selecting the common set of positioning reference signals for measurement comprises:

receiving, from one or more UEs from the plurality of UEs, a recommendation for the downlink positioning reference signals, the uplink positioning reference signals the sidelink positioning reference signals, or the combination thereof to be included in the common set of positioning reference signals; and determining the downlink positioning reference signals, the uplink positioning reference signals, the sidelink positioning reference signals, or the combination thereof included in the common set of positioning reference signals based on the recommendation received from the one or more UEs.

5. The method of any of clauses 1-4, wherein selecting the common set of positioning reference signals for measurement comprises:

receiving a location measurement report from one or more UEs from the plurality of UEs; and determining the downlink positioning reference signals, the uplink positioning reference signals, the sidelink positioning reference signals, or the combination thereof included in the common set of positioning reference signals based on the location measurement report received from the one or more UEs.

6. The method of any of clauses 1-5, further comprising scheduling the downlink positioning reference signals with the one or more base stations included in the common set of positioning reference signals.

7. The method of any of clauses 1-6, wherein the common set of positioning reference signals comprises one or more of positioning reference signal (PRS) resource identifier (ID), PRS resource set ID, transmission point (TRP) ID, Cell ID, sidelink-PRS ID, UE ID, Subscriber Identity Module (SIM), or any combination thereof.

8. The method of any of clauses 1-7, further comprising sending each UE in the plurality of UEs a corresponding position estimate.

9. A location server configured to support joint positioning of a plurality of user equipments (UEs), comprising:

a communications interface configured to communicate with entities in a wireless network;

at least one memory; and at least one processor coupled to the communications interface and the at least one memory, wherein the at least one processor is configured to:

select a common set of positioning reference signals for measurement, the common set of positioning reference signals comprising downlink positioning reference signals from one or more base stations to be measured by each UE in the plurality of UEs, uplink positioning reference signals from the plurality of UEs to be measured by the one or more base stations, sidelink positioning reference signals from UEs in the plurality of UEs to be measured by other UEs in the plurality of UEs, or a combination thereof;

send, via the communications interface, a message to each UE in the plurality of UEs, the message comprising an indication of the common set of positioning reference signals;

receive, via the communications interface, location information from one or more of each UE in the plurality of UEs, the one or more base stations, or a combination thereof, the location information comprising downlink positioning reference signal measurements, uplink positioning reference signal measurements, round trip time measurements, sidelink positioning reference signal measurements, or the combination thereof that is generated based on the indication of the common set of positioning reference signals; and determine jointly a position estimate for each UE using the location information received.

10. The location server of clause 9, wherein the at least one processor is further configured to select the plurality of UEs for joint positioning before selecting the common set of positioning reference signals.

11. The location server of either of clauses 9 or 10, wherein the at least one processor is configured to select the common set of positioning reference signals for measurement by being configured to:

determine a location estimation for the plurality of UEs; and determine the downlink positioning reference signals, the uplink positioning reference signals, the sidelink positioning reference signals, or the combination thereof included in the common set of positioning reference signals based on the location estimation for the plurality of UEs and the UEs included in the plurality of UEs.

12. The location server of any of clauses 9-11, wherein the at least one processor is configured to select the common set of positioning reference signals for measurement by being configured to:

receive, from one or more UEs from the plurality of UEs via the communications interface, a recommendation for the downlink positioning reference signals, the uplink positioning reference signals, the sidelink positioning reference signals, or the combination thereof to be included in the common set of positioning reference signals; and determine the downlink positioning reference signals, the uplink positioning reference signals, the sidelink positioning reference signals, or the combination thereof included in the common set of positioning reference signals based on the recommendation received from the one or more UEs.

13. The location server of any of clauses 9-12, wherein the at least one processor is configured to select the common set of positioning reference signals for measurement by being configured to:

receive, via the communications interface, a location measurement report from one or more UEs from the plurality of UEs; and determine the downlink positioning reference signals, the uplink positioning reference signals, the sidelink positioning reference signals, or the combination thereof included in the common set of positioning reference signals based on the location measurement report received from the one or more UEs.

14. The location server of any of clauses 9-13, wherein the at least one processor is further configured to schedule the downlink positioning reference signals with the one or more base stations included in the common set of positioning reference signals.

15. The location server of any of clauses 9-14, wherein the common set of positioning reference signals comprises one or more of positioning reference signal (PRS) resource identifier (ID), PRS resource set ID, transmission point (TRP) ID, Cell ID, sidelink-PRS ID, UE ID, Subscriber Identity Module (SIM), or any combination thereof.

16. The location server of any of clauses 9-15, wherein the at least one processor is further configured to send each UE in the plurality of UEs, via the communications interface, a corresponding position estimate.

17. A location server configured to support joint positioning of a plurality of user equipments (UEs), comprising:

means for selecting a common set of positioning reference signals for measurement, the common set of positioning reference signals comprising downlink positioning reference signals from one or more base stations to be measured by each UE in the plurality of UEs, uplink positioning reference signals from the plurality of UEs to be measured by the one or more base stations, sidelink positioning reference signals from UEs in the plurality of UEs to be measured by other UEs in the plurality of UEs, or a combination thereof;

means for sending a message to each UE in the plurality of UEs, the message comprising an indication of the common set of positioning reference signals;

means for receiving location information from one or more of each UE in the plurality of UEs, the one or more base stations, or a combination thereof, the location information comprising downlink positioning reference signal measurements, uplink positioning reference signal measurements, round trip time measurements, sidelink positioning reference signal measurements, or the combination thereof that is generated based on the indication of the common set of positioning reference signals; and means for determining jointly a position estimate for each UE using the location information received.

18. A non-transitory storage medium including program code stored thereon, the program code is operable to configure at least one processor in a location server to support joint positioning of a plurality of user equipments (UEs), comprising:

program code to select a common set of positioning reference signals for measurement, the common set of positioning reference signals comprising downlink positioning reference signals from one or more base stations to be measured by each UE in the plurality of UEs, uplink positioning reference signals from the plurality of UEs to be measured by the one or more base stations, sidelink positioning reference signals from UEs in the plurality of UEs to be measured by other UEs in the plurality of UEs, or a combination thereof;

program code to send a message to each UE in the plurality of UEs, the message comprising an indication of the common set of positioning reference signals;

program code to receive location information from one or more of each UE in the plurality of UEs, the one or more base stations, or a combination thereof, the location information comprising downlink positioning reference signal measurements, uplink positioning reference signal measurements, round trip time measurements, sidelink positioning reference signal measurements, or the combination thereof that is generated based on the indication of the common set of positioning reference signals; and program code to determine jointly a position estimate for each UE using the location information received.

19. A method for supporting joint positioning of a plurality of user equipments (UEs) performed by a first UE in the plurality of UEs, comprising:

sending to a location server a recommendation for downlink positioning reference signals from one or more base stations to be measured by each UE in the plurality of UEs, uplink positioning reference signals from the plurality of UEs to be measured by the one or more base stations, sidelink positioning reference signals from UEs in the plurality of UEs to be measured by other UEs in the plurality of UEs, or a combination thereof for joint positioning of the plurality of UEs, wherein the location server selects a common set of positioning reference signals for measurement based on the recommendation, the common set of positioning reference signals comprising selected downlink positioning reference signals, uplink positioning reference signals, sidelink positioning reference signals, or a combination thereof;

receiving a message from the location server comprising an indication of the common set of positioning reference signals for measurement by the first UE;

performing positioning measurements of the downlink positioning reference signals, the sidelink positioning reference signals, transmitting uplink positioning reference signals, or the combination thereof based on the indication of the common set of positioning reference signals.

20. The method of clause 19, wherein the plurality of UEs for the joint positioning is selected by the location server.

21. The method of either of clauses 19 or 20, wherein the common set of positioning reference signals comprises one or more of positioning reference signal (PRS) resource identifier (ID), PRS resource set ID, transmission point (TRP) ID, Cell ID, sidelink-PRS ID, UE ID, Subscriber Identity Module (SIM), or any combination thereof.

22. The method of any of clauses 19-21, further comprising:

sending a location information report to the location server comprising the positioning measurements of the downlink positioning reference signals, the sidelink positioning reference signals, or the combination thereof.

23. The method of clause 22, wherein the location server jointly determines a position estimate for each UE in the plurality of UEs based on the location information report and location information reports received from at least one of other UEs and the one or more base stations, or a combination thereof.

24. The method of clause 23, further comprising receiving from the location server the position estimate for the first UE.

25. A first user equipment (UE) in a plurality of UEs configured to support joint positioning of the plurality of UEs, comprising:

a wireless transceiver configured to communicate with entities in a wireless network;

at least one memory; and at least one processor coupled to the wireless transceiver and the at least one memory, wherein the at least one processor is configured to:

send, via the wireless transceiver, to a location server a recommendation for downlink positioning reference signals from one or more base stations to be measured by each UE in the plurality of UEs, uplink positioning reference signals from the plurality of UEs to be measured by the one or more base stations, sidelink positioning reference signals from UEs in the plurality of UEs to be measured by other UEs in the plurality of UEs, or a combination thereof for joint positioning of the plurality of UEs, wherein the location server selects a common set of positioning reference signals for measurement based on the recommendation, the common set of positioning reference signals comprising selected downlink positioning reference signals, uplink positioning reference signals, sidelink positioning reference signals, or a combination thereof;

receive, via the wireless transceiver, a message from the location server comprising an indication of the common set of positioning reference signals for measurement by the first UE; and perform positioning measurements of the downlink positioning reference signals, the sidelink positioning reference signals, transmitting uplink positioning reference signals, or the combination thereof based on the indication of the common set of positioning reference signals.

26. The first UE of clause 25, wherein the plurality of UEs for the joint positioning is selected by the location server.

27. The first UE of either of clauses 25 or 26, wherein the common set of positioning reference signals comprises one or more of positioning reference signal (PRS) resource identifier (ID), PRS resource set ID, transmission point (TRP) ID, Cell ID, sidelink-PRS ID, UE ID, Subscriber Identity Module (SIM), or any combination thereof.

28. The first UE of any of clauses 25-27, wherein the at least one processor is further configured to:
send, via the wireless transceiver, a location information report to the location server comprising the positioning measurements of the downlink positioning reference signals, the sidelink positioning reference signals, or the combination thereof.

29. The first UE of clause 28, wherein the location server jointly determines a position estimate for each UE in the plurality of UEs based on the location information report and location information reports received from other UEs.

30. The first UE of clause 29, wherein the at least one processor is further configured to receive from the location server, via the wireless transceiver, the position estimate for the first UE.

31. A first user equipment (UE) in a plurality of UEs configured to support joint positioning of the plurality of UEs, comprising:
means for sending to a location server a recommendation for downlink positioning reference signals from one or more base stations to be measured by each UE in the plurality of UEs, uplink positioning reference signals from the plurality of UEs to be measured by the one or more base stations, sidelink positioning reference signals from UEs in the plurality of UEs to be measured by other UEs in the plurality of UEs, or a combination thereof for joint positioning of the plurality of UEs, wherein the location server selects a common set of positioning reference signals for measurement based on the recommendation, the common set of positioning reference signals comprising selected downlink positioning reference signals, uplink positioning reference signals, sidelink positioning reference signals, or a combination thereof;
means for receiving a message from the location server comprising an indication of the common set of positioning reference signals for measurement by the first UE;
means for performing positioning measurements of the downlink positioning reference signals, the sidelink positioning reference signals, transmitting uplink positioning reference signals, or the combination thereof based on the indication of the common set of positioning reference signals.

32. A non-transitory storage medium including program code stored thereon, the program code is operable to configure at least one processor in a first user equipment (UE) in a plurality of UEs to support joint positioning of the plurality of UEs, comprising:
program code to send to a location server a recommendation for downlink positioning reference signals from one or more base stations to be measured by each UE in the plurality of UEs, uplink positioning reference signals from the plurality of UEs to be measured by the one or more base stations, sidelink positioning reference signals from UEs in the plurality of UEs to be measured by other UEs in the plurality of UEs, or a combination thereof for joint positioning of the plurality of UEs, wherein the location server selects a common set of positioning reference signals for measurement based on the recommendation, the common set of positioning reference signals comprising selected downlink positioning reference signals, uplink positioning reference signals, sidelink positioning reference signals, or a combination thereof;
program code to receive a message from the location server comprising an indication of the common set of positioning reference signals for measurement by the first UE;
program code to perform positioning measurements of the downlink positioning reference signals, the sidelink positioning reference signals, transmitting uplink positioning reference signals, or the combination thereof based on the indication of the common set of positioning reference signals.

33. A method for supporting joint positioning of a plurality of user equipments (UEs) performed by a location server, comprising:
receiving, from one or more UEs from the plurality of UEs, an indication of a common set of positioning reference signals for measurement, the common set of positioning reference signals comprising downlink positioning reference signals from one or more base stations to be measured by each UE in the plurality of UEs, uplink positioning reference signals from the plurality of UEs to be measured by the one or more base stations, sidelink positioning reference signals from UEs in the plurality of UEs to be measured by other UEs in the plurality of UEs, or a combination thereof;
receiving location information from one or more of each UE in the plurality of UEs, the one or more base stations, or a combination thereof, the location information comprising downlink positioning reference signal measurements, uplink positioning reference signal measurements, round trip time measurements, sidelink positioning reference signal measurements, or the combination thereof generated from the common set of positioning reference signals; and
determining jointly a position estimate for each UE using the location information received.

34. The method of clause 33, further comprising sending a message to each UE in the plurality of UEs, the message comprising configuration information for a plurality of downlink positioning reference signals, a plurality of uplink positioning reference signals, a plurality of sidelink positioning reference signals, or the combination thereof, from which the common set of positioning reference signals is selected by the one or more UEs.

35. The method of clause 34, further comprising scheduling the plurality of downlink positioning reference signals with the one or more base stations before receiving the common set of positioning reference signals.

36. The method of clause 34, further comprising scheduling the downlink positioning reference signals with the one or more base stations after receiving the common set of positioning reference signals.

37. The method of any of clauses 33-36, further comprising:
selecting the plurality of UEs for joint positioning; and
sending to each UE in the plurality of UEs an identification of the plurality of UEs and an indication that the plurality of UEs is included in a joint positioning session.

38. The method of any of clauses 33-37, wherein the common set of positioning reference signals comprises one or more of positioning reference signal (PRS) resource identifier (ID), PRS resource set ID, transmission point (TRP) ID, Cell ID, sidelink-PRS ID, UE ID, Subscriber Identity Module (SIM), or any combination thereof.

39. The method of any of clauses 33-38, further comprising sending each UE in the plurality of UEs a corresponding position estimate.

40. A location server configured to support joint positioning of a plurality of user equipments (UEs), comprising:
a communications interface configured to communicate with entities in a wireless network;
at least one memory; and
at least one processor coupled to the communications interface and the at least one memory, wherein the at least one processor is configured to:
receive, from one or more UEs from the plurality of UEs via the communications interface, an indication of a common set of positioning reference signals for measurement, the common set of positioning reference signals comprising downlink positioning reference signals from one or more base stations to be measured by each UE in the plurality of UEs, uplink positioning reference signals from the plurality of UEs to be measured by the one or more base stations, sidelink positioning reference signals from UEs in the plurality of UEs to be measured by other UEs in the plurality of UEs, or a combination thereof;
receive, via the communications interface, location information from one or more of each UE in the plurality of UEs, the one or more base stations, or a combination thereof, the location information comprising downlink positioning reference signal measurements, uplink positioning reference signal measurements, round trip time measurements, sidelink positioning reference signal measurements, or the combination thereof generated from the common set of positioning reference signals; and
determine jointly a position estimate for each UE using the location information received.

41. The location server of clause 40, further comprising sending a message to each UE in the plurality of UEs, the message comprising configuration information for a plurality of downlink positioning reference signals, a plurality of uplink positioning reference signals, a plurality of sidelink positioning reference signals, or the combination thereof, from which the common set of positioning reference signals is selected by the one or more UEs.

42. The location server of clause 41, further comprising scheduling the plurality of downlink positioning reference signals with the one or more base stations before receiving the common set of positioning reference signals.

43. The location server of clause 41, further comprising scheduling the downlink positioning reference signals with the one or more base stations after receiving the common set of positioning reference signals.

44. The location server of any of clauses 40-43, further comprising:
selecting the plurality of UEs for joint positioning; and
sending to each UE in the plurality of UEs an identification of the plurality of UEs and an indication that the plurality of UEs is included in a joint positioning session.

45. The location server of any of clauses 40-44, wherein the common set of positioning reference signals comprises one or more of positioning reference signal (PRS) resource identifier (ID), PRS resource set ID, transmission point (TRP) ID, Cell ID, sidelink-PRS ID, UE ID, Subscriber Identity Module (SIM), or any combination thereof.

46. The location server of any of clauses 40-45, further comprising sending each UE in the plurality of UEs a corresponding position estimate.

47. A location server configured to support joint positioning of a plurality of user equipments (UEs), comprising:
means for receiving, from one or more UEs from the plurality of UEs, an indication of a common set of positioning reference signals for measurement, the common set of positioning reference signals comprising downlink positioning reference signals from one or more base stations to be measured by each UE in the plurality of UEs, uplink positioning reference signals from the plurality of UEs to be measured by the one or more base stations, sidelink positioning reference signals from UEs in the plurality of UEs to be measured by other UEs in the plurality of UEs, or a combination thereof;
means for receiving location information from one or more of each UE in the plurality of UEs, the one or more base stations, or a combination thereof, the location information comprising downlink positioning reference signal measurements, uplink positioning reference signal measurements, round trip time measurements, sidelink positioning reference signal measurements, or the combination thereof generated from the common set of positioning reference signals; and
means for determining jointly a position estimate for each UE using the location information received.

48. A non-transitory storage medium including program code stored thereon, the program code is operable to configure at least one processor in a location server to support joint positioning of a plurality of user equipments (UEs), comprising:
program code to receive, from one or more UEs from the plurality of UEs, an indication of a common set of positioning reference signals for measurement, the common set of positioning reference signals comprising downlink positioning reference signals from one or more base stations to be measured by each UE in the plurality of UEs, uplink positioning reference signals from the plurality of UEs to be measured by the one or more base stations, sidelink positioning reference signals from UEs in the plurality of UEs to be measured by other UEs in the plurality of UEs, or a combination thereof;
program code to receive location information from one or more of each UE in the plurality of UEs, the one or more base stations, or a combination thereof, the location information comprising downlink positioning reference signal measurements, uplink positioning reference signal measurements, round trip time measurements, sidelink positioning reference signal measurements, or the combination thereof generated from the common set of positioning reference signals; and
program code to determine jointly a position estimate for each UE using the location information received.

49. A method for supporting joint positioning of a plurality of user equipments (UEs) performed by a first UE in the plurality of UEs, comprising:
receiving from a location server an identification of the plurality of UEs and an indication that the plurality of UEs is included in a joint positioning session;
sending to the location server an indication of a common set of positioning reference signals for measurement, the common set of positioning reference signals comprising downlink positioning reference signals from one or more base stations to be measured by each UE in the plurality of UEs, uplink positioning reference signals from the plurality of UEs to be measured by the one or more base stations, sidelink positioning reference signals from UEs in the plurality of UEs to be measured by other UEs in the plurality of UEs, or a combination thereof;
performing positioning measurements of the downlink positioning reference signals, the sidelink positioning reference signals from the common set of positioning reference signals, transmitting uplink positioning reference signals, or the combination thereof from the common set of positioning reference signals.

50. The method of clause 49, further comprising receiving a message from the location server, the message comprising configuration information for a plurality of downlink positioning reference signals, a plurality of uplink positioning reference signals, a plurality of sidelink positioning reference signals, or a combination thereof, from which the common set of positioning reference signals is selected by one or more UEs in the plurality of UEs.

51. The method of clause 50, wherein the identification of the plurality of UEs and the indication that the plurality of UEs is included in the joint positioning session is in the message.

52. The method of any of clauses 49-51, further comprising:
receiving, from at least one other UE in the plurality of UEs, a recommendation for the downlink positioning reference signals, the uplink positioning reference signals, the sidelink positioning reference signals, or the combination thereof to be included in the common set of positioning reference signals;
determining the downlink positioning reference signals, the uplink positioning reference signals, the sidelink positioning reference signals, or the combination thereof that are included in the common set of positioning reference signals based on the recommendation received from the at least one other UE; and
sending the common set of positioning reference signals to each other UE.

53. The method of any of clauses 49-52, further comprising:
sending, to at least one other UE in the plurality of UEs, a first recommendation for the downlink positioning reference signals, the uplink positioning reference signals, the sidelink positioning reference signals, or the combination thereof to be included in the common set of positioning reference signals;
receiving, from at least one other UE in the plurality of UEs, a second recommendation for the downlink positioning reference signals, the uplink positioning reference signals, the sidelink positioning reference signals, or the combination thereof to be included in the common set of positioning reference signals;
wherein the common set of positioning reference signals is determined by consensus of the plurality of UEs.

54. The method of any of clauses 49-53, wherein the common set of positioning reference signals comprises one or more of positioning reference signal (PRS) resource identifier (ID), PRS resource set ID, transmission point (TRP) ID, Cell ID, sidelink-PRS ID, UE ID, Subscriber Identity Module (SIM), or any combination thereof.

55. The method of any of clauses 49-54, further comprising sending a location information report to the location server comprising the positioning measurements of the downlink positioning reference signals, the sidelink positioning reference signals, or the combination thereof.

56. The method of clause 55, further comprising receiving from the location server a position estimate for the first UE determined jointly with position estimates for other UEs in the plurality of UEs based on the location information report and location information reports received from at least one of other UEs and the one or more base stations, or a combination thereof.

57. A first user equipment (UE) in a plurality of UEs configured to support joint positioning of a plurality of user equipments (UEs), comprising:
a wireless transceiver configured to communicate with entities in a wireless network;
at least one memory; and
at least one processor coupled to the wireless transceiver and the at least one memory, wherein the at least one processor is configured to:
receive from a location server, via the wireless transceiver, an identification of the plurality of UEs and an indication that the plurality of UEs is included in a joint positioning session;
send to the location server, via the wireless transceiver, an indication of a common set of positioning reference signals for measurement, the common set of positioning reference signals comprising downlink positioning reference signals from one or more base stations to be measured by each UE in the plurality of UEs, uplink positioning reference signals from the plurality of UEs to be measured by the one or more base stations, sidelink positioning reference signals from UEs in the plurality of UEs to be measured by other UEs in the plurality of UEs, or a combination thereof;
perform positioning measurements of the downlink positioning reference signals, the sidelink positioning reference signals from the common set of positioning reference signals, transmitting uplink positioning reference signals, or the combination thereof from the common set of positioning reference signals.

58. The first UE of clause 57, wherein the at least one processor is further configured to receive a message from the location server via the wireless transceiver, the message comprising configuration information for a plurality of downlink positioning reference signals, a plurality of uplink positioning reference signals, a plurality of sidelink positioning reference signals, or a combination thereof, from which the common set of positioning reference signals is selected by one or more UEs in the plurality of UEs.

59. The first UE of clause 58, wherein the identification of the plurality of UEs and the indication that the plurality of UEs is included in the joint positioning session is in the message.

60. The first UE of any of clauses 57-59, wherein the at least one processor is further configured to:
receive, from at least one other UE in the plurality of UEs via the wireless transceiver, a recommendation for the downlink positioning reference signals, the uplink positioning reference signals, the sidelink positioning reference signals, or the combination thereof to be included in the common set of positioning reference signals;
determine the downlink positioning reference signals, the uplink positioning reference signals, the sidelink positioning reference signals, or the combination thereof that are included in the common set of positioning reference signals based on the recommendation received from the at least one other UE; and
sending, via the wireless transceiver, the common set of positioning reference signals to each other UE.

61. The first UE of any of clauses 57-60, wherein the at least one processor is further configured to:
send, to at least one other UE in the plurality of UEs via the wireless transceiver, a first recommendation for the downlink positioning reference signals, the uplink positioning reference signals, the sidelink positioning reference signals, or the combination thereof to be included in the common set of positioning reference signals;

receive, from at least one other UE in the plurality of UEs via the wireless transceiver, a second recommendation for the downlink positioning reference signals, the uplink positioning reference signals, the sidelink positioning reference signals, or the combination thereof to be included in the common set of positioning reference signals;

wherein the common set of positioning reference signals is determined by consensus of the plurality of UEs.

62. The first UE of any of clauses 57-61, wherein the common set of positioning reference signals comprises one or more of positioning reference signal (PRS) resource identifier (ID), PRS resource set ID, transmission point (TRP) ID, Cell ID, sidelink-PRS ID, UE ID, Subscriber Identity Module (SIM), or any combination thereof.

63. The first UE of any of clauses 57-62, wherein the at least one processor is further configured to:

send a location information report to the location server comprising the positioning measurements of the downlink positioning reference signals, the sidelink positioning reference signals, or the combination thereof.

64. The first UE of clause 63, wherein the at least one processor is further configured to receive from the location server, via the wireless transceiver, a position estimate for the first UE determined jointly with position estimates for other UEs in the plurality of UEs based on the location information report and location information reports received from at least one of other UEs and the one or more base stations, or a combination thereof.

65. A first user equipment (UE) in a plurality of UEs configured to support joint positioning of a plurality of user equipments (UEs), comprising:

means for receiving from a location server an identification of the plurality of UEs and an indication that the plurality of UEs is included in a joint positioning session;

means for sending to the location server an indication of a common set of positioning reference signals for measurement, the common set of positioning reference signals comprising downlink positioning reference signals from one or more base stations to be measured by each UE in the plurality of UEs, uplink positioning reference signals from the plurality of UEs to be measured by the one or more base stations, sidelink positioning reference signals from UEs in the plurality of UEs to be measured by other UEs in the plurality of UEs, or a combination thereof;

means for performing positioning measurements of the downlink positioning reference signals, the sidelink positioning reference signals from the common set of positioning reference signals, transmitting uplink positioning reference signals, or the combination thereof from the common set of positioning reference signals.

66. A non-transitory storage medium including program code stored thereon, the program code is operable to configure at least one processor in a first user equipment (UE) in a plurality of UEs to support joint positioning of a plurality of user equipments (UEs), comprising:

program code to receive from a location server an identification of the plurality of UEs and an indication that the plurality of UEs is included in a joint positioning session;

program code to send to the location server an indication of a common set of positioning reference signals for measurement, the common set of positioning reference signals comprising downlink positioning reference signals from one or more base stations to be measured by each UE in the plurality of UEs, uplink positioning reference signals from the plurality of UEs to be measured by the one or more base stations, sidelink positioning reference signals from UEs in the plurality of UEs to be measured by other UEs in the plurality of UEs, or a combination thereof;

program code to perform positioning measurements of the downlink positioning reference signals, the sidelink positioning reference signals from the common set of positioning reference signals, transmitting uplink positioning reference signals, or the combination thereof from the common set of positioning reference signals.

Although particular embodiments have been disclosed herein in detail, this has been done by way of example for purposes of illustration only, and is not intended to be limiting with respect to the scope of the appended claims, which follow. In particular, it is contemplated that various substitutions, alterations, and modifications may be made without departing from the spirit and scope of the invention as defined by the claims. Other aspects, advantages, and modifications are considered to be within the scope of the following claims. The claims presented are representative of the embodiments and features disclosed herein. Other unclaimed embodiments and features are also contemplated. Accordingly, other embodiments are within the scope of the following claims.

What is claimed is:

1. A method for supporting joint positioning of a plurality of user equipments (UEs) performed by a location server, comprising:

selecting a common set of positioning reference signals for measurement, the common set of positioning reference signals comprising downlink positioning reference signals from one or more base stations to be measured by each UE in the plurality of UEs, uplink positioning reference signals from the plurality of UEs to be measured by the one or more base stations, sidelink positioning reference signals from UEs in the plurality of UEs to be measured by other UEs in the plurality of UEs, or a combination thereof;

sending a message to each UE in the plurality of UEs, the message comprising an indication of the common set of positioning reference signals;

receiving location information from one or more of each UE in the plurality of UEs, the one or more base stations, or a combination thereof, the location information comprising downlink positioning reference signal measurements, uplink positioning reference signal measurements, round trip time measurements, sidelink positioning reference signal measurements, or the combination thereof that is generated based on the indication of the common set of positioning reference signals; and jointly determining respective position estimates for each UE of the plurality of UEs using the location information received, wherein the plurality of UEs is selected before the selecting the common set of position reference signals.

2. The method of claim 1, wherein selecting the common set of positioning reference signals for measurement comprises:

determining a location estimation for the plurality of UEs; and determining the downlink positioning reference signals, the uplink positioning reference signals, the sidelink positioning reference signals, or the combination thereof included in the common set of positioning reference signals based on the location estimation for the plurality of UEs and the UEs included in the plurality of UEs.

3. The method of claim 1, wherein selecting the common set of positioning reference signals for measurement comprises:
   receiving, from one or more UEs from the plurality of UEs, a recommendation for the downlink positioning reference signals, the uplink positioning reference signals the sidelink positioning reference signals, or the combination thereof to be included in the common set of positioning reference signals; and
   determining the downlink positioning reference signals, the uplink positioning reference signals, the sidelink positioning reference signals, or the combination thereof included in the common set of positioning reference signals based on the recommendation received from the one or more UEs.

4. The method of claim 1, wherein selecting the common set of positioning reference signals for measurement comprises:
   receiving a location measurement report from one or more UEs from the plurality of UEs; and
   determining the downlink positioning reference signals, the uplink positioning reference signals, the sidelink positioning reference signals, or the combination thereof included in the common set of positioning reference signals based on the location measurement report received from the one or more UEs.

5. The method of claim 1, further comprising scheduling the downlink positioning reference signals with the one or more base stations included in the common set of positioning reference signals.

6. The method of claim 1, wherein the common set of positioning reference signals comprises one or more of positioning reference signal (PRS) resource identifier (ID), PRS resource set ID, transmission point (TRP) ID, Cell ID, sidelink-PRS ID, UE ID, Subscriber Identity Module (SIM), or any combination thereof.

7. The method of claim 1, further comprising sending each UE in the plurality of UEs a corresponding position estimate.

8. A location server configured to support joint positioning of a plurality of user equipments (UEs), comprising:
   a communications interface configured to communicate with entities in a wireless network;
   at least one memory; and
   at least one processor coupled to the communications interface and the at least one memory, wherein the at least one processor is configured to:
      select a common set of positioning reference signals for measurement, the common set of positioning reference signals comprising downlink positioning reference signals from one or more base stations to be measured by each UE in the plurality of UEs, uplink positioning reference signals from the plurality of UEs to be measured by the one or more base stations, sidelink positioning reference signals from UEs in the plurality of UEs to be measured by other UEs in the plurality of UEs, or a combination thereof;
      send, via the communications interface, a message to each UE in the plurality of UEs, the message comprising an indication of the common set of positioning reference signals;
      receive, via the communications interface, location information from one or more of each UE in the plurality of UEs, the one or more base stations, or a combination thereof, the location information comprising downlink positioning reference signal measurements, uplink positioning reference signal measurements, round trip time measurements, sidelink positioning reference signal measurements, or the combination thereof that is generated based on the indication of the common set of positioning reference signals; and
      jointly determine respective position estimates for each UE of the plurality of UEs using the location information received, wherein the plurality of UEs is selected before the selecting the common set of position reference signals.

9. The location server of claim 8, wherein the at least one processor is configured to select the common set of positioning reference signals for measurement by being configured to:
   determine a location estimation for the plurality of UEs; and
   determine the downlink positioning reference signals, the uplink positioning reference signals, the sidelink positioning reference signals, or the combination thereof included in the common set of positioning reference signals based on the location estimation for the plurality of UEs and the UEs included in the plurality of UEs.

10. The location server of claim 8, wherein the at least one processor is configured to select the common set of positioning reference signals for measurement by being configured to:
   receive, from one or more UEs from the plurality of UEs via the communications interface, a recommendation for the downlink positioning reference signals, the uplink positioning reference signals, the sidelink positioning reference signals, or the combination thereof to be included in the common set of positioning reference signals; and
   determine the downlink positioning reference signals, the uplink positioning reference signals, the sidelink positioning reference signals, or the combination thereof included in the common set of positioning reference signals based on the recommendation received from the one or more UEs.

11. The location server of claim 8, wherein the at least one processor is configured to select the common set of positioning reference signals for measurement by being configured to:
   receive, via the communications interface, a location measurement report from one or more UEs from the plurality of UEs; and
   determine the downlink positioning reference signals, the uplink positioning reference signals, the sidelink positioning reference signals, or the combination thereof included in the common set of positioning reference signals based on the location measurement report received from the one or more UEs.

12. The location server of claim 8, wherein the at least one processor is further configured to schedule the downlink positioning reference signals with the one or more base stations included in the common set of positioning reference signals.

13. The location server of claim 8, wherein the common set of positioning reference signals comprises one or more of positioning reference signal (PRS) resource identifier (ID), PRS resource set ID, transmission point (TRP) ID, Cell ID, sidelink-PRS ID, UE ID, Subscriber Identity Module (SIM), or any combination thereof.

14. The location server of claim 8, wherein the at least one processor is further configured to send each UE in the plurality of UEs, via the communications interface, a corresponding position estimate.

15. A location server configured to support joint positioning of a plurality of user equipments (UEs), comprising:
  means for selecting a common set of positioning reference signals for measurement, the common set of positioning reference signals comprising downlink positioning reference signals from one or more base stations to be measured by each UE in the plurality of UEs, uplink positioning reference signals from the plurality of UEs to be measured by the one or more base stations, sidelink positioning reference signals from UEs in the plurality of UEs to be measured by other UEs in the plurality of UEs, or a combination thereof;
  means for sending a message to each UE in the plurality of UEs, the message comprising an indication of the common set of positioning reference signals;
  means for receiving location information from one or more of each UE in the plurality of UEs, the one or more base stations, or a combination thereof, the location information comprising downlink positioning reference signal measurements, uplink positioning reference signal measurements, round trip time measurements, sidelink positioning reference signal measurements, or the combination thereof that is generated based on the indication of the common set of positioning reference signals; and
  means for jointly determining respective position estimates for each UE of the plurality of UEs using the location information received, wherein the plurality of UEs is selected before the selecting the common set of position reference signals.

16. A non-transitory storage medium including program code stored thereon, the program code is operable to configure at least one processor in a location server to support joint positioning of a plurality of user equipments (UEs), comprising:
  program code to select a common set of positioning reference signals for measurement, the common set of positioning reference signals comprising downlink positioning reference signals from one or more base stations to be measured by each UE in the plurality of UEs, uplink positioning reference signals from the plurality of UEs to be measured by the one or more base stations, sidelink positioning reference signals from UEs in the plurality of UEs to be measured by other UEs in the plurality of UEs, or a combination thereof;
  program code to send a message to each UE in the plurality of UEs, the message comprising an indication of the common set of positioning reference signals;
  program code to receive location information from one or more of each UE in the plurality of UEs, the one or more base stations, or a combination thereof, the location information comprising downlink positioning reference signal measurements, uplink positioning reference signal measurements, round trip time measurements, sidelink positioning reference signal measurements, or the combination thereof that is generated based on the indication of the common set of positioning reference signals; and
  program code to jointly determine respective position estimates for each UE of the plurality of UEs using the location information received, wherein the plurality of UEs is selected before the selecting the common set of position reference signals.

17. A method for supporting joint positioning of a plurality of user equipments (UEs) performed by a first UE in the plurality of UEs, comprising:
  sending to a location server a recommendation for downlink positioning reference signals from one or more base stations to be measured by each UE in the plurality of UEs, uplink positioning reference signals from the plurality of UEs to be measured by the one or more base stations, sidelink positioning reference signals from UEs in the plurality of UEs to be measured by other UEs in the plurality of UEs, or a combination thereof for joint positioning of the plurality of UEs, wherein the location server selects a common set of positioning reference signals for measurement based on the recommendation, the common set of positioning reference signals comprising selected downlink positioning reference signals, uplink positioning reference signals, sidelink positioning reference signals, or a combination thereof;
  receiving a message from the location server comprising an indication of the common set of positioning reference signals for measurement by the first UE;
  performing positioning measurements of the downlink positioning reference signals, the sidelink positioning reference signals, transmitting uplink positioning reference signals, or the combination thereof based on the indication of the common set of positioning reference signals.

18. The method of claim 17, wherein the plurality of UEs for the joint positioning is selected by the location server.

19. The method of claim 17, wherein the common set of positioning reference signals comprises one or more of positioning reference signal (PRS) resource identifier (ID), PRS resource set ID, transmission point (TRP) ID, Cell ID, sidelink-PRS ID, UE ID, Subscriber Identity Module (SIM), or any combination thereof.

20. The method of claim 17, further comprising:
  sending a location information report to the location server comprising the positioning measurements of the downlink positioning reference signals, the sidelink positioning reference signals, or the combination thereof.

21. The method of claim 20, wherein the location server jointly determines a position estimate for each UE in the plurality of UEs based on the location information report and location information reports received from at least one of other UEs and the one or more base stations, or a combination thereof.

22. The method of claim 21, further comprising receiving from the location server the position estimate for the first UE.

23. A first user equipment (UE) in a plurality of UEs configured to support joint positioning of the plurality of UEs, comprising:
  a wireless transceiver configured to communicate with entities in a wireless network;
  at least one memory; and
  at least one processor coupled to the wireless transceiver and the at least one memory, wherein the at least one processor is configured to:
    send, via the wireless transceiver, to a location server a recommendation for downlink positioning reference signals from one or more base stations to be measured by each UE in the plurality of UEs, uplink positioning reference signals from the plurality of UEs to be measured by the one or more base stations, sidelink positioning reference signals from UEs in the plurality of UEs to be measured by other UEs in the plurality of UEs, or a combination thereof for joint positioning of the plurality of UEs, wherein the location server selects a common set of positioning reference signals for measurement based on the recommendation, the common set of positioning reference signals comprising selected downlink positioning reference signals, uplink positioning reference signals, sidelink positioning reference signals, or a combination thereof;

receive, via the wireless transceiver, a message from the location server comprising an indication of the common set of positioning reference signals for measurement by the first UE; and perform positioning measurements of the downlink positioning reference signals, the sidelink positioning reference signals, transmitting uplink positioning reference signals, or the combination thereof based on the indication of the common set of positioning reference signals.

24. The first UE of claim 23, wherein the plurality of UEs for the joint positioning is selected by the location server.

25. The first UE of claim 23, wherein the common set of positioning reference signals comprises one or more of positioning reference signal (PRS) resource identifier (ID), PRS resource set ID, transmission point (TRP) ID, Cell ID, sidelink-PRS ID, UE ID, Subscriber Identity Module (SIM), or any combination thereof.

26. The first UE of claim 23, wherein the at least one processor is further configured to:

send, via the wireless transceiver, a location information report to the location server comprising the positioning measurements of the downlink positioning reference signals, the sidelink positioning reference signals, or the combination thereof.

27. The first UE of claim 26, wherein the location server jointly determines a position estimate for each UE in the plurality of UEs based on the location information report and location information reports received from other UEs.

28. The first UE of claim 27, wherein the at least one processor is further configured to receive from the location server, via the wireless transceiver, the position estimate for the first UE.

29. A first user equipment (UE) in a plurality of UEs configured to support joint positioning of the plurality of UEs, comprising:

means for sending to a location server a recommendation for downlink positioning reference signals from one or more base stations to be measured by each UE in the plurality of UEs, uplink positioning reference signals from the plurality of UEs to be measured by the one or more base stations, sidelink positioning reference signals from UEs in the plurality of UEs to be measured by other UEs in the plurality of UEs, or a combination thereof for joint positioning of the plurality of UEs, wherein the location server selects a common set of positioning reference signals for measurement based on the recommendation, the common set of positioning reference signals comprising selected downlink positioning reference signals, uplink positioning reference signals, sidelink positioning reference signals, or a combination thereof;

means for receiving a message from the location server comprising an indication of the common set of positioning reference signals for measurement by the first UE;

means for performing positioning measurements of the downlink positioning reference signals, the sidelink positioning reference signals, transmitting uplink positioning reference signals, or the combination thereof based on the indication of the common set of positioning reference signals.

30. A non-transitory storage medium including program code stored thereon, the program code is operable to configure at least one processor in a first user equipment (UE) in a plurality of UEs to support joint positioning of the plurality of UEs, comprising:

program code to send to a location server a recommendation for downlink positioning reference signals from one or more base stations to be measured by each UE in the plurality of UEs, uplink positioning reference signals from the plurality of UEs to be measured by the one or more base stations, sidelink positioning reference signals from UEs in the plurality of UEs to be measured by other UEs in the plurality of UEs, or a combination thereof for joint positioning of the plurality of UEs, wherein the location server selects a common set of positioning reference signals for measurement based on the recommendation, the common set of positioning reference signals comprising selected downlink positioning reference signals, uplink positioning reference signals, sidelink positioning reference signals, or a combination thereof;

program code to receive a message from the location server comprising an indication of the common set of positioning reference signals for measurement by the first UE;

program code to perform positioning measurements of the downlink positioning reference signals, the sidelink positioning reference signals, transmitting uplink positioning reference signals, or the combination thereof based on the indication of the common set of positioning reference signals.

* * * * *